United States Patent
Hwang et al.

(10) Patent No.: US 9,930,684 B2
(45) Date of Patent: Mar. 27, 2018

(54) METHOD AND APPARATUS FOR DEVICE-TO-DEVICE HARQ PROCESS MANAGEMENT

(71) Applicant: Samsung Electronics Co., Ltd., Suwon-si, Gyeonggi-do (KR)

(72) Inventors: June Hwang, Incheon (KR); Kyeongin Jeong, Yonngin-si (KR); Youngbin Chang, Anyang-si (KR); Hyunseok Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 14/864,276

(22) Filed: Sep. 24, 2015

(65) Prior Publication Data

US 2016/0095133 A1    Mar. 31, 2016

Related U.S. Application Data

(60) Provisional application No. 62/055,232, filed on Sep. 25, 2014.

(30) Foreign Application Priority Data

Mar. 9, 2015  (KR) ........................ 10-2015-0032489

(51) Int. Cl.
*H04W 72/12*  (2009.01)
*H04L 5/00*  (2006.01)
(Continued)

(52) U.S. Cl.
CPC ............... *H04W 72/12* (2013.01); *H04L 1/00* (2013.01); *H04L 1/18* (2013.01); *H04L 5/0048* (2013.01); *H04W 8/005* (2013.01); *H04W 88/08* (2013.01)

(58) Field of Classification Search
CPC .. H04L 28/56; H04L 28/5602; H04L 28/1201
See application file for complete search history.

(56) References Cited

U.S. PATENT DOCUMENTS

| 8,495,446 B2 | 7/2013 | Chun et al. |
| 2010/0050036 A1 | 2/2010 | Chun et al. |

(Continued)

FOREIGN PATENT DOCUMENTS

| EP | 2 665 325 A1 | 11/2013 |
| EP | 2900022 A1 | 7/2015 |

(Continued)

OTHER PUBLICATIONS

Samsung, "Identifier in Scheduling Assignment for D2D Communication", R1-142107, 3GPP TSG RAN WG1#77, May 10, 2014, pp. 1-4, Seoul, South Korea.

(Continued)

*Primary Examiner* — Alvin Zhu
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method and an apparatus that may repeatedly transmit signals to cope with and reduce transmission errors in device-to-device (D2D) communication are provided. The method includes receiving, upon generation of data to be transmitted to a receiving user equipment (UE) (RX UE), allocation of resources to be used for D2D communication, transmitting a scheduling assignment (SA) containing identification information of at least one RX UE to the at least one RX UE, assigning at least one hybrid automatic repeat request (HARQ) process for the identification information of the at least one RX UE, and transmitting data to the at least one RX UE based on the HARQ process. Accordingly, it is possible (Continued)

to remove factors causing system performance degradation when retransmission operation for communication between a UE and a base station (eNB) is introduced to D2D communication.

18 Claims, 42 Drawing Sheets

(51) Int. Cl.
*H04W 8/00* (2009.01)
*H04L 1/00* (2006.01)
*H04L 1/18* (2006.01)
*H04W 88/08* (2009.01)

(56) References Cited

U.S. PATENT DOCUMENTS

| | | | |
|---|---|---|---|
| 2010/0177757 A1* | 7/2010 | Kim | H04W 74/0816 370/338 |
| 2010/0220679 A1* | 9/2010 | Abraham | H04W 74/06 370/329 |
| 2011/0219281 A1* | 9/2011 | Wang | G08C 25/02 714/749 |
| 2013/0150061 A1* | 6/2013 | Shin | H04W 4/005 455/450 |
| 2013/0322413 A1 | 12/2013 | Pelletier et al. | |
| 2014/0112162 A1 | 4/2014 | Tavildar et al. | |
| 2014/0177456 A1 | 6/2014 | Boudreau et al. | |
| 2015/0071175 A1 | 3/2015 | Boudreau et al. | |
| 2015/0071272 A1* | 3/2015 | Vermani | H04B 7/0452 370/338 |
| 2015/0078279 A1 | 3/2015 | Ko et al. | |
| 2015/0099511 A1 | 4/2015 | Lindoff et al. | |
| 2016/0183276 A1* | 6/2016 | Marinier | H04W 72/02 370/329 |

FOREIGN PATENT DOCUMENTS

| | | |
|---|---|---|
| KR | 10-2013-0121052 A | 11/2013 |
| WO | 2013-181515 A2 | 12/2013 |
| WO | 2014-097224 A1 | 6/2014 |
| WO | 2015-138083 A1 | 9/2015 |

OTHER PUBLICATIONS

Qualcomm Incorporated, "Control for D2D Broadcast Communication", R1-141966, 3GPP TSG RAN WG1#77, May 10, 2014, pp. 1-8, Seoul, South Korea.

3GPP; TSG RAN; Study on LTE Device to Device Proximity Services; Radio Aspects (Release 12", 3GPP TR 36.843 V12.01, XP055278338), Mar. 27, 2014.

GATT: "Discussion on D2D synchronization sources", R1-142894, 3GPP TSG RAN WG1 Meeting #78, KP050788378, Dresden, Germany, Aug. 10, 2014.

KDDI, 'Discussion on triggering condition for D2DSS transmission', R1-143159, 3GPP TSG RAN WG1 Meeting #78, Dresden, Germany, Aug. 10, 2014.

Ericsson, 'On Scheduling Assignments and Receiver Behaviour', R1-141391, 3GPP TSG-RAN WG1 Meeting #76bis, Shenzhen, China, Mar. 21, 2014.

\* cited by examiner

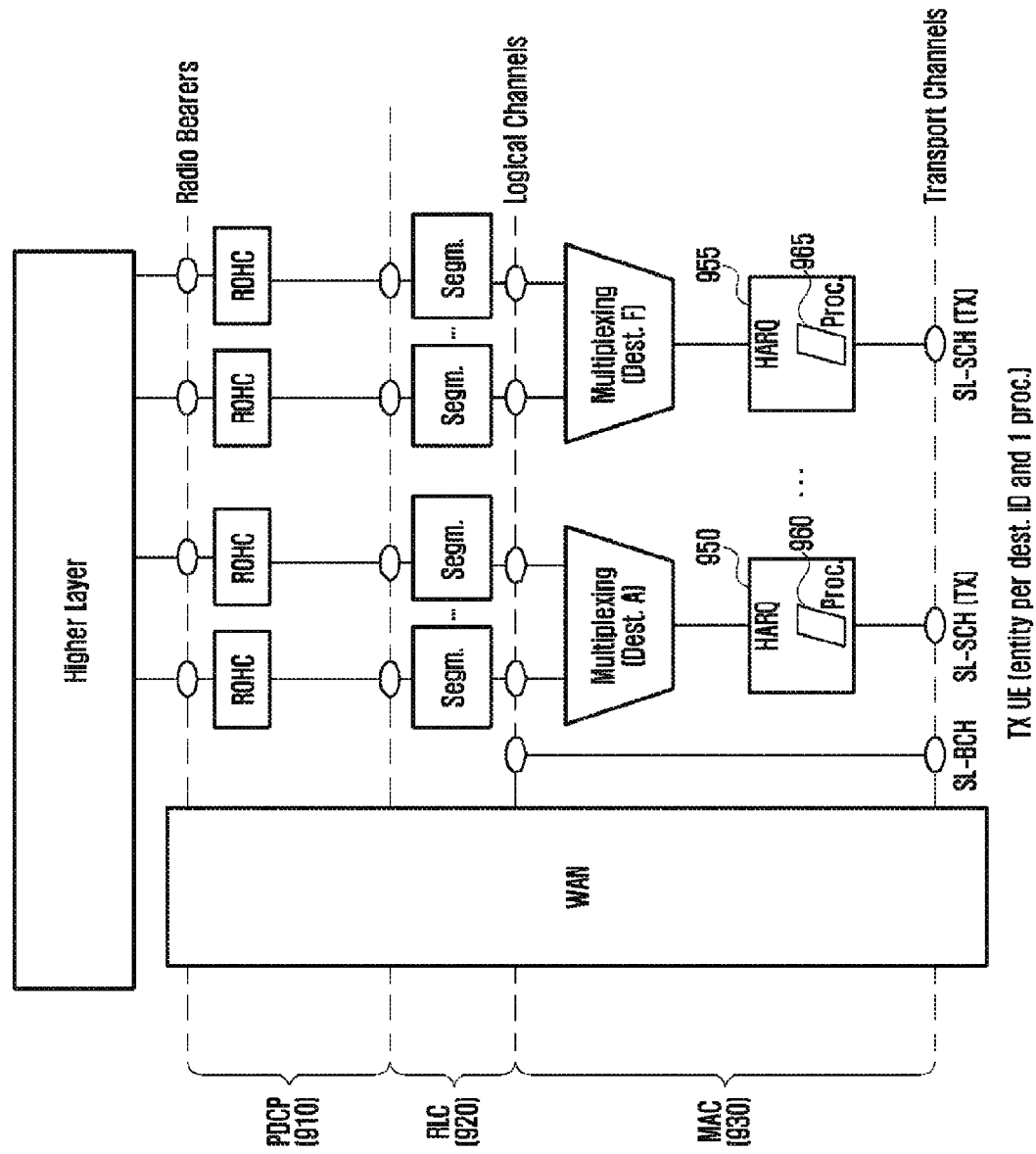

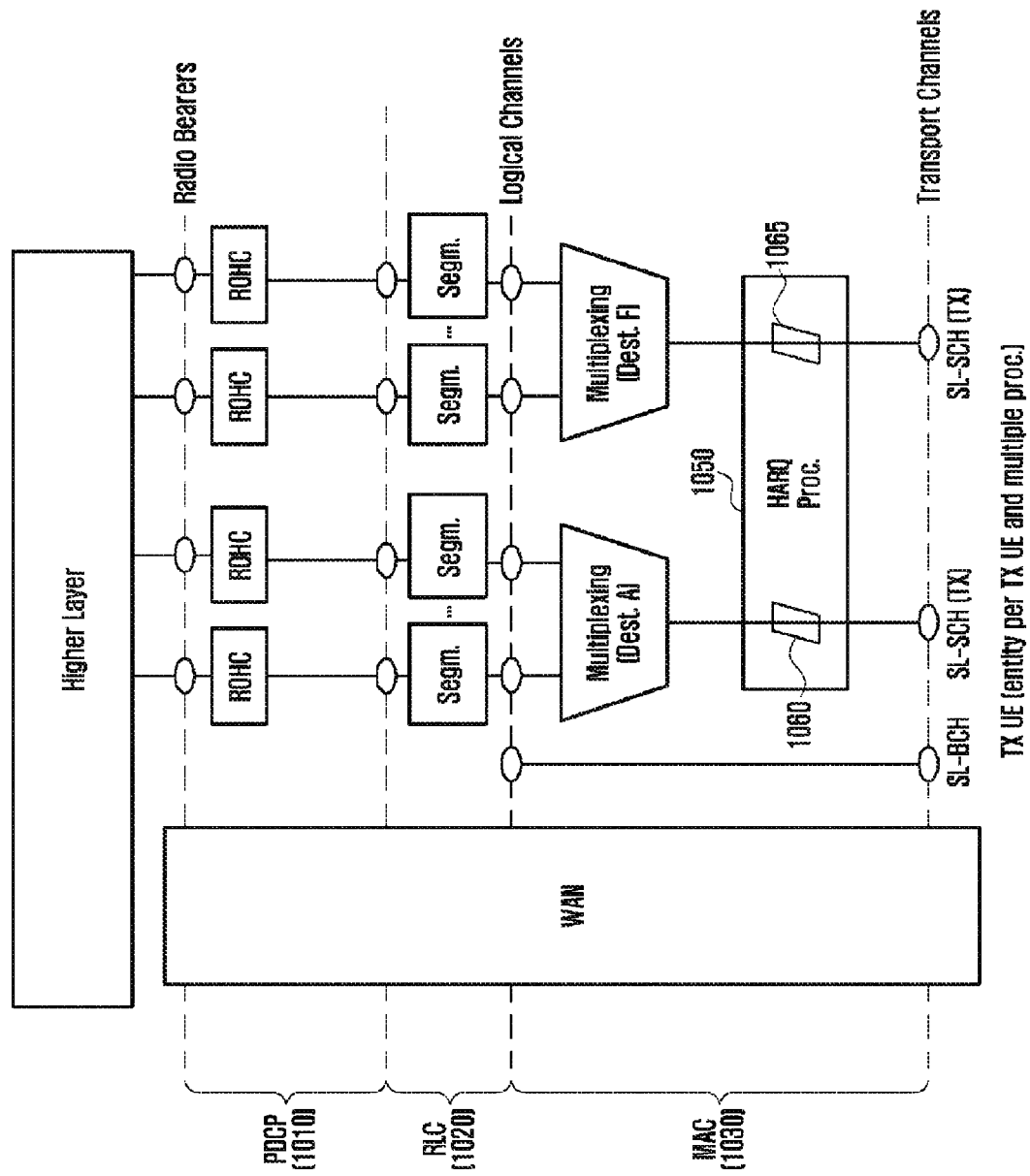

METHOD AND APPARATUS FOR DEVICE-TO-DEVICE HARQ PROCESS MANAGEMENT

CROSS-REFERENCE TO RELATED APPLICATION(S)

This application claims the benefit under 35 U.S.C. § 119(e) of a U.S. provisional patent application filed on Sep. 25, 2014 in the U.S. Patent and Trademark Office and assigned Ser. No. 62/055,232, and under 35 U.S.C. § 119(a) of a Korean patent application filed on Mar. 9, 2015 in the Korean Intellectual Property Office and assigned Serial number 10-2015-0032489, the entire disclosure of each of which is hereby incorporated by reference.

TECHNICAL FIELD

The present disclosure relates to signaling in device-to-device (D2D) communication. More particularly, the present disclosure relates to a method and an apparatus that may repeatedly transmit signals to cope with and reduce transmission errors in D2D communication.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, and large scale antenna techniques are discussed in 5G communication systems.

In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A hybrid automatic repeat request (HARQ) scheme may be used in physical layer transmission between a user equipment (UE) and a base station (eNB). The HARQ scheme attempts to reduce or eliminate transmission errors by repeatedly transmitting data to be transmitted. Repeated transmission of a signal may contribute to suppression of error occurrences and amplification of signal components.

HARQ techniques may be used for many transmission/reception operations in a cellular system. The UE may transmit and receive an original version of data or a redundancy version (RV) thereof to and from the eNB. Whenever data arrives, the receiving side determines success of reception. If data reception is successful, the receiving side transmits a signal indicating no more transmission to the transmitting side. In this case, acknowledgement (ACK) signaling may be used. For example, ACK indicates success of packet reception and NACK indicates failure of packet reception.

The receiving side decodes received data to detect an error and stores the received data in a storage region (e.g., a soft buffer). When no error is detected, the receiving side may transmit ACK feedback to the transmitting side so as not to receive the same data. When an error is detected, the receiving side may transmit NACK feedback to the transmitting side so as to receive another version of the same data within a preset time scheduled next (synchronous/asynchronous for uplink/downlink). The receiving side may decode the newly received version, combine the newly decoded version with the decoded data stored in the soft buffer, and examine the combined data to detect an error. The receiving side may repeat the above procedure. In the current system, several milliseconds are required for the receiving side to complete decoding, error detection, soft buffer writing after reception of data. In addition, a higher layer than the physical layer creates an ACK or NACK packet and transmits the same. The transmitting side may receive this feedback packet and determine whether to perform retransmission.

According to the long term evolution (LTE) standards, the above operations (i.e., reception, decoding, error detection, soft buffer writing, feedback packet generation and transmission, retransmission determination at the transmitter) may take 8 ms (although different from system to system). This applies to both the uplink and the downlink. Hence, it may take 8 ms to receive a piece of data and receive the next piece of data.

As it may take 8 ms to receive a piece of data, this may indicate that the same data may be received again after 8 ms, which is a long time compared to the transmission time interval (TTI). As such, HARQ interleaving is employed to efficiently utilize the time resource, where original pieces of data are transmitted in succession and respective retransmissions are transmitted after 8 ms. For interleaving, up to eight HARQ processes may run in parallel to perform HARQ operation.

FIG. 1 illustrates occurrence of a HARQ process ID collision according to the related art.

Referring to FIG. 1, an HARQ entity functions in communication between the user equipment (UE) and the base station (eNB, evolved Node B). In the UE, the HARQ entity maintains a group of HARQ processes to handle pieces of received data. As the UE performs transmission and reception to and from the eNB, all the HARQ processes are concerned with the eNB. As the eNB performs transmission and reception to and from multiple UEs, the eNB may include multiple HARQ entities, each of which may manage a group of HARQ processes and a soft buffer to handle transmission and reception related to a particular UE.

In device-to-device (D2D) communication, unlike communication between UE and eNB, a UE may communicate with not only an eNB but also another UE. When existing HARQ entity assignment (one HARQ entity and up to eight HARQ processes for one UE, multiple HARQ entities and up to eight HARQ processes for each HARQ entity in one eNB) is used without modifications, eight HARQ processes may be assigned to each UE. In a D2D UE, D2D HARQ processing and WAN HARQ processing may take different delay times. Hence, the number of assigned HARQ processes is to be varied according to the retransmission interval and HARQ processing time. When the number of assigned HARQ processes is less than necessary (i.e., the number of HARQ processes is small in comparison to HARQ processing delay), radio resources may be underutilized, causing inefficiency. When the number of assigned HARQ processes is greater than necessary, memory resources may be unnecessarily wasted. Further, in the case of asynchronous HARQ processing, to notify transmission data using a process identifier, more bits are necessary for ID indication, resulting in waste of system resources.

Referring to FIG. 1, when the HARQ process ID is allocated in sequence from the same HARQ process ID pool, if usage information on HARQ process IDs is not shared between the ID allocation agents (e.g., an eNB and a UE A), a HARQ process ID collision may occur at the common receiving UE (RX UE).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus that can remove factors causing system performance degradation when retransmission operation for communication between a user equipment and base station is introduced to device-to-device (D2D) communication.

Another aspect of the present disclosure is to provide a method and an apparatus that can produce optimum system performance by removing such performance degradation factors.

In accordance with an aspect of the present disclosure, a method of communication for a transmitting user equipment (TX UE) is provided. The method includes receiving, upon generation of data to be transmitted to a receiving UE (RX UE), allocation of resources to be used for D2D communication, transmitting a scheduling assignment (SA) containing identification information of at least one RX UE to the at least one RX UE, assigning at least one hybrid automatic repeat request (HARQ) process for the identification information of the at least one RX UE, and transmitting data to the at least one RX UE based on the HARQ process.

In accordance with another aspect of the present disclosure, a method of communication for a receiving user equipment (RX UE) is provided. The method includes determining whether destination identification information contained in a SA received from at least one TX UE is equal to identification information of the RX UE, assigning a HARQ process for the SA when the destination identification information is equal to the identification information of the RX UE, and receiving data from the at least one TX UE based on use of the HARQ process.

In accordance with another aspect of the present disclosure, a TX UE is provided. The TX UE includes a communication unit to communicate with another network entity and a control unit to control a process of receiving, upon generation of data to be transmitted to a RX UE, allocation of resources to be used for D2D communication, transmitting a SA containing identification information of at least one RX UE to the at least one RX UE, assigning at least one HARQ process for the identification information of the at least one RX UE, and transmitting data to the at least one RX UE based on the HARQ process.

In accordance with another aspect of the present disclosure, a RX UE is provided. The RX UE includes a communication unit to communicate with another network entity, and a control unit to control a process of determining whether destination identification information contained in a SA received from at least one TX UE is equal to identification information of the RX UE, assigning a HARQ process for the SA when the destination identification information is equal to the identification information of the RX UE, and receiving data from the at least one TX UE based on the HARQ process.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A, 9B, 10, 11, 12, 13, 14, and 15 are illustrations of HARQ entity assignment when device-to-device (D2D) traffic is separated according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, detailed descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
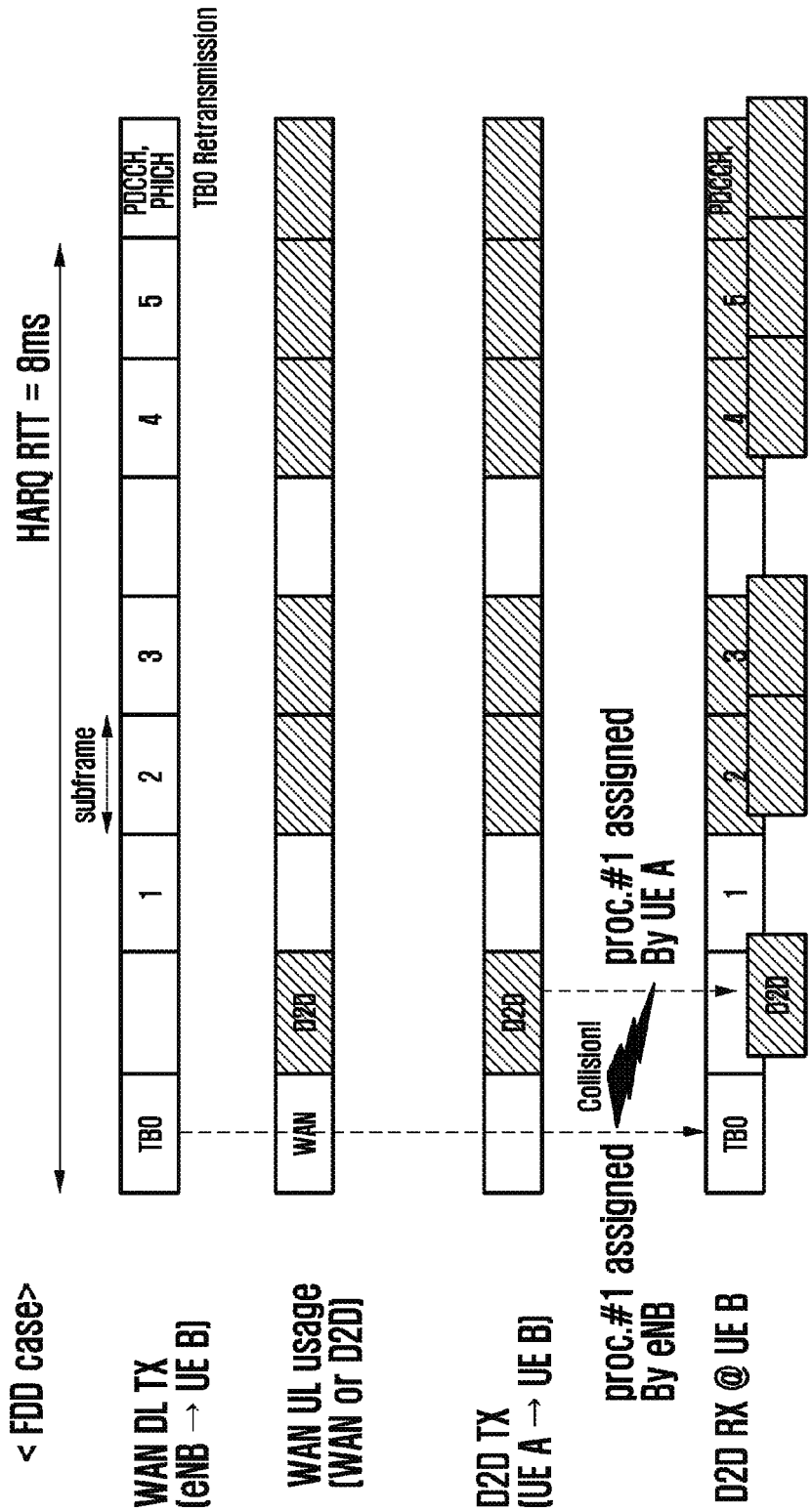
FIG. 1 illustrates occurrence of a hybrid automatic repeat request (HARQ) process identification (ID) collision according to the related art.
Figure 2:
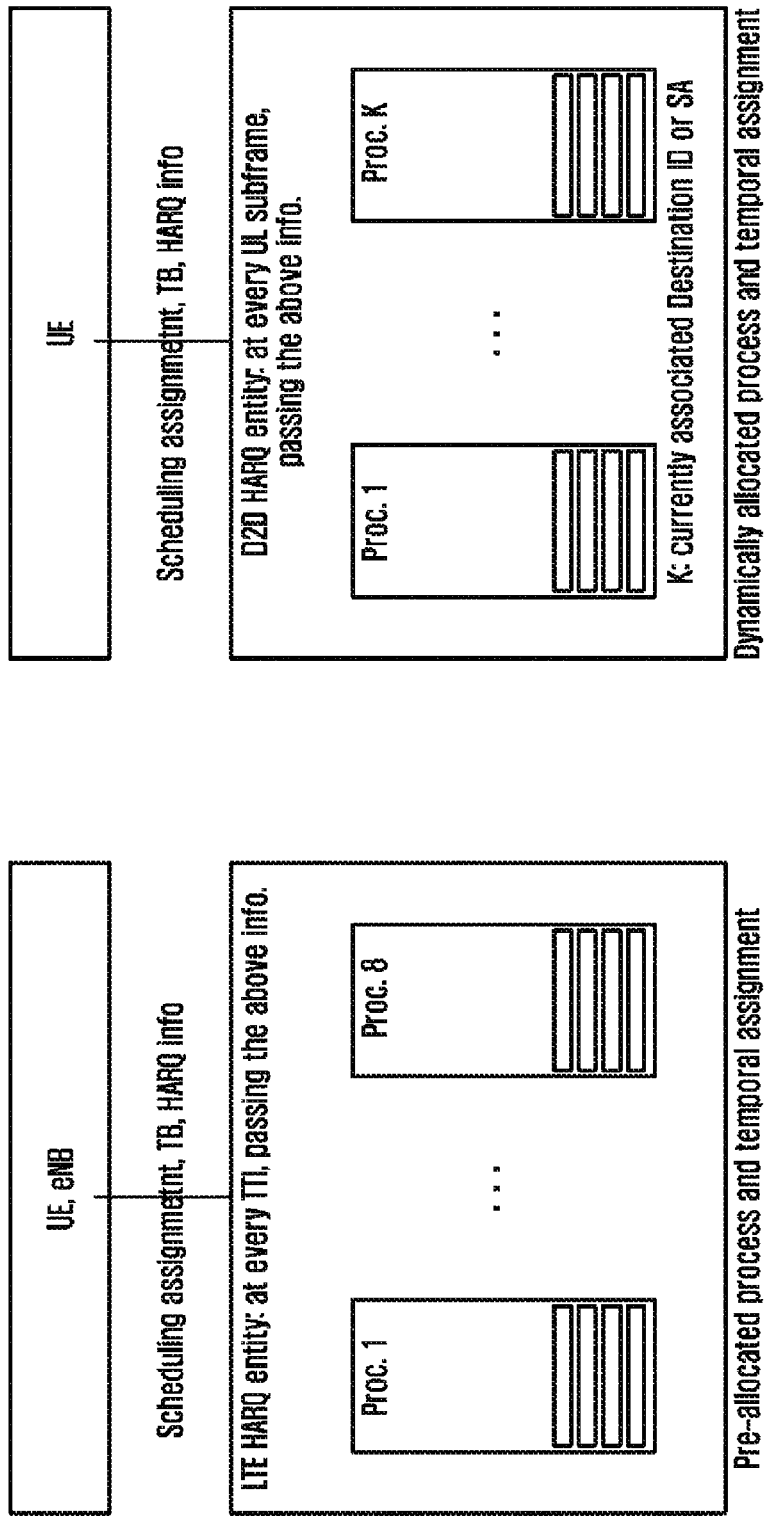
FIG. 2 illustrates realization of HARQ operation according to an embodiment of the present disclosure.

FIG. 2 illustrates realization of hybrid automatic repeat request (HARQ) operation according to an embodiment of the present disclosure.

Referring to FIG. 2, implementation based on processes that can be dynamically created and deleted may differ from implementation utilizing statically created processes according to the related art. For example, implementation of HARQ operation according to an embodiment of the present disclosure shown in the right part is different from implementation of HARQ operation according to the related art shown in the left part.

HARQ operation of the present disclosure is described below.

Figure 3:
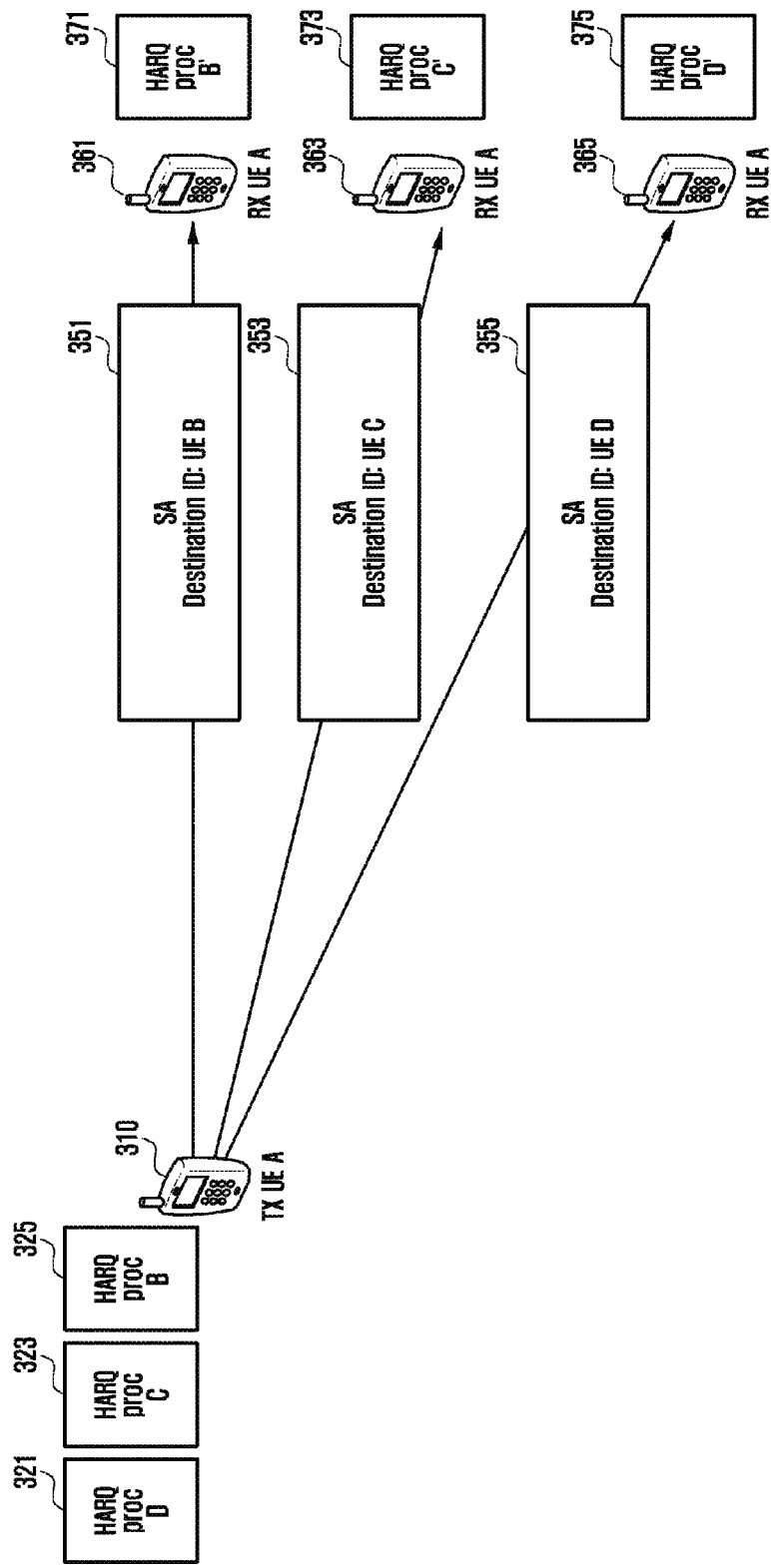
FIG. 3 illustrates HARQ process allocation according to an embodiment of the present disclosure.

FIG. 3 illustrates HARQ process allocation according to an embodiment of the present disclosure.

Referring to FIG. 3, one transmitting user equipment (TX UE) 310 may have data to be transmitted to a multiple of receiving user equipment (RX UEs) 361, 363 and 365. In this case, scheduling assignments (SAs) 351, 353 and 355 may be assigned to individual RX UE identifications (IDs).

For example, the TX UE 310 may have three RX UE destination IDs. For example, as the TX UE 310 has data to be transmitted to the RX UE B (361), RX UE C (363), and RX UE D (365), it may have "UE B", "UE C" and "UE D" as RX UE destination IDs.

For three destination IDs, the TX UE 310 may assign three HARQ entities or HARQ processes 321, 323, and 325 (if one process per entity).

Each RX UE 361, 363, or 365 may monitor all SAs 351, 353, and 355 transmitted from the TX UE 310 and find one of the SAs having the ID of the RX UE, and may assign one HARQ process 371, 373, or 375 for the SA having the ID thereof.

Hence, as shown, the TX UE 310 may assign three HARQ processes (or HARQ entities) 321, 323, and 325, and each RX UE 361, 363, or 365 may assign one HARQ process (or HARQ entity) 371, 373, or 375. The TX UE 310 and the RX UEs 361, 363 and 365 may perform transmission/reception processing by use of the assigned HARQ processes.

Figure 4:
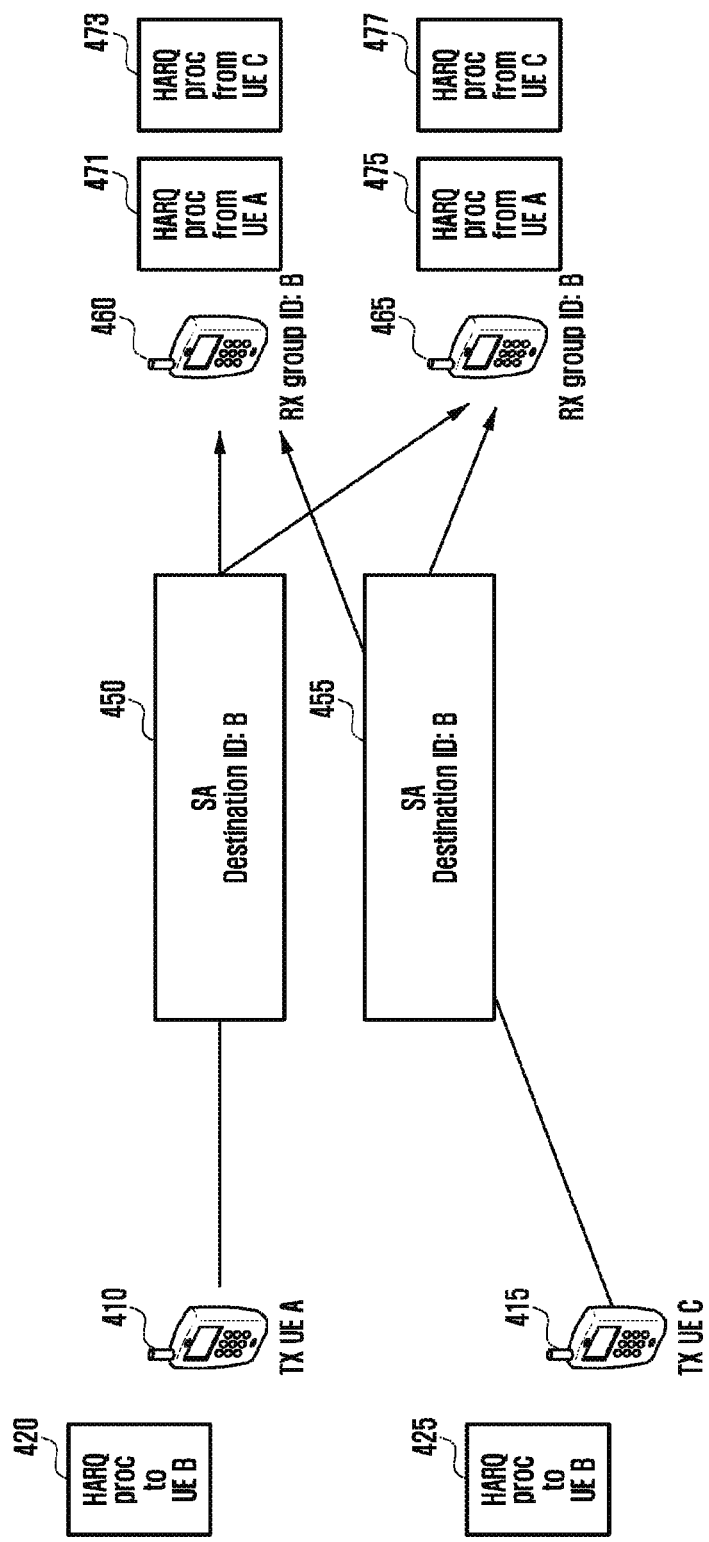
FIG. 4 illustrates HARQ process allocation according to an embodiment of the present disclosure.

FIG. 4 illustrates HARQ process allocation according to an embodiment of the present disclosure.

Referring to FIG. 4, one or more TX UEs 410 and 415 may have data to be transmitted to a group of RX UEs 460 and 465. Here, as two TX UEs 410 and 415 are present, different SAs having the same destination ID for the RX UEs 460 and 465 may be transmitted.

For example, the TX UE A (410) may have data to be transmitted to the RX UEs 460 and 465, and the TX UE C (415) may also have data to be transmitted to the RX UEs 460 and 465. Here, two or more RX UEs may be grouped into one group, and the destination ID for each RX UE may be identified by the RX UE group ID. Referring to FIG. 4, "RX UE group B" is used as an RX UE group ID.

Each TX UE 410 or 415 may assign one HARQ process 420 or 425 for each destination ID. Each RX UE 460 or 465 may monitor all SAs 450 and 455 transmitted by the TX UEs 410 and 415 to find an SA having the ID (group ID) thereof. In this instance, each RX UE 460 or 465 may find two SAs having the ID thereof. Each RX UE 460 or 465 may assign one HARQ process 471, 473, 475, or 477 for each of the found SAs (450, 455). For example, the first RX UE 460 may assign a HARQ process 471 for the first SA 450 and assign a HARQ process 473 for the second SA 455, and the second RX UE 465 may assign a HARQ process 475 for the first SA 450 and assign a HARQ process 477 for the second SA 455. The RX UEs 460 and 465 may use the HARQ processes at reception opportunities indicated by the time resource pattern (T-RPT) of each SA.

Hence, as shown, the TX UE A (410) may assign one HARQ process (or HARQ entity) 420, the TX UE B (415) may assign one HARQ process (or HARQ entity) 425, and each RX UE 460 or 465 may assign two HARQ processes (or HARQ entities) 471, 473, 475, or 477. The TX UE 310 and the RX UEs 361, 363, and 365 may perform transmission/reception processing by use of the assigned HARQ processes. The TX UEs 410 and 415 and the RX UEs 461 and 465 may perform transmission/reception processing by use of the assigned HARQ processes.

Figure 5:
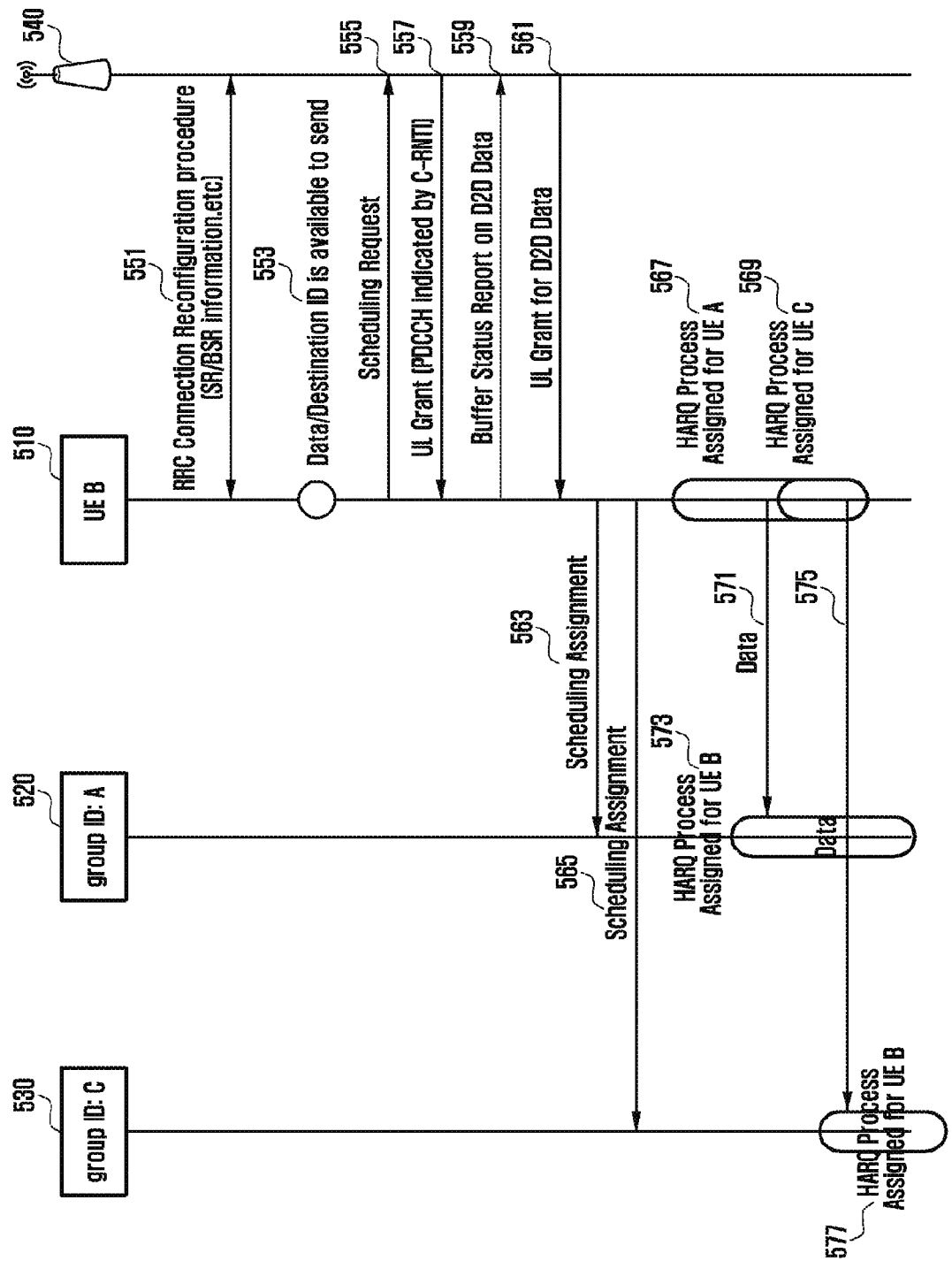
FIG. 5 is a sequence diagram describing HARQ processing according to an embodiment of the present disclosure.

FIG. 5 is a sequence diagram describing HARQ processing according to an embodiment of the present disclosure.

Referring to FIG. 5, the base station (i.e., an evolved Node B (eNB)) 540 may determine radio resources to be used for SA transmission. More specifically, at operation 551, the TX UE 510 receives a radio resource control (RRC) connection reconfiguration message containing access related information from the eNB 540. At operation 553, the TX UE 510 detects occurrence of device-to-device (D2D) data to be transmitted to at least one RX UE 520 or 530, and identify the destination ID for each RX UE 520 or 530. Alternatively, the TX UE may detect occurrence of D2D data first at operation 553 and receive access related information from the eNB at operation 551. This may also apply to other embodiments described below.

At operation 555, the TX UE 510 transmits a scheduling request message to the eNB 540. At operation 557, the TX UE 510 receives allocation of downlink resources from the eNB 540. At operation 559, the TX UE 510 transmits a buffer status report (BSR) message to the eNB 540 to notify the eNB 540 of the amount of D2D data to be transmitted. At operation 561, the TX UE 510 receives allocation of resources from the eNB 540.

At operation 563 and operation 565, the TX UE 510 transmits SAs containing information on the allocated resources respectively to the RX UE 520 and 530. As described before, as each SA has a destination ID, the RX UE having received an SA may identify whether the SA is addressed thereto. Referring to FIG. 5, the SAs have "group A" and "group C" as a destination ID. At operation 567 and operation 569, the TX UE 510 assigns one HARQ process for the first RX UE 520 and assigns one HARQ process for the second RX UE 530.

At operation 573, the first RX UE 520 assigns one HARQ process according to the received SA. At operation 577, the second RX UE 530 assigns one HARQ process according to the received SA.

Meanwhile, the TX UE 510 may assign HARQ processes for the first RX UE 520 and second RX UE 530 immediately after transmitting the SAs. Alternatively, the TX UE 510 may assign HARQ processes for the first RX UE 520 and second RX UE 530 immediately before transmitting data at operation 571 or 575.

Each of the RX UEs 520 and 530 may assign a HARQ process for the TX UE 510 immediately after receiving the SA. Alternatively, each of the RX UEs 520 and 530 may assign a HARQ process for the TX UE 510 when first data is received at operation 571 or 575.

Figure 6:
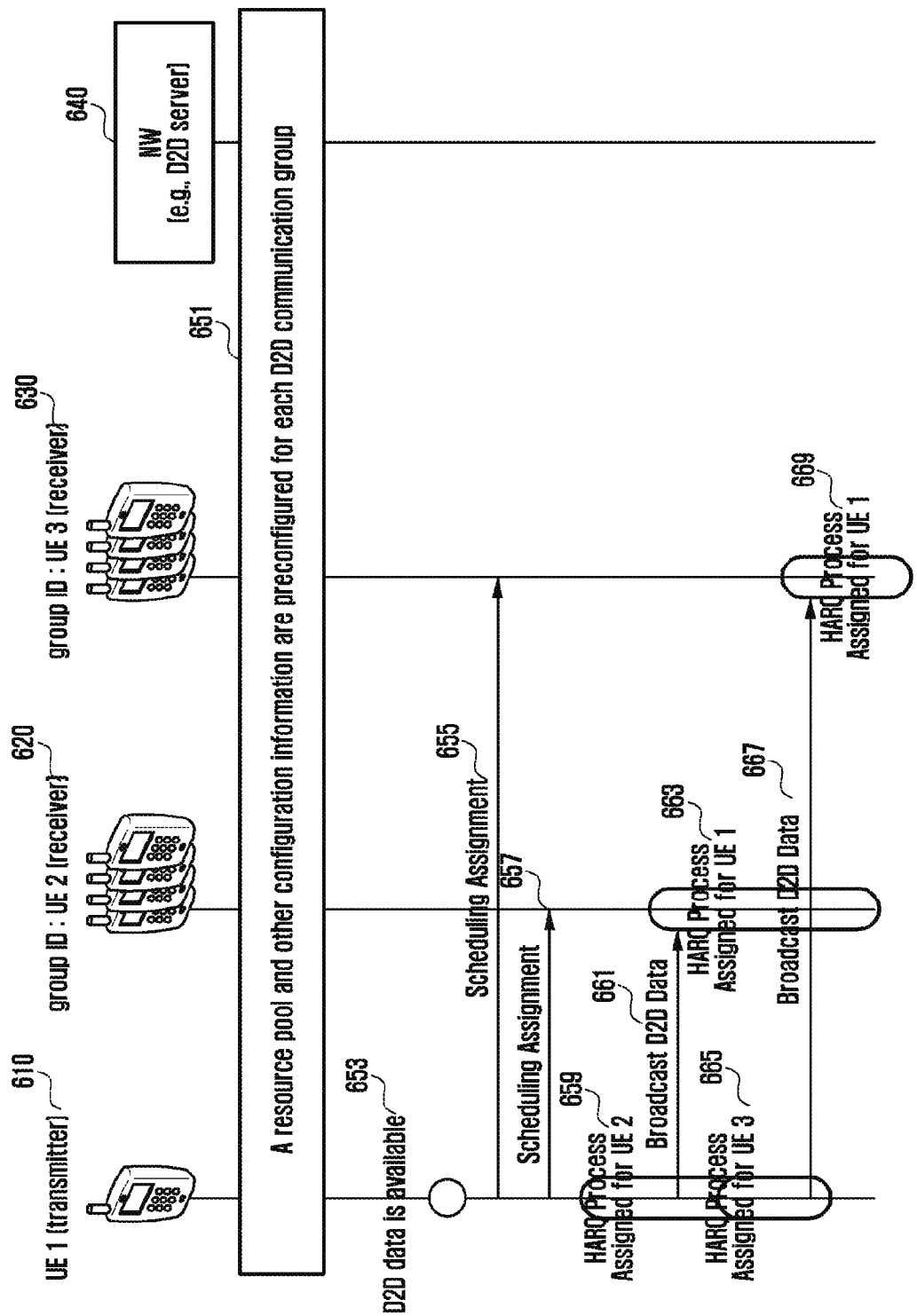
FIG. 6 is a sequence diagram describing HARQ processing according to an embodiment of the present disclosure.

FIG. 6 is a sequence diagram describing HARQ processing according to an embodiment of the present disclosure.

Referring to FIG. 6, a D2D server 640 may pre-store information regarding radio resources usable for SA transmission as system information (e.g., an RRC signaling or a system information block (SIB)). For example, at operation 651, the information on radio resources usable for SA transmission may be stored in the network (e.g., a D2D server) 640 as system information, so that resource pool information and other necessary information may be shared between UEs 610, 620, and 630.

At operation 653, the first UE (TX UE) 610 detects generation of data to be transmitted. At operation 655 and operation 657, the TX UE 610 transmits SAs containing a suitable destination ID to the RX UEs 620 and 630 according to the shared information. At operation 659 and operation 665, the TX UE 610 assigns a HARQ process for each of the first RX UE 620 and second RX UE 630.

Upon SA reception, at operation 663, the RX UE 620 assigns a HARQ process for the SA containing the ID of the RX UE 620. Upon SA reception, at operation 669, the RX UE 630 assigns a HARQ process for the SA containing the ID of the RX UE 630.

Meanwhile, the TX UE 610 may assign HARQ processes for the first RX UE 620 and second RX UE 630 immediately after transmitting the SAs at operations 655 and 657. Alternatively, the TX UE 610 may assign HARQ processes for the first RX UE 620 and second RX UE 630 immediately before transmitting data at operations 661 and 667.

Each of the RX UEs 620 and 630 may assign a HARQ process for the TX UE 610 immediately after receiving the SA at operation 655 or 657. Alternatively, each of the RX UEs 620 and 630 may assign a HARQ process for the TX UE 610 when first data is received at operation 661 or 667.

Figure 7:
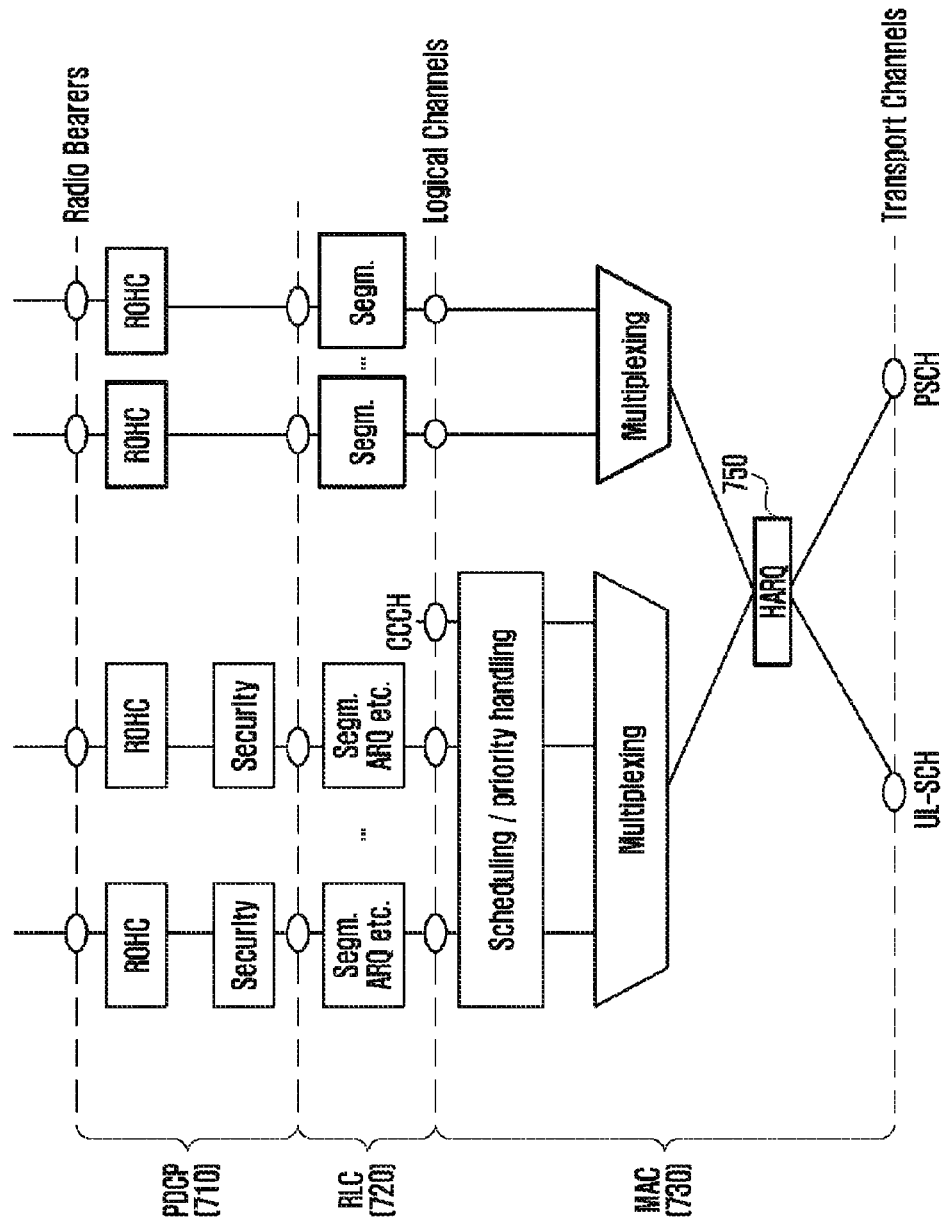
FIG. 7 illustrates configuration and assignment of HARQ entities according to an embodiment of the present disclosure.

FIG. 7 illustrates configuration and assignment of HARQ entities according to an embodiment of the present disclosure.

Figure 8:
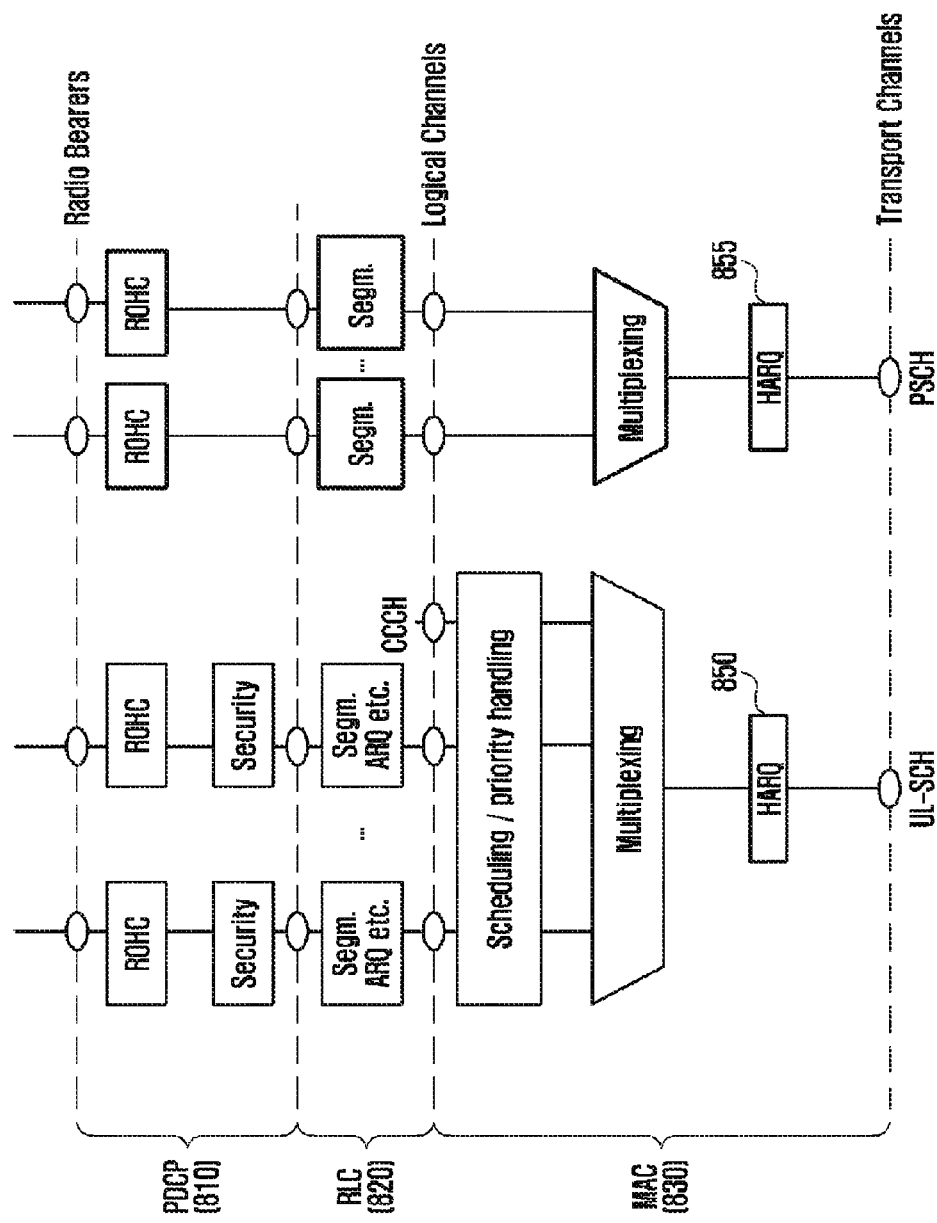
FIG. 8 illustrates configuration and assignment of HARQ entities according to an embodiment of the present disclosure.

FIG. 8 illustrates configuration and assignment of HARQ entities according to an embodiment of the present disclosure.

Assignment of HARQ entities may be designed according to types of traffic, such as WAN traffic and D2D traffic.

Referring to FIG. 7, a common HARQ entity 750 may handle different types of traffic. For example, the HARQ entity 750 may handle both WAN traffic and D2D traffic. The traffic type may be identified using scheduling information (e.g., a T-RPT and a frequency offset indicator). The HARQ process associated with the HARQ entity 750 may be used for WAN (eNB) or for D2D (each D2D UE). HARQ process IDs for D2D traffic and WAN traffic may be separately selected from different ID pools.

FIG. 7 shows the layer 2 architecture. At a PDCP layer 710, functions for robust header compression (ROHC) and security are performed. At an RLC layer 720, functions for segmentation and ARQ are performed for WAN RLC, and functions only for segmentation are performed for D2D RLC. At a media access control (MAC) layer 730, higher layer data units for both WAN traffic and D2D traffic are multiplexed into MAC protocol data units (PDUs).

For WAN traffic, a process ID may be selected from the WAN process ID pool according to a given rule and assigned to a WAN HARQ process. For D2D traffic, a process ID may be assigned to a D2D HARQ process according to a given rule based on the destination ID and originality (or redundancy) of data.

Referring to FIG. 8, a PDCP layer 810, an RLC layer 820, and a MAC layer 830 correspond to the PDCP layer 710, the RLC layer 720, and the MAC layer 730 of FIG. 7 and two separate HARQ entities 850 and 855 may handle WAN traffic and D2D traffic, respectively. For example, the HARQ entity 850 may handle WAN traffic, and the HARQ entity 855 may handle D2D traffic. Here, eight HARQ processes may be present for WAN traffic as in the case of the current standard, and may execute in a manner complementary to the case of D2D traffic. For example, as resources assigned to a D2D subframe are useable only for D2D operation, WAN uplink resources and D2D transmission resources do not overlap. The HARQ entity 855 for D2D traffic may assign the process ID according to a given rule based on TX or RX D2D UE, the ordinal number of transmission data in a transmission/reception pair, and originality (or redundancy) of data.

FIGS. 9A, 9B, 10, 11, 12, 13, 14, and 15 are illustrations of HARQ entity assignment when D2D traffic is separated according to an embodiment of the present disclosure.

Referring to FIGS. 9A, 9B, 10, 11, 12, 13, 14, and 15, when the HARQ entity is separately assigned for D2D traffic as described in connection with FIG. 8, HARQ entity assignment may be performed with regard to the assignment agent in various manners as depicted in FIGS. 9A, 9B, 10, 11, 12, 13, 14, and 15.

First, the TX UE may assign a HARQ entity for each destination UE and the RX UE may assign a HARQ entity for each source UE. For example, according to the existing concept of the HARQ entity, one HARQ entity may be assigned for a source-destination pair. In this case, one HARQ entity may be created per source-destination pair regardless of the number of HARQ processes associated with one HARQ entity. Hence, when the TX UE or the RX UE has multiple destination IDs or source IDs for transmission or reception, the TX UE or the RX UE may have multiple HARQ entities for individual pairs. This scheme may be used when HARQ process interleaving is needed for each target UE.

Second, one HARQ entity may be assigned per TX UE or RX UE. For example, unlike the existing concept of the HARQ entity, the HARQ entity may be not in a position to manage HARQ processes associated with a source-destination pair. This is because the HARQ entity may be considered as a program or function managing a set of processes. In such a case, for system simplification, one HARQ entity may be assigned per TX UE or RX UE, and HARQ processes may be assigned for multiple destination IDs or sources within the scope of the HARQ entity. In this scheme, a HARQ process may be assigned from a pre-configured pool of HARQ processes according to a preset rule, resulting in HARQ process reuse. This scheme may be used when creation and deletion of a HARQ process places a heavy load on the system.

Third, one HARQ process may be assigned per HARQ entity. As a first embodiment of the present disclosure, when only one HARQ process is assigned per source-destination pair, as HARQ process management has no meaning, the HARQ entity directly means the HARQ process. As a second embodiment of the present disclosure, this scheme may be identical to assignment of one HARQ process per source-destination pair.

Referring to FIG. 9A, a PDCP layer 910, an RLC layer 920, and a MAC layer 930 correspond to the PDCP layer 710, the RLC layer 720, and the MAC layer 730 of FIG. 7 and in the TX UE, one HARQ process 960 or 965 is assigned per destination ID, and one HARQ process 960 or 965 is assigned for each HARQ entity 950 or 955.

Figure 9B:
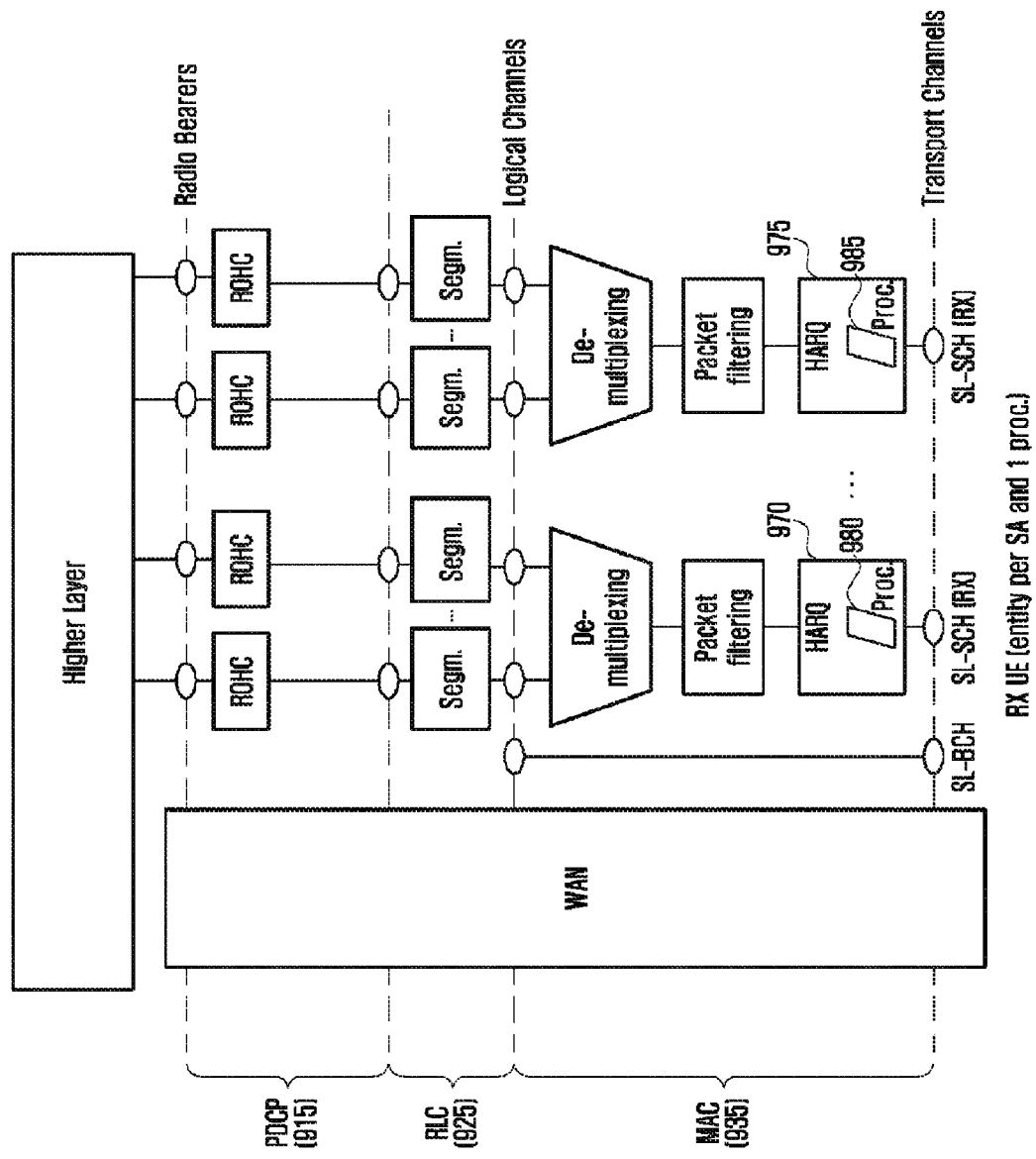

Referring to FIG. 9B, a PDCP layer 915, an RLC layer 925, and a MAC layer 935 correspond to the PDCP layer 710, the RLC layer 720, and the MAC layer 730 of FIG. 7 and in the RX UE, one HARQ process 980 or 985 is assigned per SA containing the ID of the RX UE, and one HARQ process 980 or 985 is assigned for each HARQ entity 970 or 975.

Referring to FIG. 10, a PDCP layer 1010, an RLC layer 1020, and a MAC layer 1030 correspond to the PDCP layer 710, the RLC layer 720, and the MAC layer 730 of FIG. 7 and in the TX UE, one HARQ process 1060 or 1065 is assigned per destination ID, and one HARQ entity 1050 manages all HARQ processes 1060 and 1065.

Figure 11:
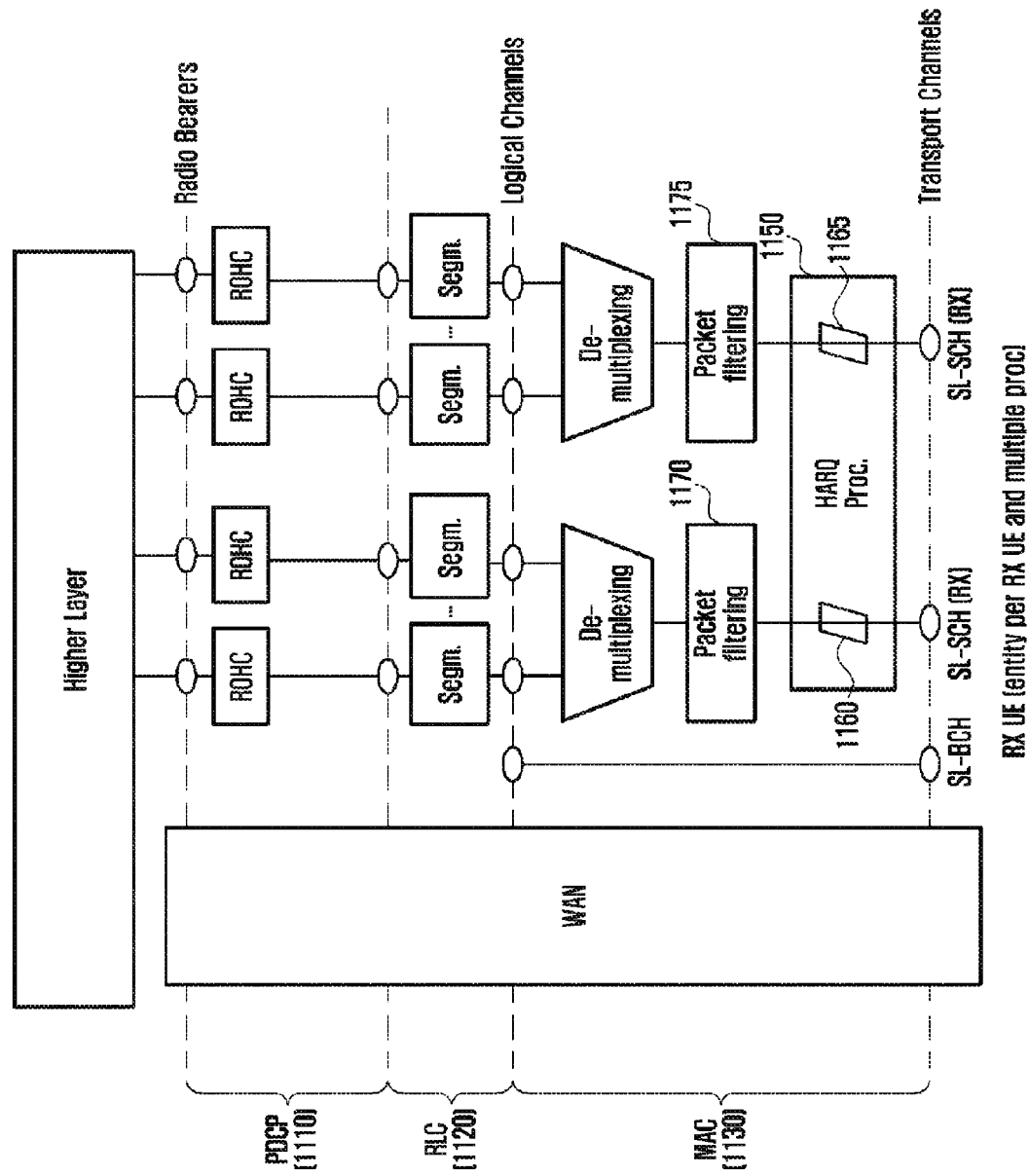

Referring to FIG. 11, a PDCP layer 1110, an RLC layer 1120, and a MAC layer 1130 correspond to the PDCP layer 710, the RLC layer 720, and the MAC layer 730 of FIG. 7 and in the RX UE, one HARQ process 1160 or 1165 is assigned per SA containing the ID of the RX UE, and one HARQ entity 1150 manages all HARQ processes 1160 and 1165 and packet filtering operations 1170 and 1175.

Figure 12:
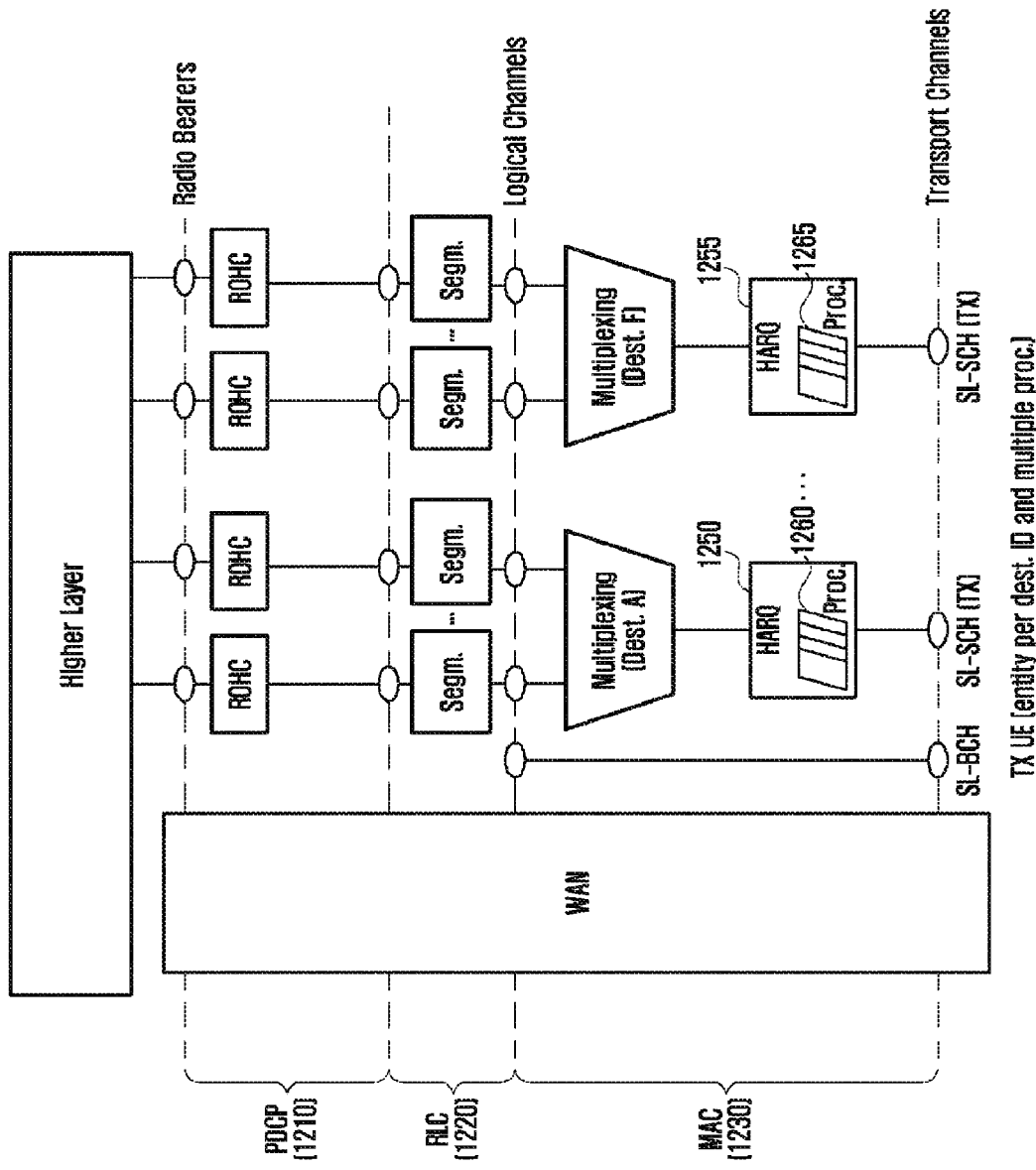

Referring to FIG. 12, a PDCP layer 1210, an RLC layer 1220, and a MAC layer 1230 correspond to the PDCP layer 710, the RLC layer 720, and the MAC layer 730 of FIG. 7 and in the TX UE, one HARQ process group 1260 or 1265 including at least one HARQ process is assigned per destination ID, and each HARQ entity 1250 or 1255 manages one HARQ process group 1260 or 1265. Here, HARQ operation may have to handle ACK/NACK processing through multiple HARQ processes.

Figure 13:
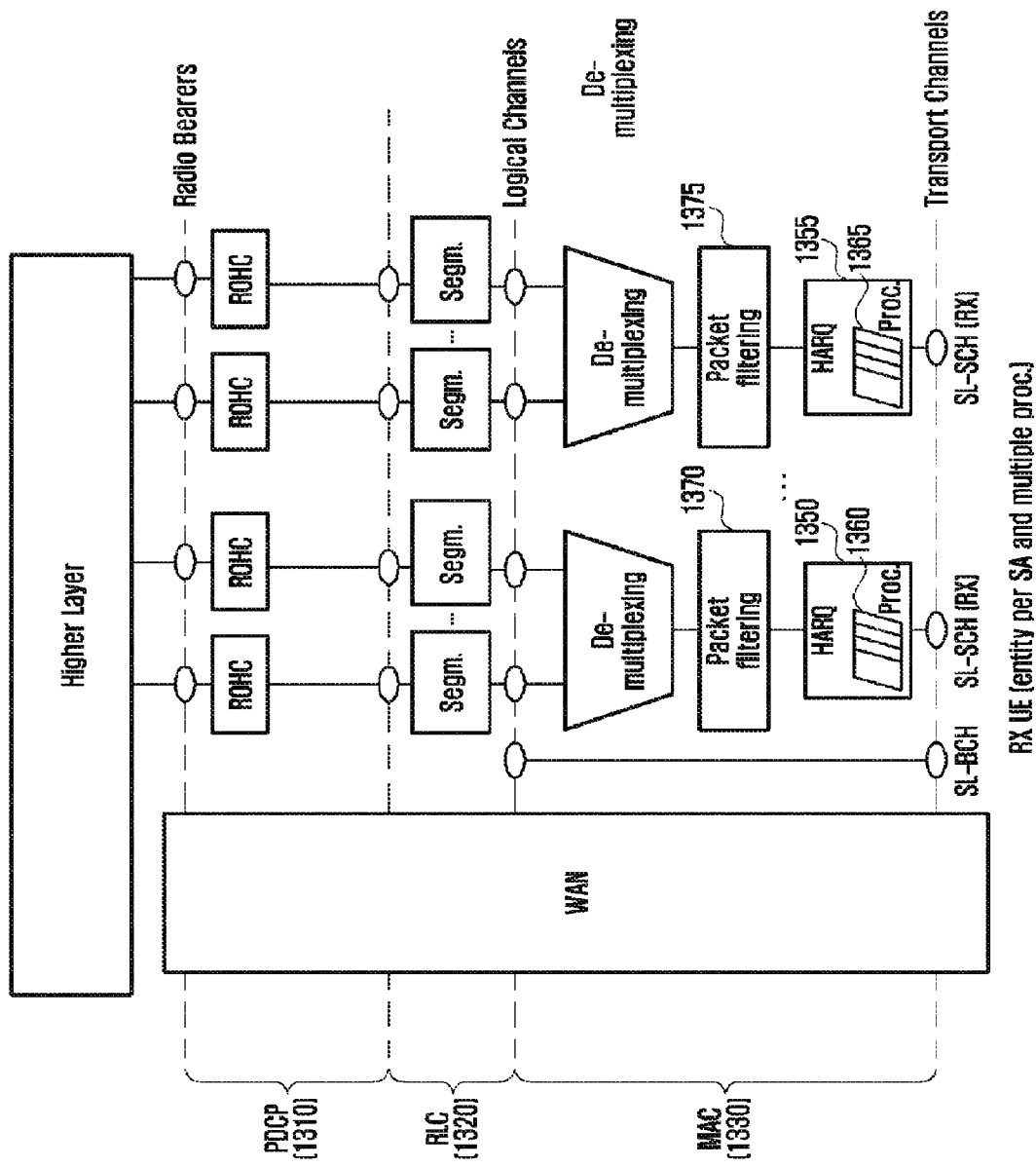

Referring to FIG. 13, a PDCP layer 1310, an RLC layer 1320, and a MAC layer 1330 correspond to the PDCP layer 710, the RLC layer 720, and the MAC layer 730 of FIG. 7 and in the RX UE, one HARQ process group 1360 or 1365 including at least one HARQ process is assigned per SA containing the ID of the RX UE, and each HARQ entity 1350 or 1355 manages one HARQ process group 1360 or 1365 and one packet filtering operation 1370 or 1375.

Figure 14:
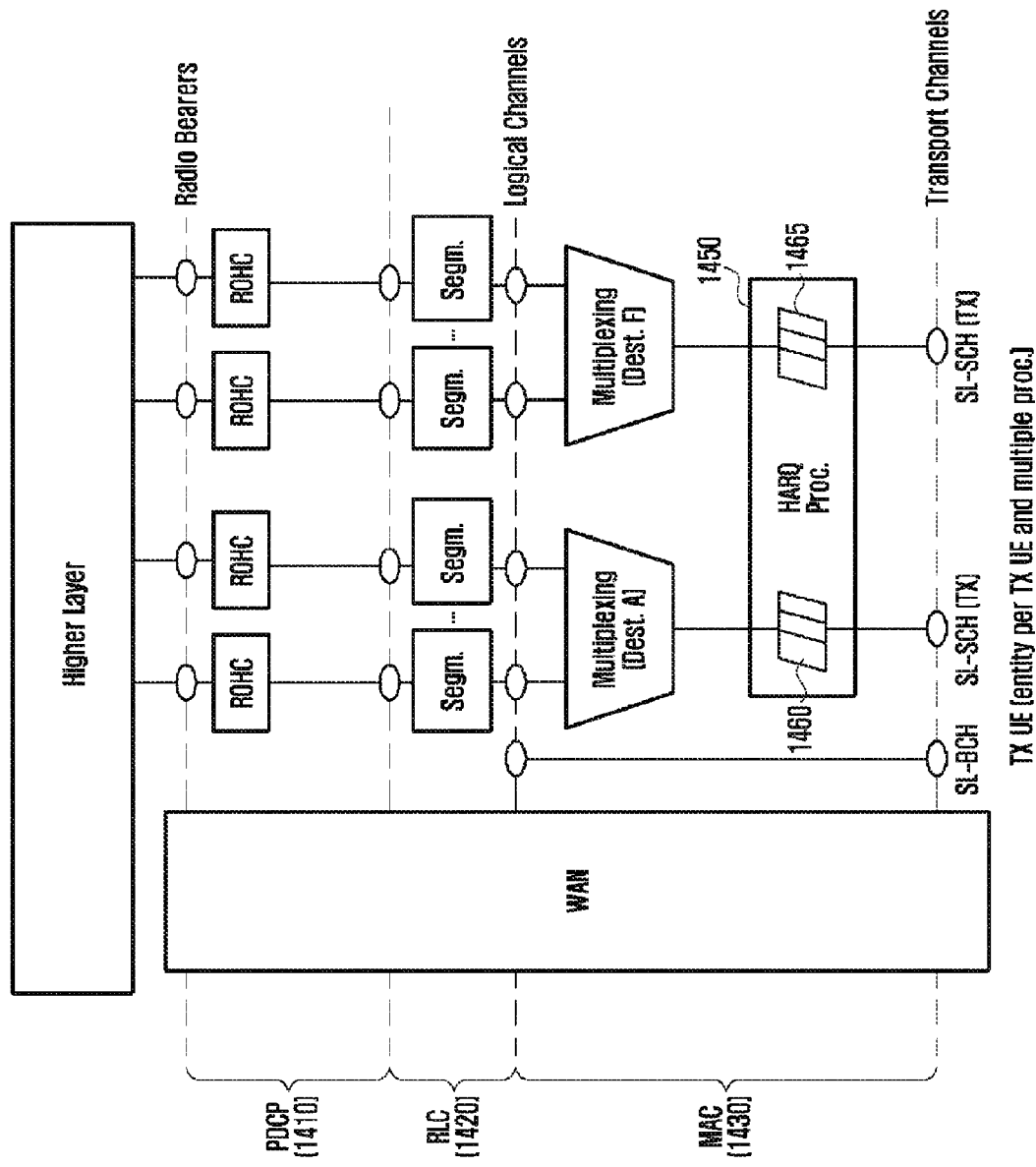

Referring to FIG. 14, a PDCP layer 1410, an RLC layer 1420, and a MAC layer 1430 correspond to the PDCP layer 710, the RLC layer 720, and the MAC layer 730 of FIG. 7 and in the TX UE, one HARQ process group 1460 or 1465 including at least one HARQ process is assigned per destination ID, and one HARQ entity 1450 manages all HARQ process groups 1460 or 1465.

Figure 15:
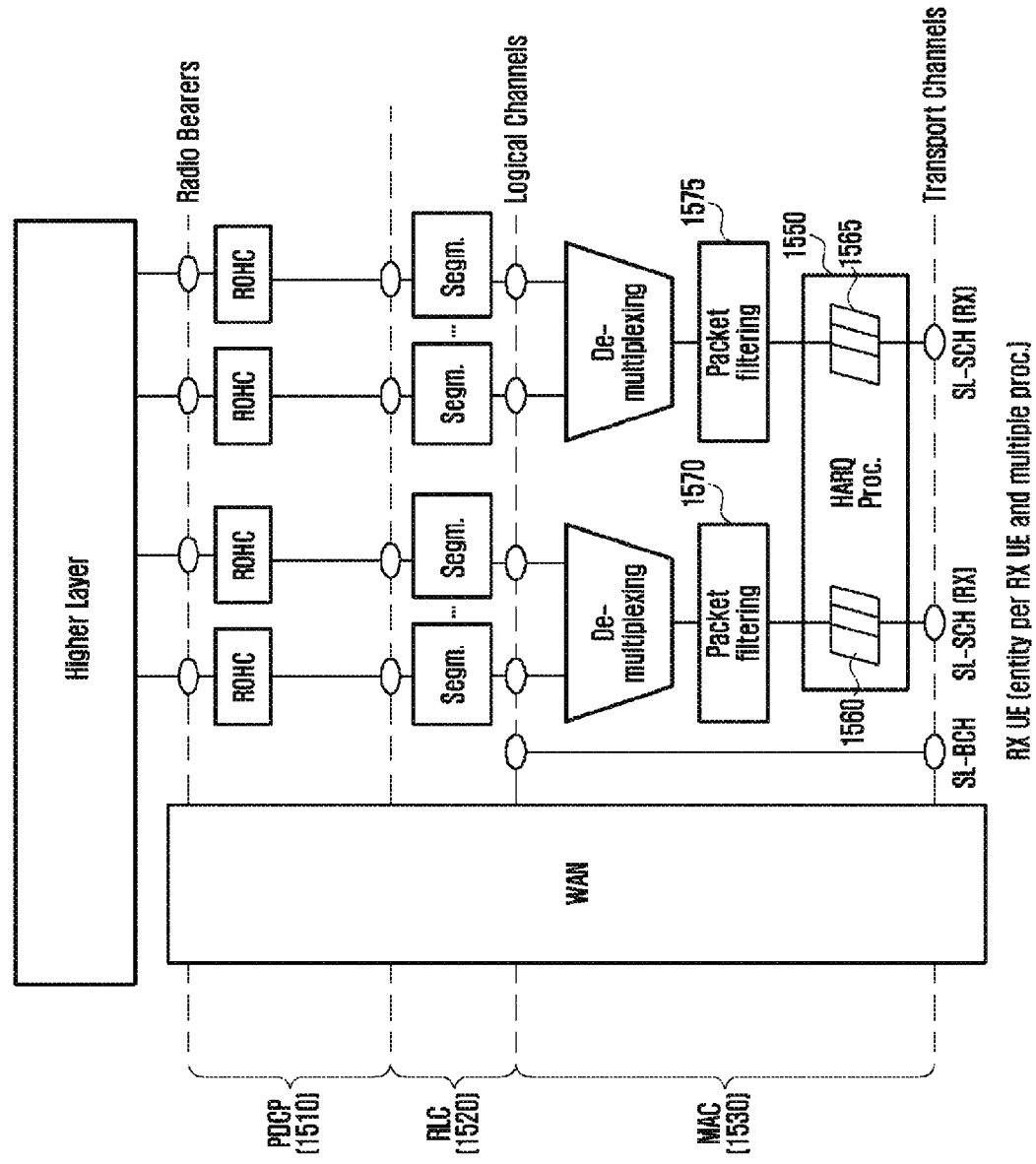

Referring to FIG. 15, a PDCP layer 1510, an RLC layer 1520, and a MAC layer 1530 correspond to the PDCP layer 710, the RLC layer 720, and the MAC layer 730 of FIG. 7 and in the RX UE, one HARQ process group 1560 or 1565 including at least one HARQ process is assigned per SA containing the ID of the RX UE, and one HARQ entity 1550 manages all HARQ process groups 1560 and 1565 and packet filtering operations 1570 and 1575.

Figure 16:
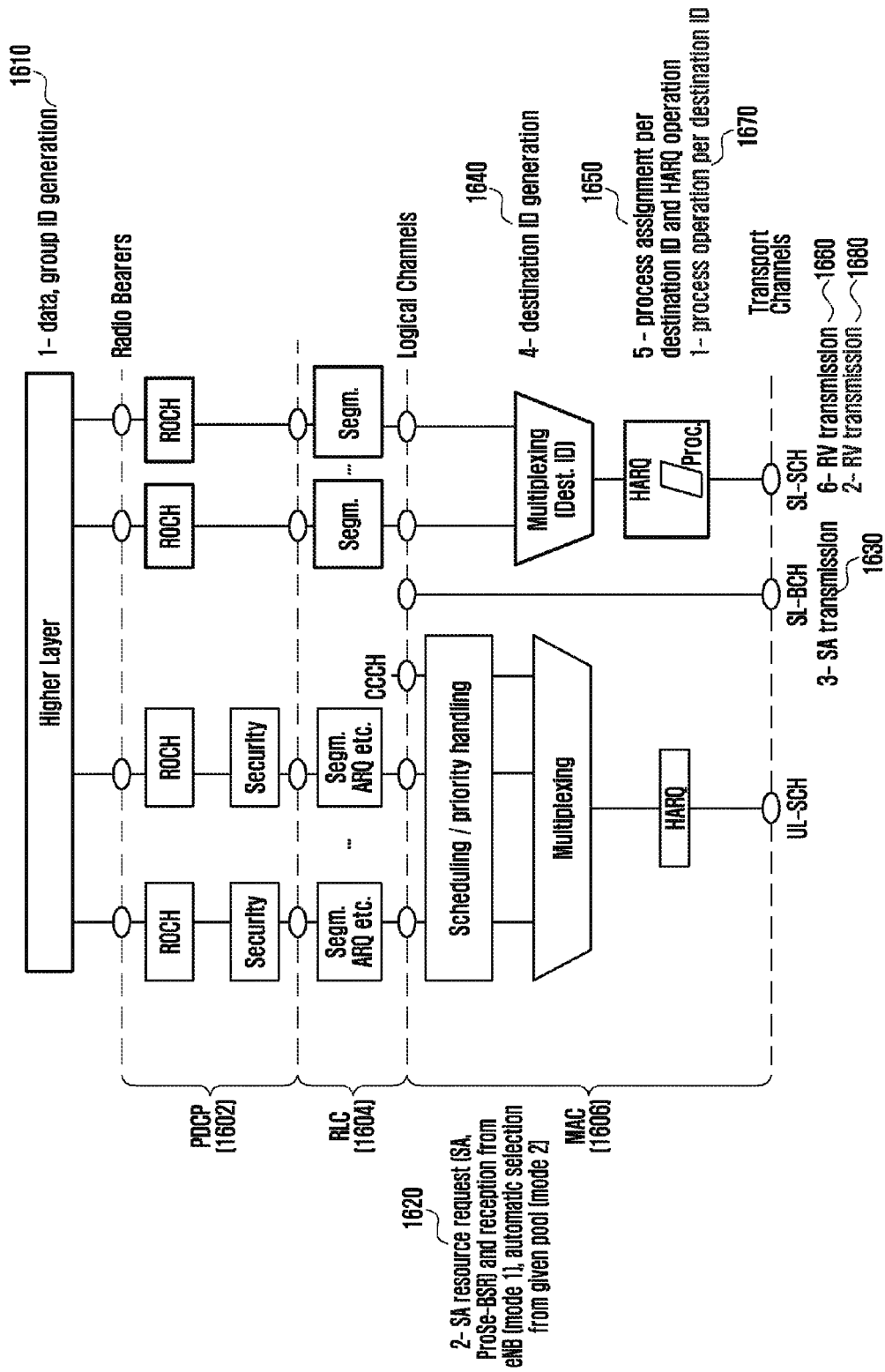
FIG. 16 illustrates HARQ processes assignment in a transmitting user equipment (UE) according to an embodiment of the present disclosure.

FIG. 16 illustrates HARQ processes assignment in a transmitting UE according to an embodiment of the present disclosure.

Figure 17:
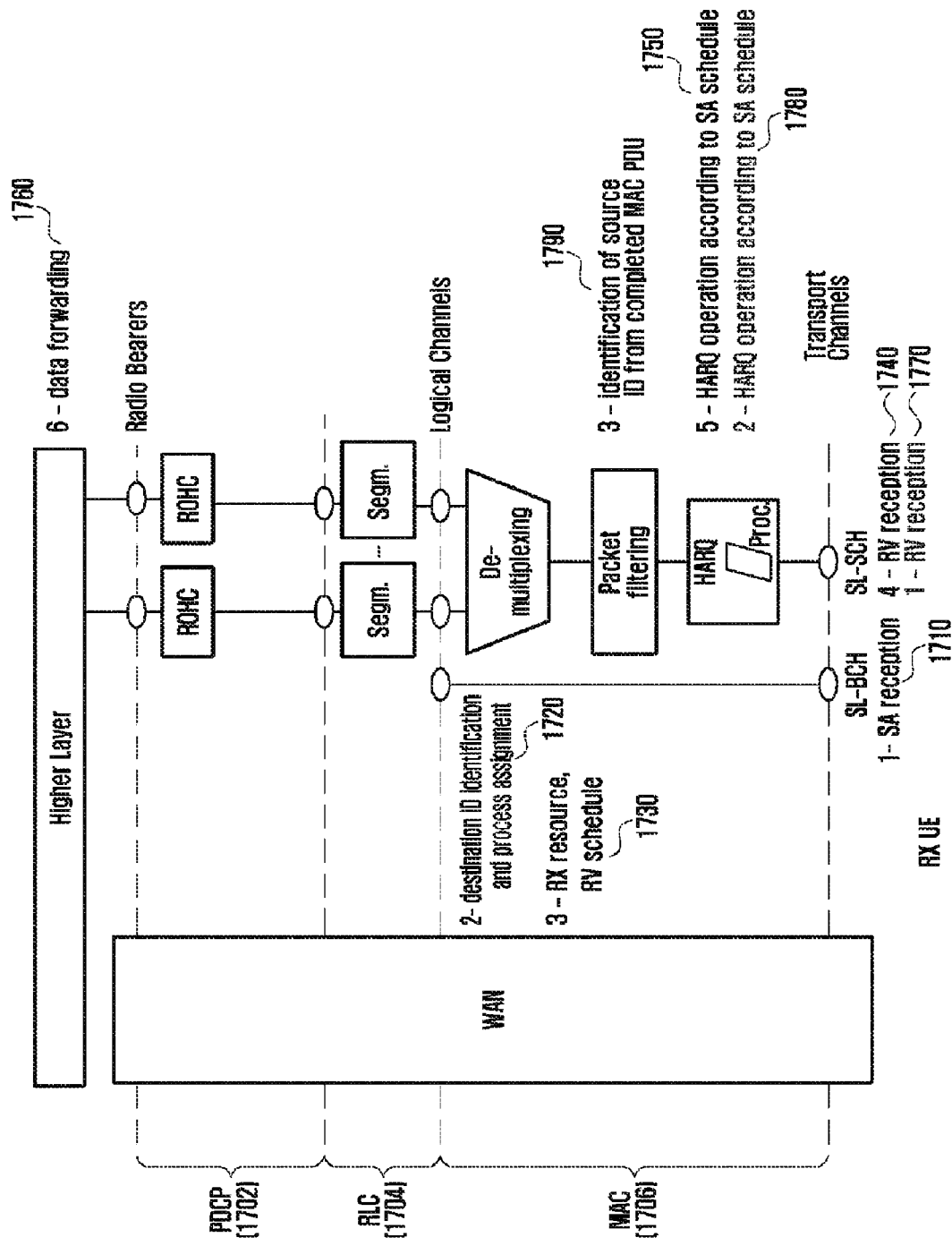
FIG. 17 illustrates HARQ processes assignment in a receiving UE according to an embodiment of the present disclosure.

FIG. 17 illustrates HARQ processes assignment in a receiving UE according to an embodiment of the present disclosure.

Figure 18:
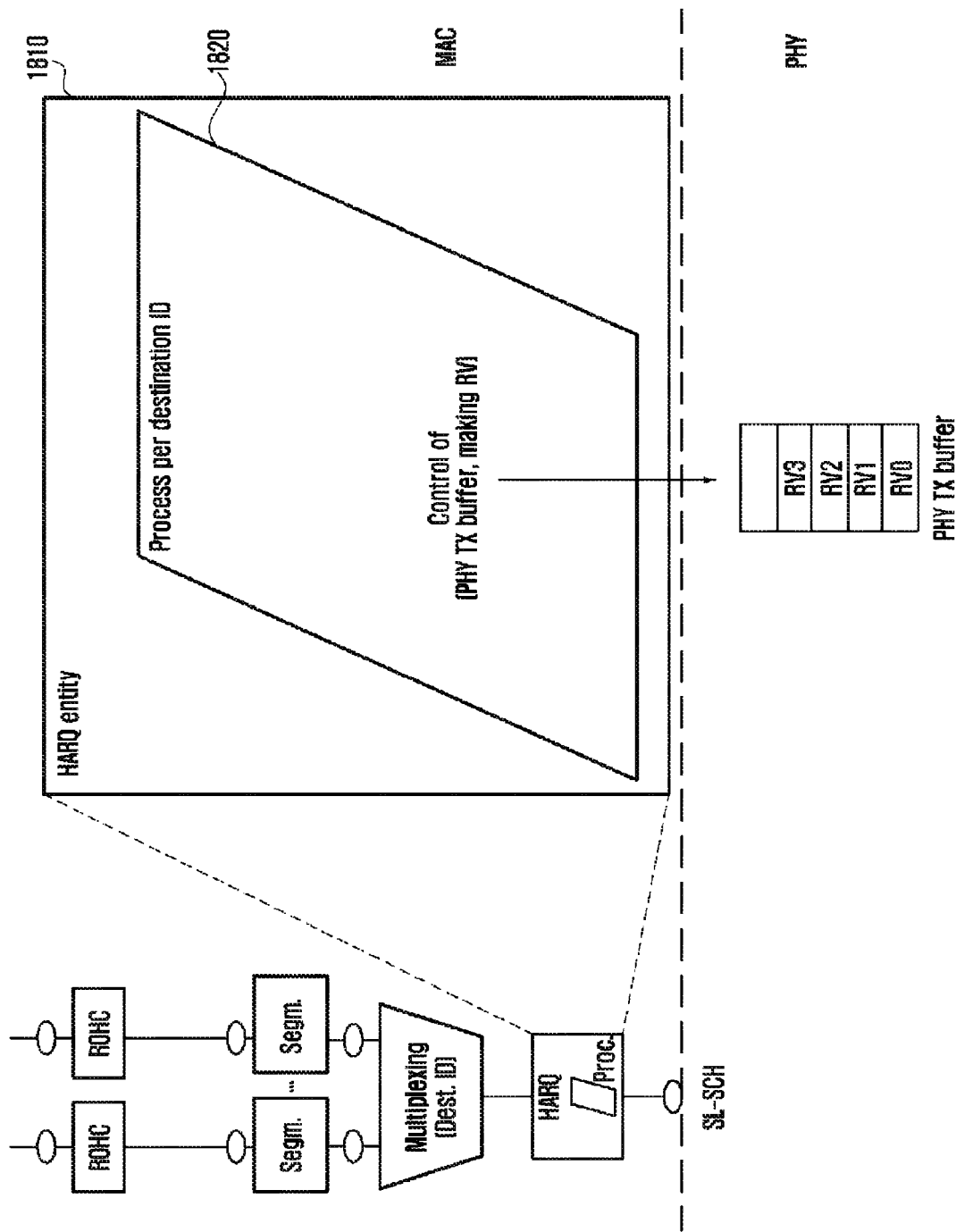
FIG. 18 illustrates a HARQ entity and HARQ processes in a transmitting UE according to an embodiment of the present disclosure.

FIG. 18 illustrates a HARQ entity and HARQ processes in a transmitting UE according to an embodiment of the present disclosure.

Figure 19:
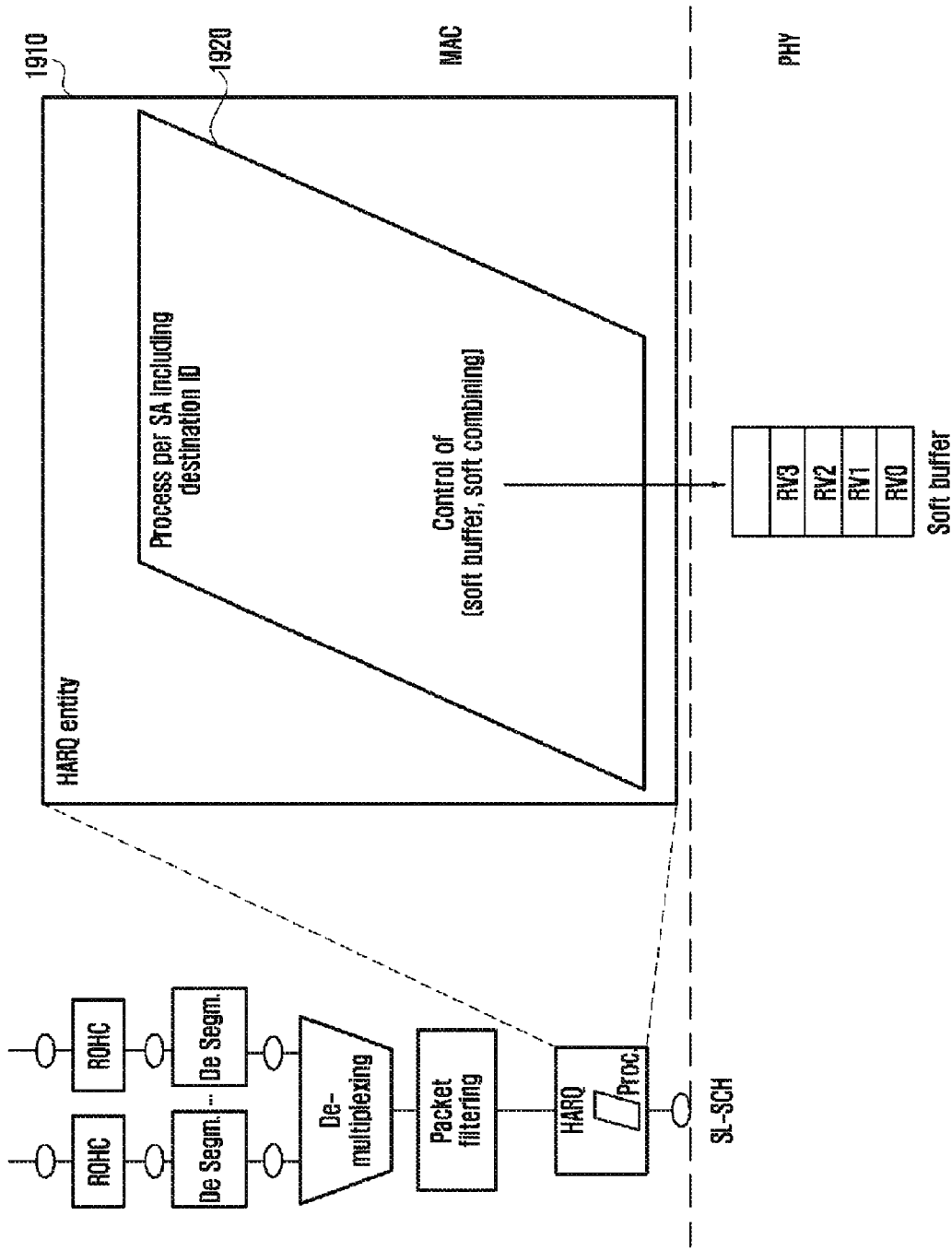
FIG. 19 illustrates a HARQ entity and HARQ processes in a receiving UE according to an embodiment of the present disclosure.

FIG. 19 illustrates a HARQ entity and HARQ processes in a receiving UE according to an embodiment of the present disclosure.

As described before, data transmission and reception take place along a pair of source and destination, and retransmissions also take place along the same pair. Source-destination pairs may be referred to in various ways. As source-destination pairs are a criterion for assignment of HARQ processes, they are to be specified in both the TX UE and the RX UE. In the TX UE, a source-destination pair may be specified with respect to the destination ID.

Referring to FIGS. 16 and 17, PDCP layers 1602 and 1702, RLC layers 1604 and 1704, and MAC layers 1606 and 1706 correspond to the PDCP layer 710, the RLC layer 720, and the MAC layer 730 of FIG. 7 and destination ID generation and HARQ process assignment are depicted on a layer basis. As shown, as the SA carries RV 0 data (original version) through broadcasting, it does not pass through HARQ processing.

More specifically, in FIG. 16, at operation 1610, data and a group ID may be generated at the higher layer. The group ID may have a size of 24 bits. At operation 1620, the TX UE may transmit an SA resource request (scheduling request, ProSe-BSR) to the eNB through WAN traffic and receive resource allocation from the eNB. Alternatively, a resource usable for the SA may be selected from a pre-configured pool. At operation 1630, the TX UE may transmit the SA. At operation 1640, a destination ID may be generated. Here, the destination ID may be generated at the time of operation 1620 for requesting and obtaining the SA resource, and the SA transmitted at operation 1630 contains the destination ID. As the SA carries RV 0 data through broadcasting, it does not pass through HARQ processing. At operation 1650, the TX UE may assign a HARQ process per destination ID and initiate HARQ processing. Here, as shown in FIG. 18, the TX UE may generate redundancy versions (RVs) and store the RVs in the PHY TX buffer. Thereafter, at operation 1660, the TX UE may transmit an RV. At operation 1670, the TX UE may execute the HARQ process per destination ID. At operation 1680, the TX UE may transmit an RV stored in the PHY TX buffer. RV transmission may be performed four times.

A description is given of RX UE operation with reference to FIG. 17. At operation 1710, the RX UE may receive an SA. At operation 1720, the RX UE determines the destination ID of the SA to identify whether the SA is addressed thereto, and assign a HARQ process if the SA is addressed to the TX UE. At operation 1730, the RX UE may schedule reception resources and RVs. At operation 1740, the RX UE may receive an RV. At operation 1750, the RX UE may perform HARQ operation according to the SA schedule. At operation 1760, data may be forwarded to the higher layer. At operation 1770, an RV may be received. At operation 1780, HARQ operation may be performed according to the SA schedule.

Referring to FIGS. 18 and 19, HARQ entities 1810 and 1910 and HARQ processes per destination ID 1820 and 1920 in a transmitting UE and in a receiving UE are illustrated. Here, as shown in FIG. 19, the RX UE may store received RVs in the soft buffer. At operation 1790, the RX UE may identify the source ID from the completed MAC PDU.

Figure 20:
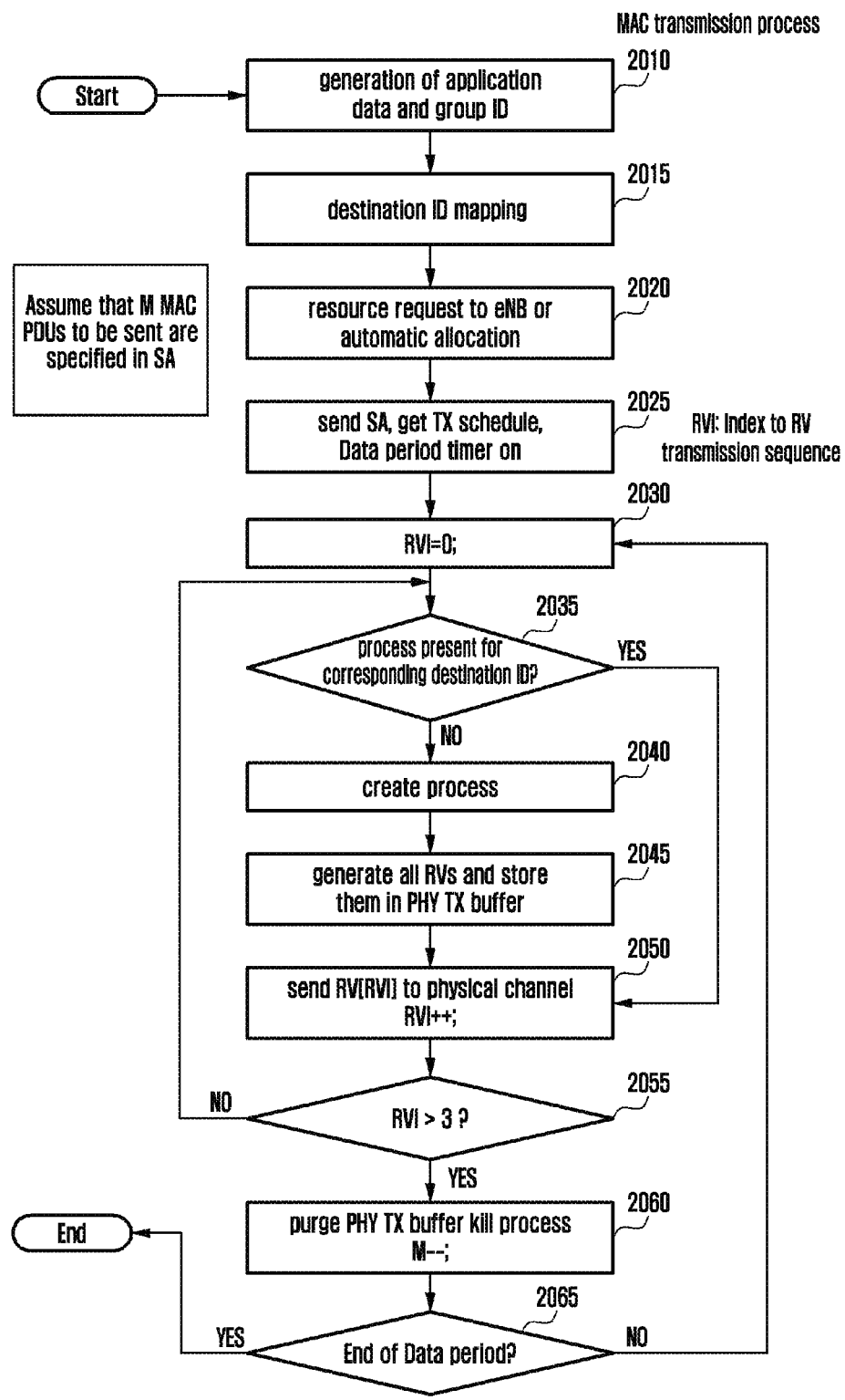
FIG. 20 is a flowchart for HARQ processing in a transmitting UE according to an embodiment of the present disclosure.

FIG. 20 is a flowchart for HARQ processing in a transmitting UE according to an embodiment of the present disclosure.

Referring to FIG. 20, at operation 2010, a specific application at the TX UE generates a target ID (e.g., a group ID or a user ID) and data to be transmitted. At operation 2015, the TX UE converts the target ID into a destination ID preassigned by the ProSe function. Here, the destination ID may have a size of 48 bits.

At operation 2020, the TX UE receives allocation of resources, based on the size of data to be transmitted at the MAC layer, from the eNB after transmitting a request to the eNB or directly from a pre-configured pool.

At operation 2025, the data is converted into MAC PDUs at the MAC layer and each MAC PDU is coded in a given scheme (e.g., chase combining or incremental redundancy) and a preset number of RVs are generated. The TX UE transmits an SA containing the destination ID to RX UEs, obtains a transmission schedule, and starts the data period timer. Here, the number of MAC PDUs to be transmitted (M) may be specified in the SA.

The generated RVs are stored in the MAC TX buffer, and may be transmitted in sequence by the transmission algorithm via the PHY TX buffer to the receiving side.

Specifically, at operation 2030, the RVI (RV index) is initialized to zero. At operation 2035, the TX UE determines presence of a HARQ process assigned for the destination ID. If a HARQ process is assigned for the destination ID, at operation 2050, the RV indicated by the RVI is transmitted to the physical channel and the RVI is incremented. If no HARQ process is assigned for the destination ID, the TX UE creates a HARQ process for the destination ID at operation 2040, generates all necessary RVs and stored the same in the PHY TX buffer at operation 2045, and transmits the RV indicated by the RVI to the physical channel and increments the RVI at operation 2050. At operation 2055, the TX UE determines whether all the RVs are transmitted (RVI>3). If not all the RVs are transmitted, the procedure returns to operation 2035. The number of generated RVs may be 4 according to embodiments of the present disclosure.

To be more specific, a group ID and data may be generated at the application layer at operation 2010. The group ID may be mapped to a destination ID according to the ProSe function at operation 2015. The TX UE may receive allocation of SA resources, based on the size of data to be transmitted, from the eNB after transmitting a request thereto or directly from a pre-configured pool at operation 2020. The TX UE may transmit the SA via the allocated resources at operation 2025. Here, resource locations may be identified through T-RPT, frequency, index and offset. To terminate an ongoing HARQ process upon expiration of the data period, the data period timer is started at the beginning of data transmission indicated by the SA. Upon expiration of the data period, the HARQ process may be forcibly terminated.

When M MAC PDUs are generated (M may indicate the number of MAC PDUs or RVs that can be transmitted through resources allocated by the eNB for one SA), an HARQ process may be created and the RVs may be transmitted in sequence at operation 2030 and subsequent operations. Here, the TX UE may have to determine presence of a HARQ process assigned for the destination ID of a MAC PDU at operation 2035.

If all the RVs are transmitted, at operation 2060, the TX UE purges the PHY TX buffer and kills the HARQ process. Here, as described above, up to four RVs may be generated. In the above description, it is assumed that the HARQ process is created and killed for every four RVs. However, the HARQ process may be not killed until M MAC PDUs are transmitted. In this case, the HARQ process is kept alive until all transmissions indicated by the T-RPT of the SA have been completed (i.e., a data period). When all RVs of the current MAC PDU are transmitted, the next MAC PDU is error-correction coded and new RVs are generated, and the HARQ process handles the RVs of the next MAC PDU. If it is determined at operation 2065 that the data period has expired, the operation is completed. Otherwise, the operation goes back and performs operation 2030.

Meanwhile, selection may be made in connection with the memory or operating power of the UE.

Figure 21:
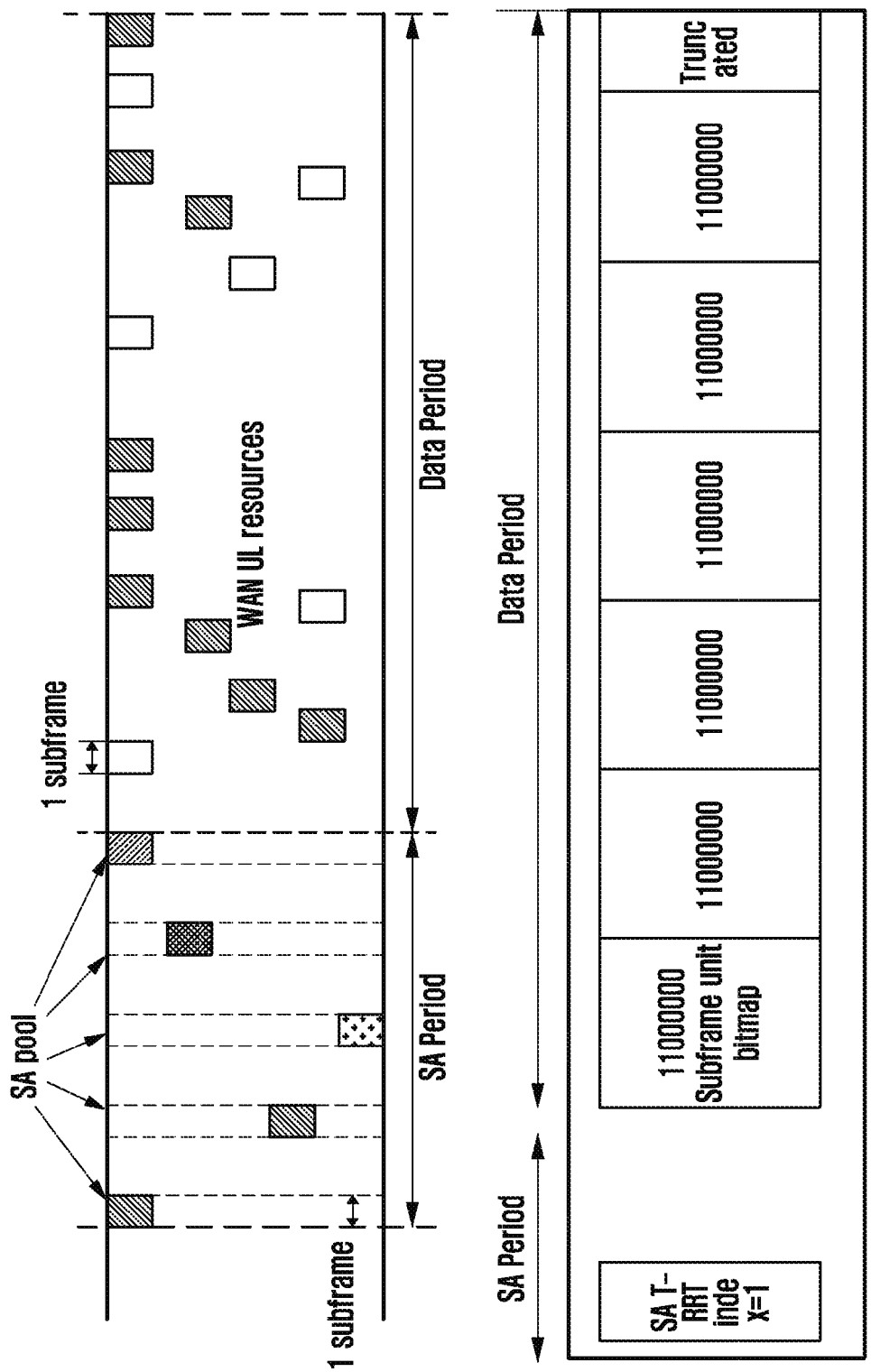
FIG. 21 illustrates a scheduling assignment (SA) period, data period and time resource pattern (T-RPT) according to an embodiment of the present disclosure.

FIG. 21 illustrates an SA period, data period and T-RPT according to an embodiment of the present disclosure.

Referring to FIG. 21, uplink subframe patterns for WAN and D2D may be determined through control plane signaling, such as a SIB. Examples of a D2D subframe determined as such are shown in FIG. 21.

The T-RPT index may indicate one of 8-bit bitmaps and represent the time in units of TTI allowed for D2D communication of a specific UE. In such a bitmap, '1' may indicates D2D use. This 8-bit bitmap is repeated for the data period, and may be truncated when the data period expires.

Figure 22:
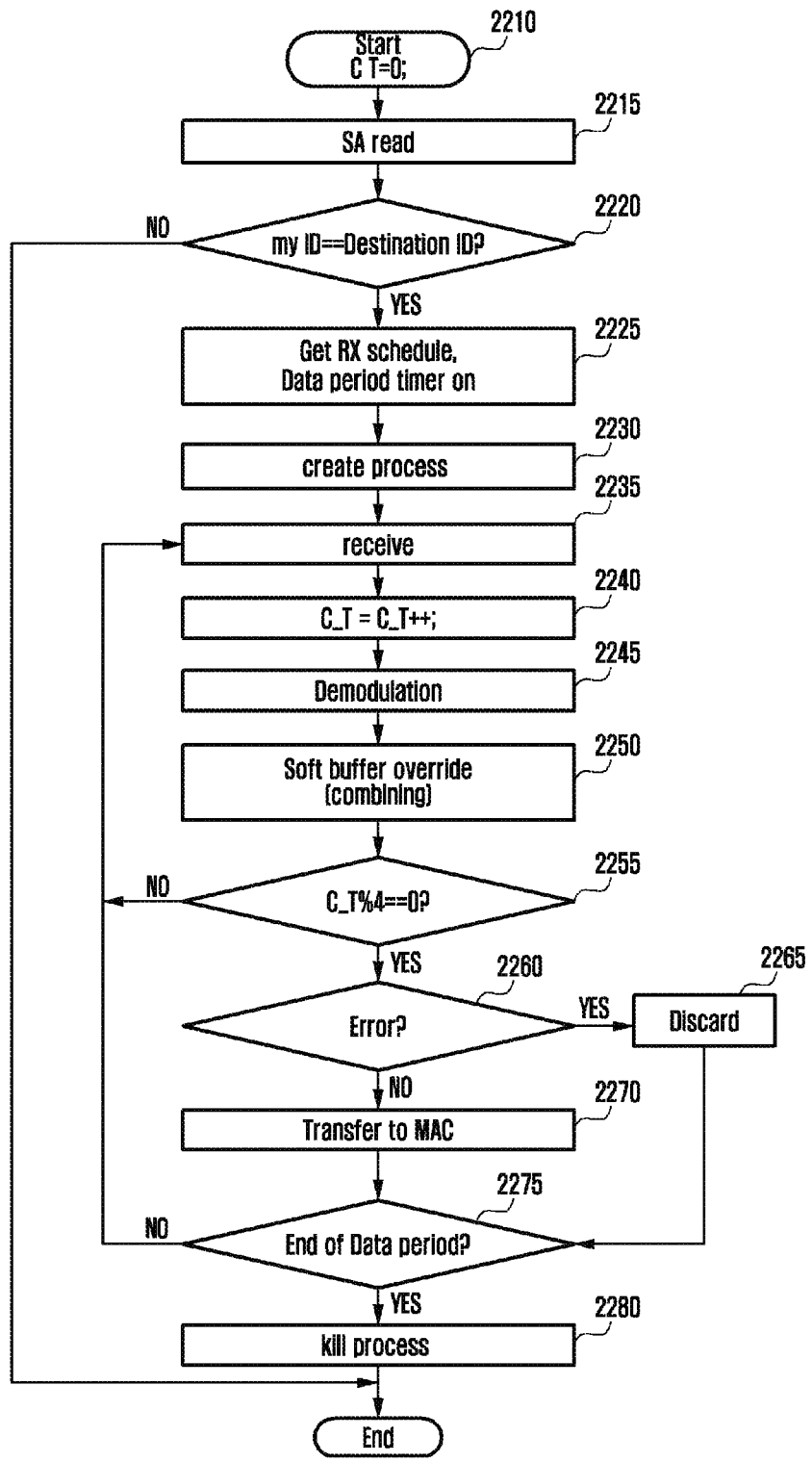
FIG. 22 is a flowchart for HARQ processing in a receiving UE according to an embodiment of the present disclosure.

FIG. 22 is a flowchart for HARQ processing in a receiving UE according to an embodiment of the present disclosure.

Referring to FIG. 22, the RX UE may collect all RVs and perform decoding at once, and may use UM mode for D2D communication.

Specifically, C_T is a counter for D2D reception according to the T-RPT sequence in the data period. Based on the C_T value, the RX UE may identify the number of received RVs and determine when the soft buffer is to be used for HARQ combining or is to be purged. At operation 2210, C_T is set to 0.

At operation 2215, the RX UE monitors the SA pool to receive an SA. At operation 2220, the RX UE determines whether the received SA has a destination ID or group ID equal to the ID thereof. If the SA does not have a destination ID equal to the ID of the RX UE, the RX UE ends the procedure.

If the SA has a destination ID equal to the ID of the RX UE, the RX UE may assign a HARQ process for the SA. For example, at operation 2225, the RX UE starts the data period timer to indicate the data period. At operation 2230, the RX UE creates a HARQ process.

Thereafter, the RX UE may receive data, demodulate the data into channel bits, and store the channel bits in the soft buffer with overriding or combining. This may be repeated for the number of RVs. For example, the RX UE receives data at operation 2235, increments C_T by 1 at operation 2240, demodulates the received data into channel bits at operation 2245, and stores the channel bits in the soft buffer with overriding or combining at operation 2250. At operation 2255, the RX UE determines whether C_T is a multiple of 4 (the maximum number of RVs is assumed to be 4). For example, whether all RVs are received is determined.

If C_T is a multiple of 4 (all RVs are received), at operation 2260, the RX UE decodes the combined channel bits to detect an error. If an error is detected, at operation 2265, the RX UE discards the decoded channel bits. If no error is detected, at operation 2270, the decoded channel bits are forwarded to the higher layer (i.e., a MAC layer).

During the process, when the data period expires, the ongoing action is suspended and only an error-free portion of the data received up to that time may be forwarded to the higher layer. For example, at operation 2275, the RX UE determines whether the data period has expired. If the data period has not expired, the procedure returns to operation 2235 for continued data reception. If the data period has expired, at operation 2280, the RX UE deletes the HARQ process, and an error-free portion of the data received up to that time may be forwarded to the higher layer.

Figure 23:
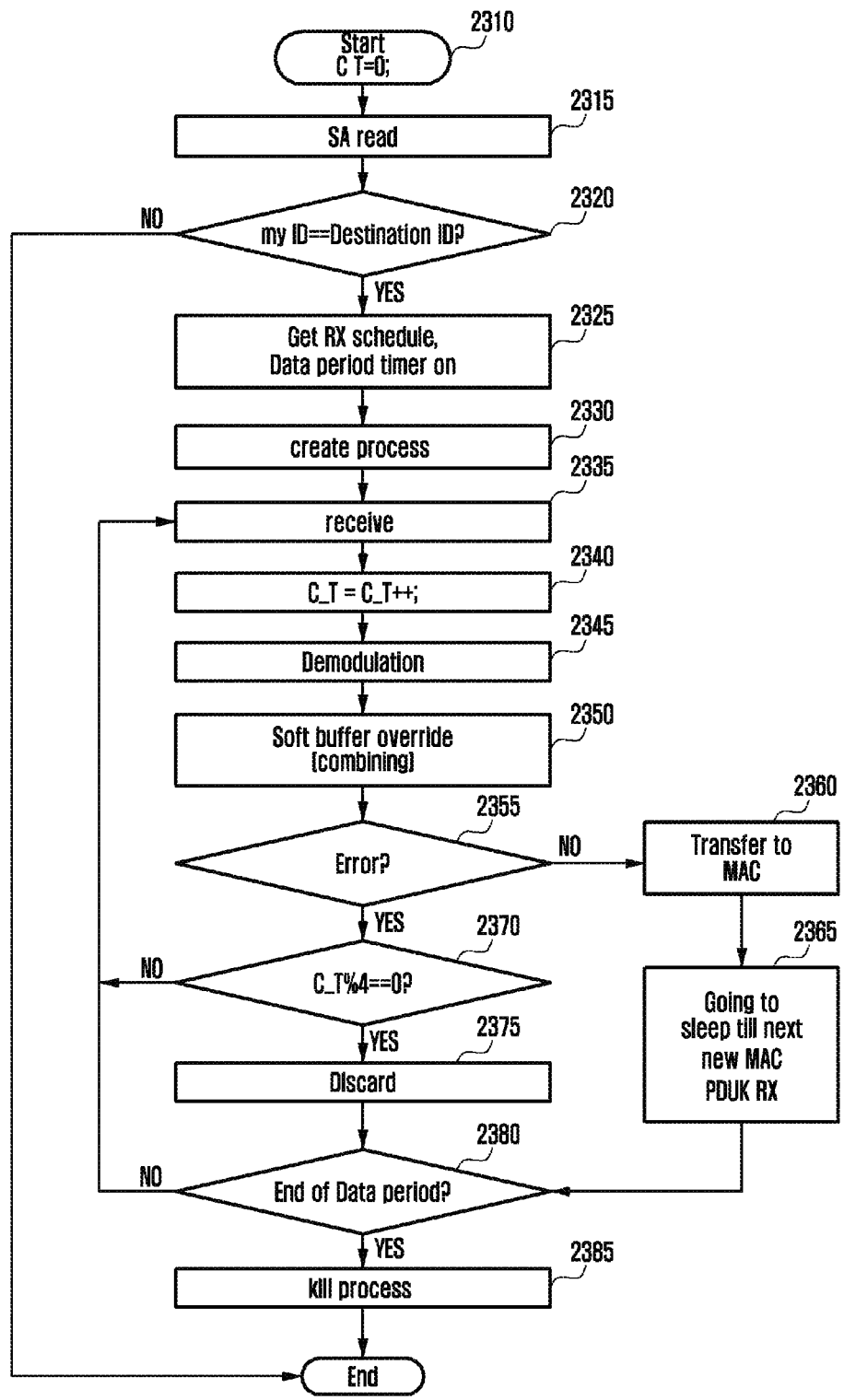
FIG. 23 is a flowchart for HARQ processing in a receiving UE according to an embodiment of the present disclosure.

FIG. 23 is a flowchart for HARQ processing in a receiving UE according to an embodiment of the present disclosure.

Referring to FIG. 23, when channel conditions are favorable and the TX UE transmits multiple RVs in UM mode, the RX UE may succeed in receiving data without an error before receiving all the RVs from the TX UE. In this case, the RX UE may perform decoding and error determination upon each RV reception, and discontinue RV reception if data reception is successful. Thereby, the RX UE may reduce power consumption and use the reception resource for another purpose.

C_T is a counter for D2D reception according to the T-RPT sequence in the data period. Based on the C_T value, the RX UE may identify the number of received RVs and determine when the soft buffer is to be used for HARQ combining or is to be purged. At operation 2310, C_T is set to 0.

At operation 2315, the RX UE monitors the SA pool to receive an SA. At operation 2320, the RX UE determines whether the received SA has a destination ID or group ID equal to the ID thereof. If the SA does not have a destination ID equal to the ID of the RX UE, the RX UE ends the procedure.

If the SA has a destination ID equal to the ID of the RX UE, the RX UE may assign a HARQ process for the SA. For example, at operation 2325, the RX UE starts the data period timer to indicate the data period. At operation 2330, the RX UE creates a HARQ process.

Thereafter, the RX UE may receive an RV, demodulate the RV, and perform combining, and decode the currently combined data to detect an error. This may be repeated for each RV reception. For example, the RX UE receives an RV at operation 2335, increments C_T by 1 at operation 2340, demodulates the received RV into channel bits at operation 2345, and stores the channel bits in the soft buffer with overriding or combining at operation 2350. At operation 2355, the RX UE determines the combined data to detect an error. If no error is detected, at operation 2360, the combined data is forwarded to the higher layer. For example, decoded data may be forwarded to the MAC layer. At operation 2365, the RX UE may remain in sleep mode until the next MAC PDU is received. If an error is detected, at operation 2370, the RX UE determines whether all RVs are received. If not all the RVs are received, the procedure returns to operation 2335 for continued RV reception. If all the RVs are received but an error persists, at operation 2375, the RX UE discards the combined data. Thereby, the RX UE may discontinue RV reception before receiving a preset number of RVs.

During the process, one HARQ process is executed for the reception resource designated by the SA. When the data period expires, the ongoing action is suspended and only an error-free portion of the data received up to that time may be forwarded to the higher layer. For example, at operation 2380, the RX UE determines whether the data period has expired. If the data period has not expired, the procedure returns to operation 2335 for continued data reception. If the data period has expired, at operation 2385, the RX UE deletes the HARQ process, and an error-free portion of the data received up to that time may be forwarded to the higher layer.

The eNB may transmit grants for SA and data through PDCCH in response to SR and BSR according to one of the embodiments described above. The D2D TX UE may decode PDCCH using D2D-RNTI.

Meanwhile, HARQ processing may be different according to QoS levels required by applications. For example, when a high data rate is required for image transmission, it may be undesirable to unconditionally repeat retransmission a given number of times. To make the most of channel situations, efficient use of radio resources through transmission of feedback indicating success or failure as in the case of the LTE system may be more important than system complexity caused thereby. In such a case, use of HARQ process interleaving is necessary owing to delay caused by the RV transmission interval, and generation and transmission of feedback packets at the receiving side. According to the depth of interleaving, more than one HARQ process may be needed unlike the embodiments described above. To this end, the maximum number of HARQ processes may be determined in advance at the system level, and it is possible to use a HARQ process from a HARQ process pool if necessary.

In D2D communication, one HARQ process or multiple HARQ processes may be used on a group basis or on a UE basis. Hence, a change in HARQ operation mode may be caused according to specific conditions. As the SA has information on the mapping between RV and radio resource, utilization of multiple HARQ processes involving a change in the number of retransmissions is to be handled differently for individual SAs. For example, HARQ processing based on one HARQ process may be used for one SA, and HARQ processing based on multiple HARQ processes may be used for another SA under the TX-response assumption. Referring to the embodiment described in FIG. 5, the TX UE having data to be transmitted has to notify the eNB of utilization of a single HARQ process or multiple HARQ processes. The eNB may allocate resources from available UE resources based on TX-response. The TX UE may transmit an SA having information on the allocated resources. After reception of the SA, the RX UE may transmit a response for each received RV. The location of the resource for response may be fixed relative to the resource for transmission or may be determined by the eNB.

When a specific application generates data to be transmitted, the data is segmented into MAC PDUs of the same size and the MAC PDUs tends to have the same QoS level. When a scheduling request containing a QoS indication is transmitted to the eNB, the eNB may allocate not only transmission resources but also response resources for the RX UE and notify the TX UE of the allocated resources. The TX UE may perform transmission and feedback reception. When transmitting an SA, the TX UE may create a single HARQ process or multiple HARQ processes according to the feedback enabled indication. Thereafter, when the TX UE provides the HARQ entity with information including data size, scheduling and feedback enabled indication, during each transmission TTI, information on the RV with the most recent feedback may be used to determine the next RV, enabling continuous RV transmission.

Table 1 below illustrates an example of an SA according to an embodiment of the present disclosure.

TABLE 1

| SA |
|---|
| Freq. resource indication (3-15 bits) |
| Freq. hopping indication (1 bit) |
| MCS (5 bits) |
| T-RPT (7 bits) |
| TA (b bits) |
| ID (8 bits) |
| Feedback enabled (1 bit) |
| RT-RPT (7 bits) |

As illustrated in Table 1, the SA may further include a "feedback enabled" bit and a bitmap (i.e., an RT-RPT) indicating response resource locations.

Figure 24:
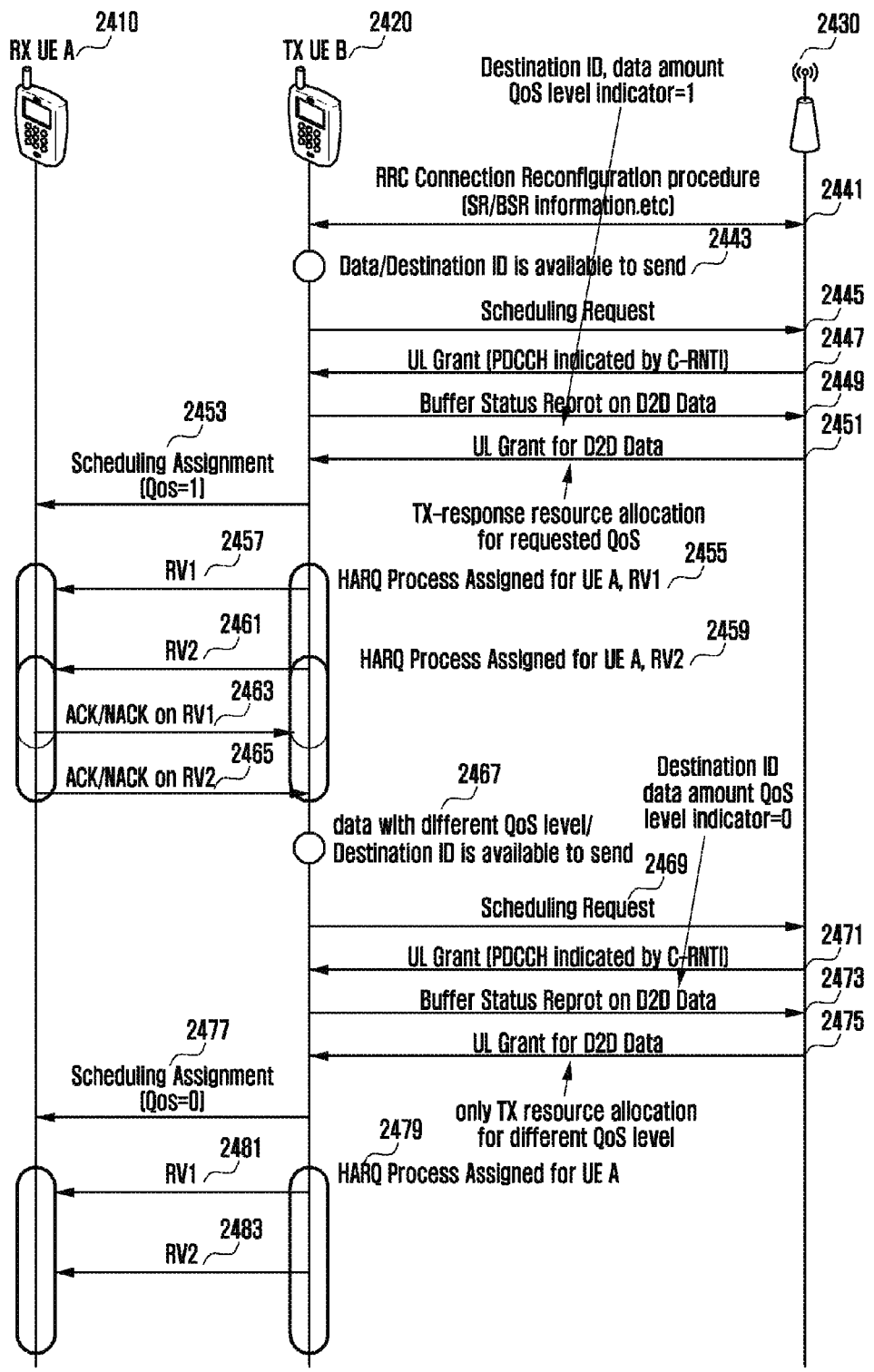
FIG. 24 is a sequence diagram depicting multi-HARQ processing according to an embodiment of the present disclosure.

FIG. 24 is a sequence diagram depicting multi-HARQ processing according to an embodiment of the present disclosure.

Referring to FIG. 24, QoS=1 may indicate HARQ processing based on multiple processes, and QoS=0 may indicate HARQ processing based on a single process.

Radio resources useable for SA transmission may be determined by an eNB 2430. At operation 2441, a TX UE 2420 receives an RRC connection reconfiguration message from the eNB 2430 to obtain access-related information. At operation 2443, the TX UE 2420 detects generation of D2D data to be transmitted to at least one RX UE 2410. Here, the TX UE 2420 may identify the destination ID for the RX UE 2410. Alternatively, the TX UE may detect generation of D2D data at operation 2443 first, and receive access-related information from the eNB at operation 2441. This may also be applicable to the embodiments described below.

At operation 2445, the TX UE 2420 transmits a scheduling request message to the eNB 2430. At operation 2447, the TX UE 2420 receives allocation of downlink resources from the eNB 2430. At operation 2449, the TX UE 2420 transmits a BSR message to the eNB 2430 to notify the amount of D2D data to be transmitted. Here, the TX UE 2420 may transmit information on the destination ID and QoS level together with the amount of D2D data at operation 2449. For example, the TX UE 2420 may transmit such information to the eNB 2430 to notify use of HARQ processing based on multiple processes. Here, the QoS level indication set to '1' may indicate utilization of HARQ processing based on multiple processes. At operation 2451, the TX UE 2420 receives allocation of resources from the eNB 2430. Here, the eNB 2430 may allocate TX-response resources corresponding to the indicated QoS level as D2D resources.

Thereafter, at operation 2453, the TX UE 2420 transmits an SA having information on the allocated resources to the RX UE 2410. Here, as described before, the SA contains a destination ID, enabling a RX UE to identify whether the SA addressed thereto. The SA also contains an indication for QoS=1, notifying the RX UE of necessity of assigning multiple HARQ processes. At operation 2455, the TX UE 2420 assigns a HARQ process for the RX UE 2410. At operation 2457, the TX UE 2420 transmits RV1 to the RX UE 2410 by use of the HARQ process assigned therefor. Additionally, at operation 2459, the TX UE 2420 assigns a second HARQ process for the RX UE 2410. At operation 2461, the TX UE 2420 transmits RV2 to the RX UE 2410 by use of the second HARQ process assigned therefor.

At operation 2463, the TX UE 2420 receives an ACK/NACK signal for RV1 from the RX UE 2410 by use of the HARQ process assigned at operation 2455. At operation 2465, the TX UE 2420 receives an ACK/NACK signal for RV2 from the RX UE 2410 by use of the HARQ process assigned at operation 2459.

At operation 2467, the TX UE 2420 detects generation of new D2D data to be transmitted to the RX UE 2410. Here, the TX UE 2420 may identify the destination ID for the RX UE 2410. The QoS level of the new D2D data may be different from that of the D2D data occurred at operation 2443.

At operation 2469, the TX UE 2420 transmits a scheduling request message to the eNB 2430. At operation 2471, the TX UE 2420 receives allocation of downlink resources from the eNB 2430. At operation 2473, the TX UE 2420 transmits a BSR message to the eNB 2430 to notify the amount of D2D data to be transmitted. Here, the TX UE 2420 may transmit information on the destination ID and QoS level together with the amount of D2D data at operation 2473. For example, the TX UE 2420 may transmit such information to the eNB 2430 to notify use of HARQ processing based on a single process. Here, the QoS level indication set to '0' may indicate utilization of HARQ processing based on a single process. At operation 2475, the TX UE 2420 receives allocation of resources from the eNB 2430. Here, the eNB 2430 may allocate only TX resources corresponding to the indicated QoS level as D2D resources.

Thereafter, at operation 2477, the TX UE 2420 transmits an SA having information on the allocated resources to the RX UE 2410. Here, as described before, the SA contains a destination ID, enabling a RX UE to identify whether the SA addressed thereto. The SA also contains an indication for QoS=0, notifying the RX UE of necessity of assigning one HARQ process. At operation 2479, the TX UE 2420 assigns a HARQ process for the RX UE 2410. At operation 2481, the TX UE 2420 transmits RV1 to the RX UE 2410 by use of the HARQ process assigned therefor. At operation 2483, the TX UE 2420 transmits RV2 to the RX UE 2410 by use of the same HARQ process.

Figure 25:
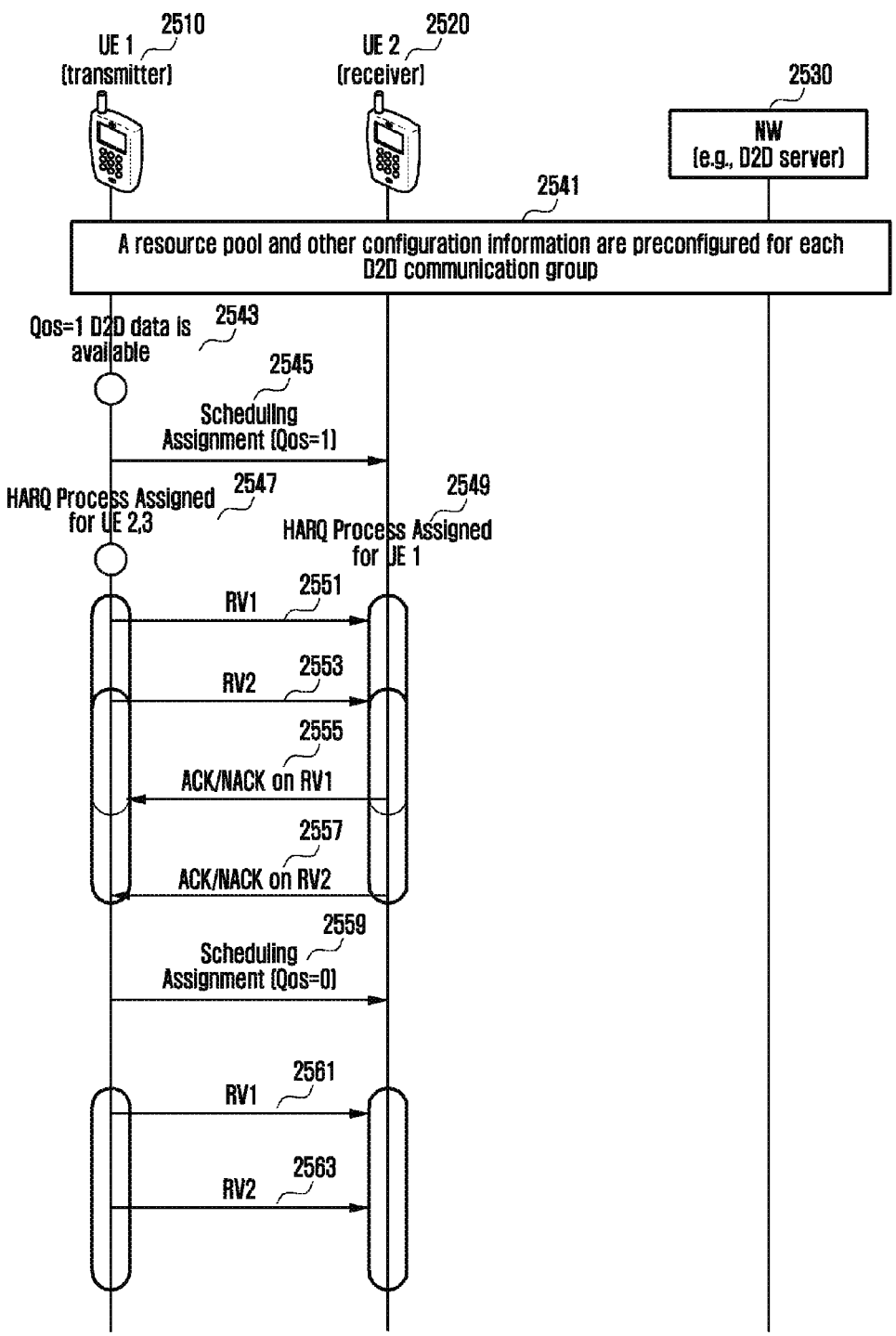
FIG. 25 is a sequence diagram depicting multi-HARQ processing according to an embodiment of the present disclosure.

FIG. 25 is a sequence diagram depicting multi-HARQ processing according to an embodiment of the present disclosure.

Referring to FIG. 25, a D2D server 2530 may pre-store information regarding radio resources usable for SA transmission as system information (e.g., an RRC signaling or an SIB). For example, at operation 2541, the information on radio resources usable for SA transmission may be stored in the network (e.g., a D2D server) 2530 as system information, so that resource pool information and other necessary information may be shared between UEs 2510 and 2520.

At operation 2543, the first UE (TX UE) 2510 detects generation of data to be transmitted. Here, the generated data may be transmitted with QoS=1 (i.e., use of HARQ processing based on multiple processes). At operation 2545, the TX UE 2510 transmits an SA containing a destination ID to at least one RX UE 2520 according to the shared information. At operation 2547, the TX UE 2510 assigns multiple HARQ processes for the at least one RX UE 2520.

Upon SA reception, at operation 2549, the RX UE 2520 assigns a HARQ process per SA having a destination ID equal to the ID thereof.

Meanwhile, the TX UE 2510 may assign HARQ processes for the RX UE 2520 immediately after transmitting the SA at operation 2545. Alternatively, the TX UE 2510 may assign HARQ processes for the RX UE 2520 immediately before transmitting data at operation 2551 or 2553. Depending upon implementations, the RX UE 2520 may assign a HARQ process for the TX UE 2510 when first data is received at operation 2551.

At operation 2551, the TX UE 2510 transmits RV1 to the RX UE 2520. At operation 2553, the TX UE 2510 transmits RV2 to the RX UE 2520. At operation 2555, the TX UE 2510 receives an ACK/NACK signal for RV1 from the RX UE 2520. At operation 2557, the TX UE 2510 receives an ACK/NACK signal for RV2 from the RX UE 2520.

At operation 2559, the TX UE 2510 detects generation of new D2D data to be transmitted to the at least one RX UE 2520. Here, the TX UE 2510 may identify the destination ID for each RX UE 2520. The QoS level of the new D2D data (i.e., use of a single HARQ process) may be different from that of the D2D data occurred at operation 2543. The TX UE 2510 transmits an SA containing a destination ID to the at least one RX UE 2520 according to the shared information. The TX UE 2510 assigns multiple HARQ processes for the at least one RX UE 2520. At operation 2561, the TX UE 2510 transmits RV1 to the RX UE 2520. At operation 2563, the TX UE 2510 transmits RV2 to the RX UE 2520.

In this embodiment of the present disclosure, the location of the feedback resource may be specified relative to that of the transmission resource. Here, the relative position therebetween may be fixed or be varied according to a preset rule.

Figure 26:
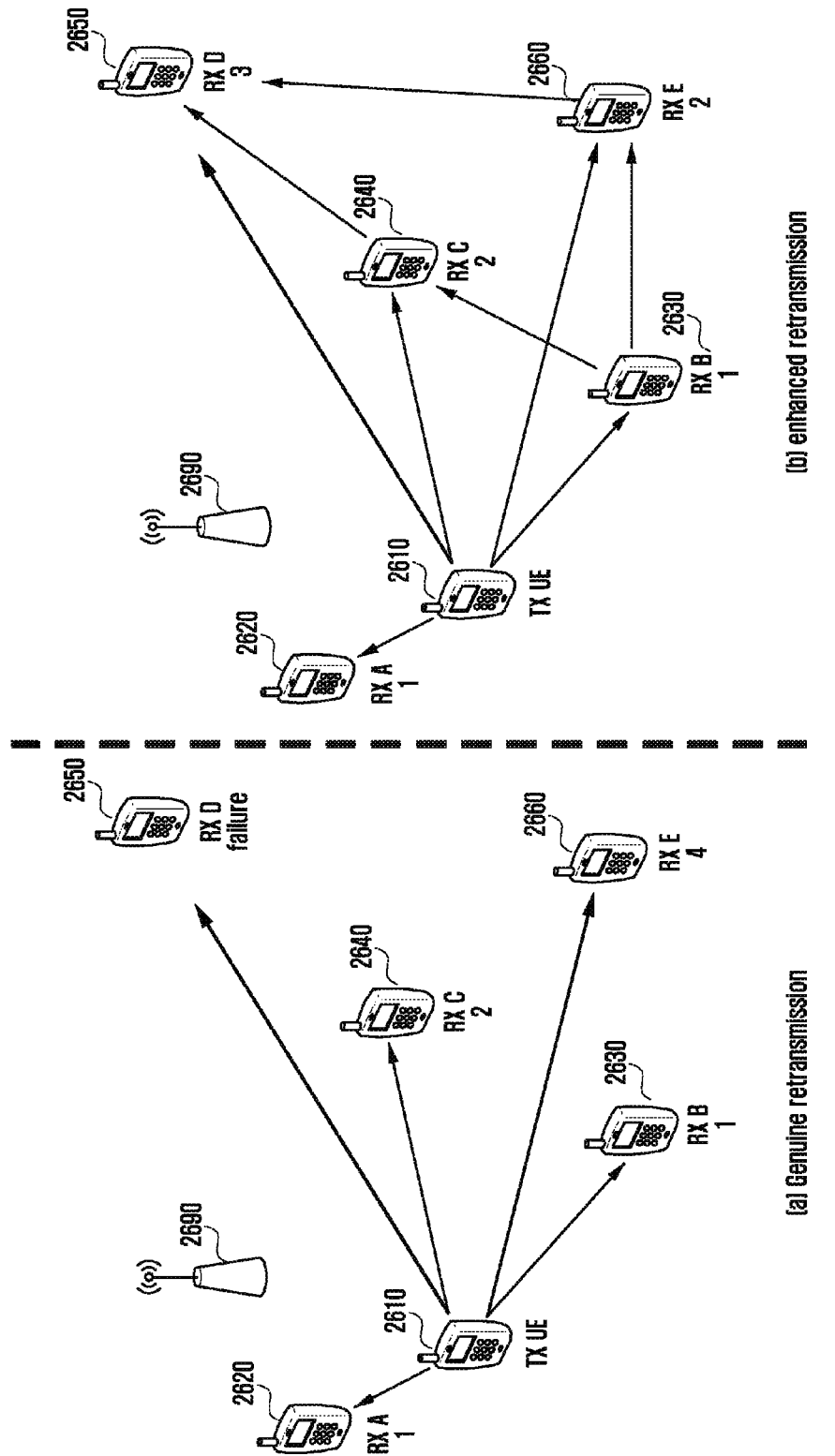
FIG. 26 illustrates reuse of D2D resources according to an embodiment of the present disclosure.

FIG. 26 illustrates reuse of D2D resources according to an embodiment of the present disclosure.

Figure 27:
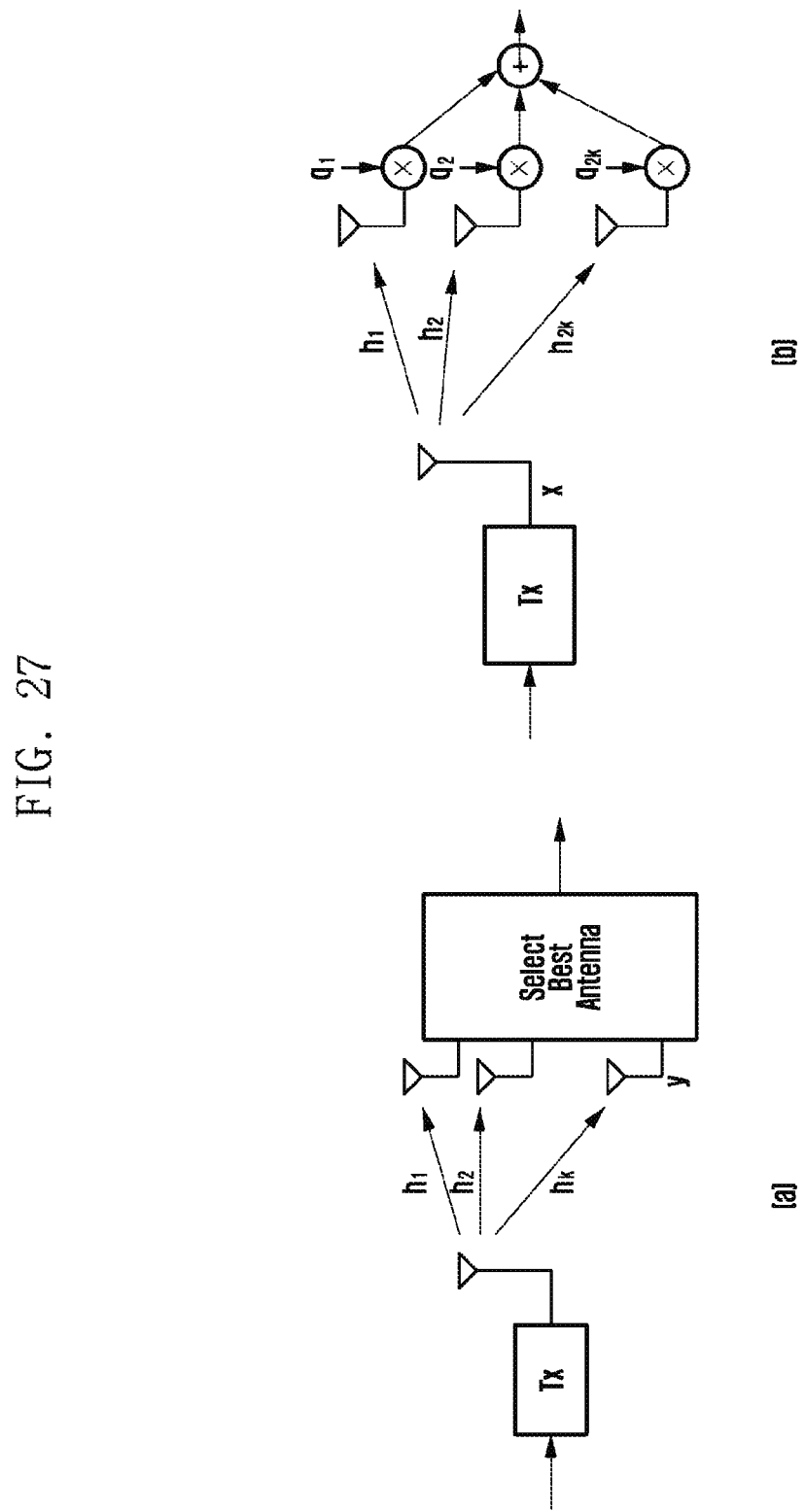
FIG. 27 illustrates signal combining according to an embodiment of the present disclosure.

FIG. 27 illustrates signal combining according to an embodiment of the present disclosure.

When a RX UE uses a reception scheme as described in FIG. 23, after a retransmission is received successfully, the RX UE does not have to listen to the remaining retransmissions and may reuse the reception resource for data transmission.

Referring to FIG. 26, there may be one eNB 2690, one TX UE 2610 and multiple RX UEs 2620, 2630, 2640, 2650, and 2660. Here, it is assumed that the RX UEs 2620, 2630, 2640, 2650, and 2660 have the same destination ID (or group ID) and the TX UE 2610 attempts to transmit data to all the RX UEs 2620, 2630, 2640, 2650, and 2660. The numerical value attached to each of the RX UEs 2620, 2630, 2640, 2650, and 2660 indicates the number of retransmissions needed for successful reception by the corresponding RX UE. For example, the first RX UE 2620 successfully received data after one retransmission, and the second RX UE 2630 successfully received data after one retransmission.

For the embodiment described in FIG. 22 or 23, as shown in part (a) of FIG. 26, each of the RX UEs 2620, 2630, 2640, 2650, and 2660 may repeat a reception attempt until all RVs of a MAC PDU are received or discontinue the reception attempt if one RV is successfully received.

On the other hand, as shown in part (b) of FIG. 26, among the RX UEs 2620, 2630, 2640, 2650, and 2660, when one RX UE successfully receives an RV, the RX UE may discontinue the reception attempt and transmit the received RV to another RX UE, increasing performance of D2D broadcasting. For example, the second RX UE 2630 successfully receives an RV after one retransmission. The second RX UE 2630 may discontinue the RV reception attempt and transmit the received RV to another RX UE (e.g., a third RX UE 2640 or a fifth RX UE 2660).

Her, as each UE is aware of the HARQ coding scheme, a correctly received MAC PDU may be used to generate the same RVs. Hence, the RX UE having succeeded in reception may regenerate an RV and reuse the reception resource indicated by the SA to transmit the RV. Several replicated RVs may be coded according to the same MCS level indicated by the SA. Hence, the receiving side may receive the same symbols with a time difference less than CP. The PHY end of the receiving side may perform combining operation by use of one of various algorithms, such as maximal ratio combining (MRC).

Referring to FIG. 27, Selection Combining is shown in part (a), and Maximal Ratio Combining is shown in part (b).

When reception performance is enhanced as described above, compared with rigid retransmission, broadcast coverage area may be enlarged and reception power consumption may be reduced due to reduced reception attempts. For example, in part (a) of FIG. 26, the fourth RX UE 2650 is unable to receive D2D data from the TX UE 2610. On the contrary, in part (b) of FIG. 26, the fourth RX UE 2650 is able to receive an RV from the third RX UE 2640 or fifth RX UE 2660 having succeeded in reception, enlarging the broadcast coverage area.

Figure 28:
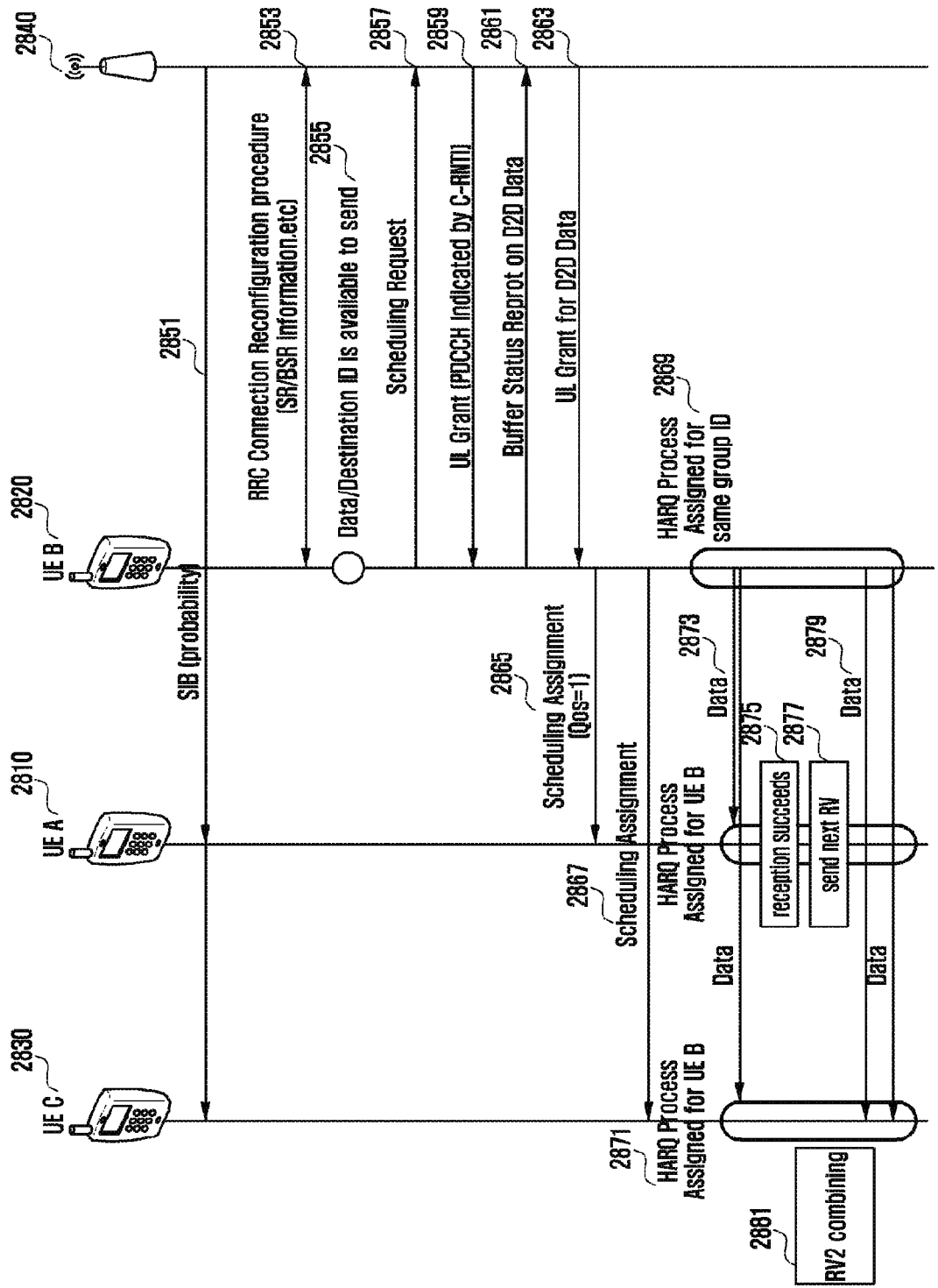
FIG. 28 is a sequence diagram depicting reuse of D2D resources according to an embodiment of the present disclosure.

FIG. 28 is a sequence diagram depicting reuse of D2D resources according to an embodiment of the present disclosure.

Figure 29:
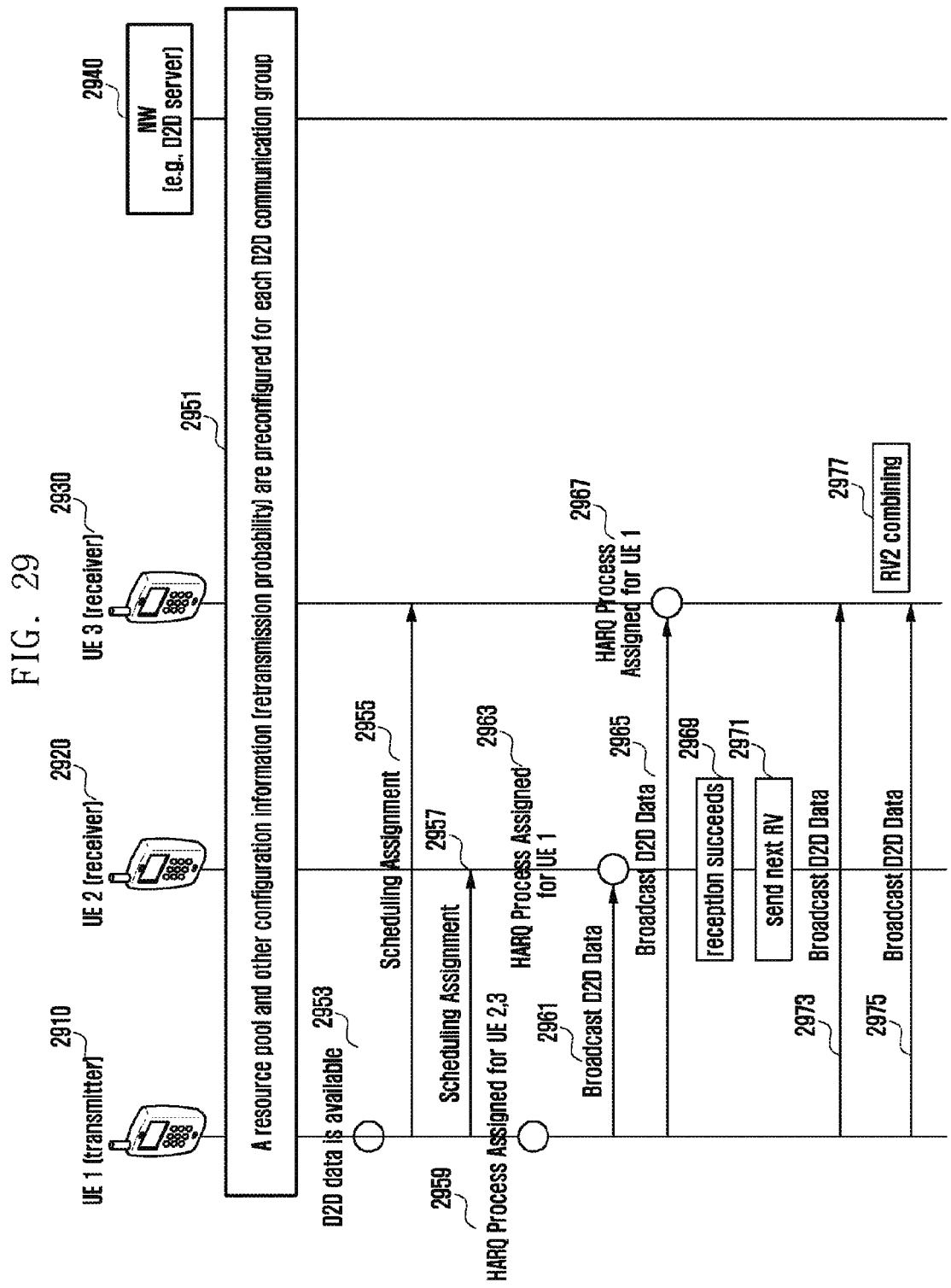
FIG. 29 is a sequence diagram depicting reuse of D2D resources according to an embodiment of the present disclosure.

FIG. 29 is a sequence diagram depicting reuse of D2D resources according to an embodiment of the present disclosure.

Figure 30:
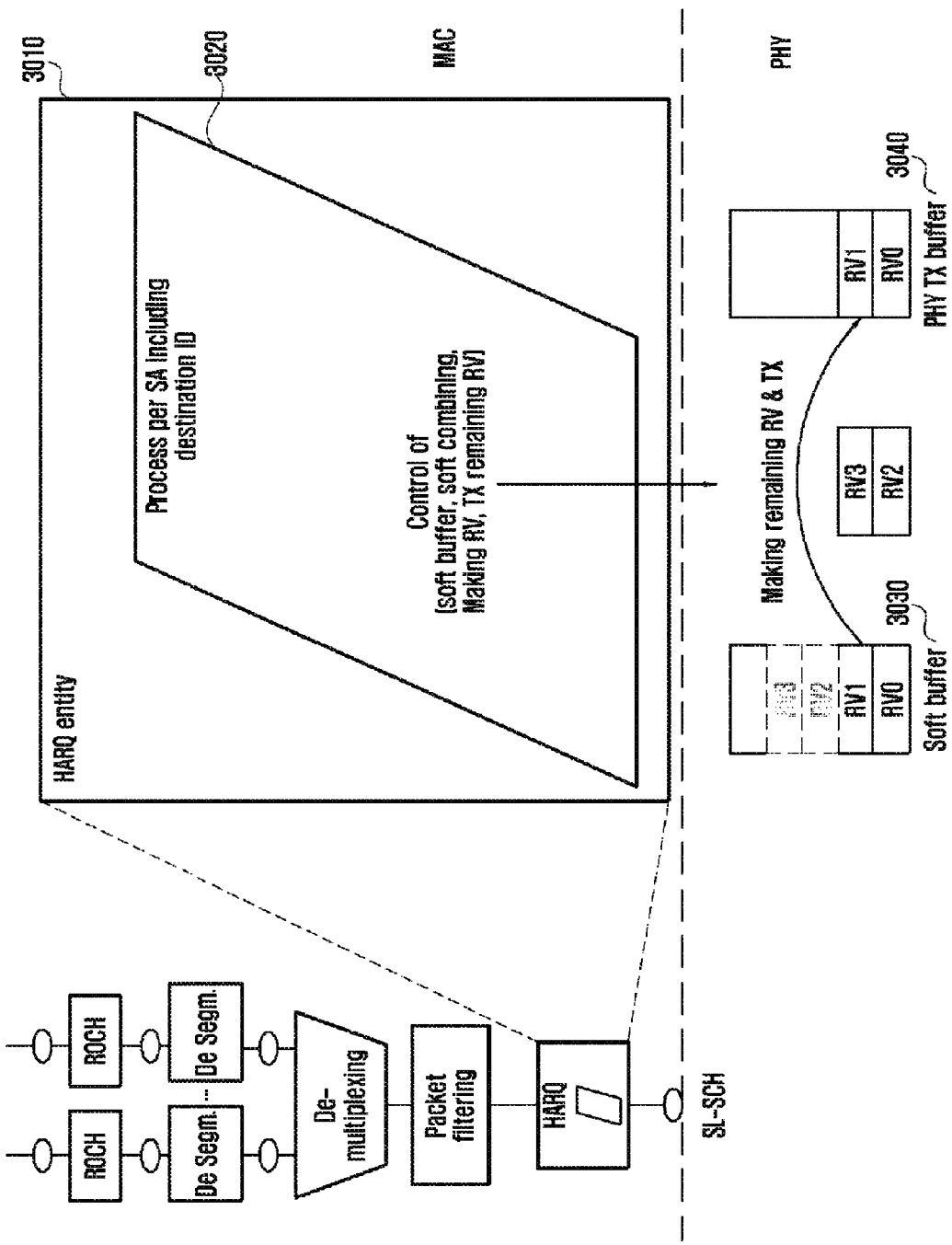
FIG. 30 illustrates reuse of D2D resources in a receiving UE according to an embodiment of the present disclosure.

FIG. 30 illustrates reuse of D2D resources in a receiving UE according to an embodiment of the present disclosure.

Figure 31:
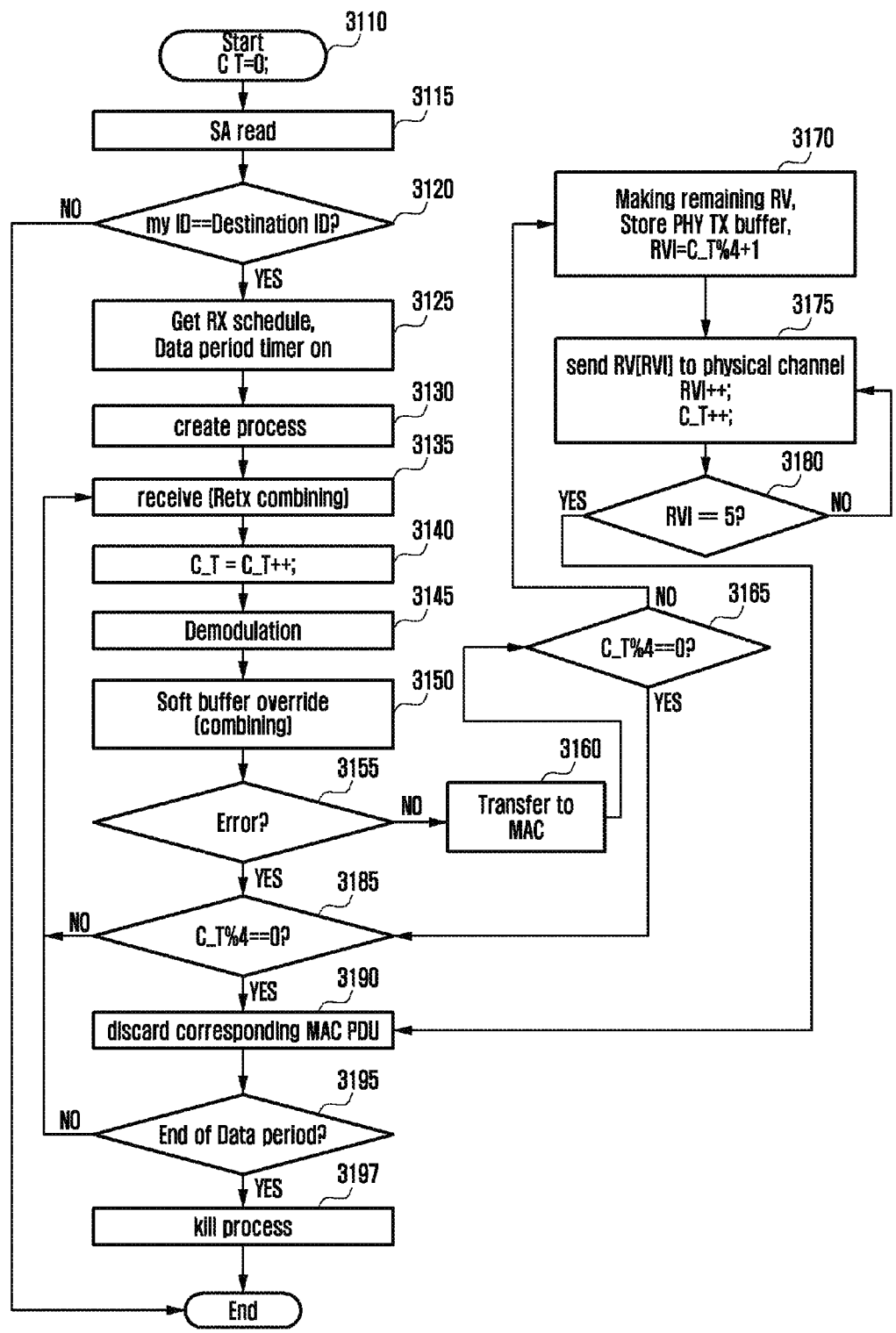
FIG. 31 is a flowchart depicting reuse of D2D resources in a receiving UE according to an embodiment of the present disclosure.

FIG. 31 is a flowchart depicting reuse of D2D resources in a receiving UE according to an embodiment of the present disclosure.

Figure 32:
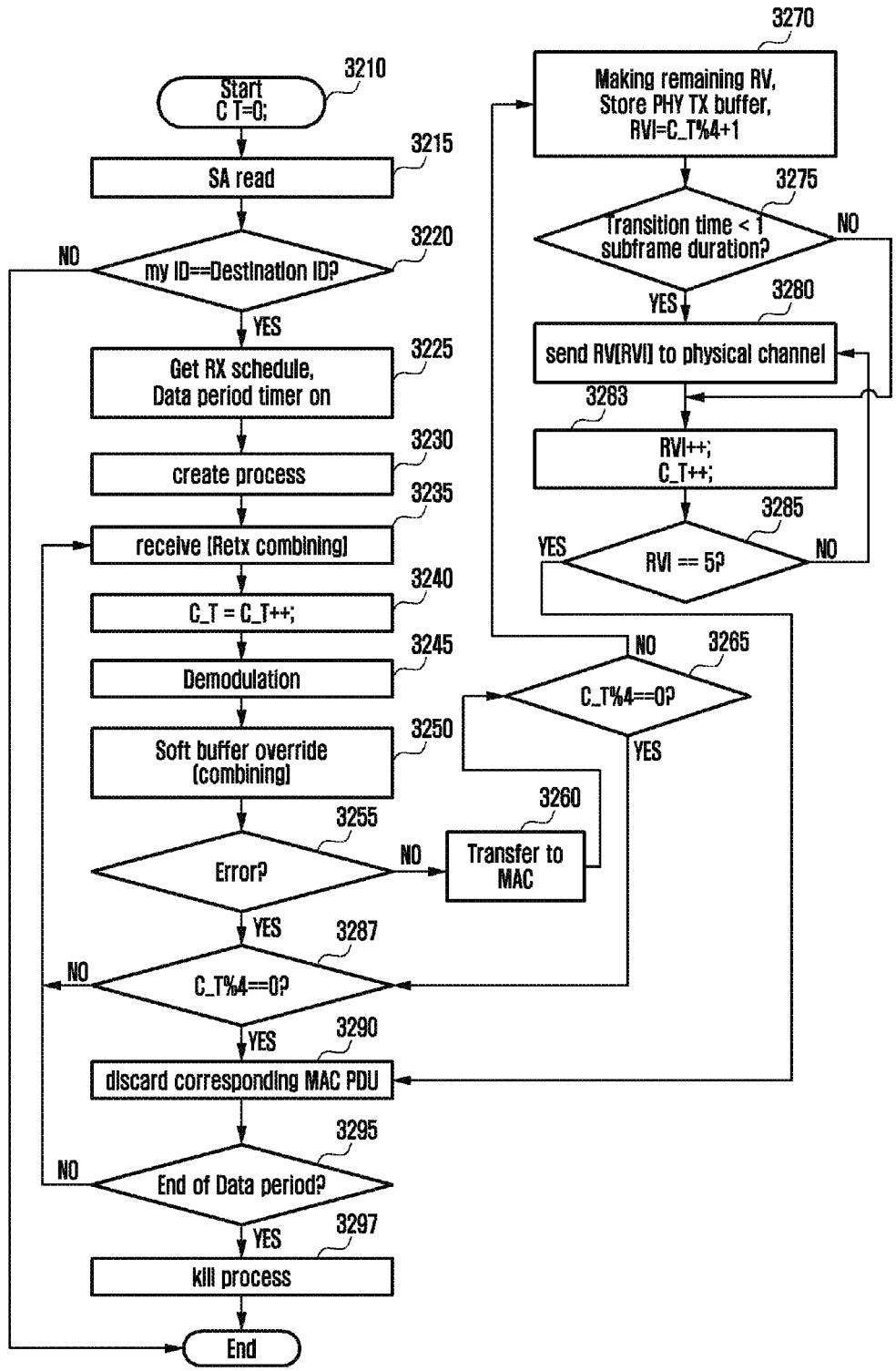
FIG. 32 is a flowchart depicting reuse of D2D resources in a receiving UE according to an embodiment of the present disclosure.

FIG. 32 is a flowchart depicting reuse of D2D resources in a receiving UE according to an embodiment of the present disclosure.

Figure 33:
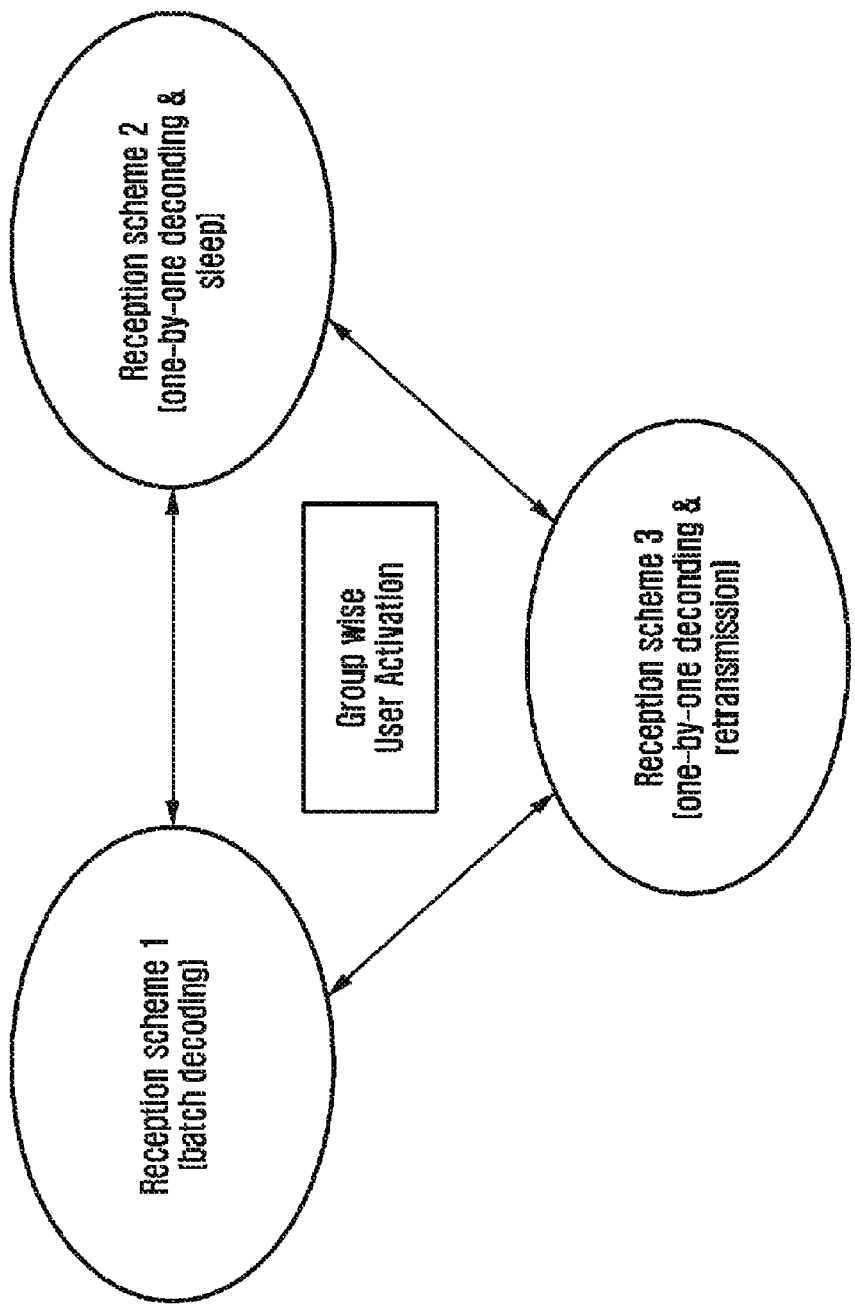
FIG. 33 illustrates selection of transmission and reception mode according to an embodiment of the present disclosure.

FIG. 33 illustrates selection of transmission and reception mode according to an embodiment of the present disclosure.

Referring to FIG. 28, radio resources useable for SA transmission may be determined by an eNB 2840. At operation 2853, a TX UE 2820 receives an RRC connection reconfiguration message from the eNB 2840 to obtain access-related information. At operation 2855, the TX UE 2820 detects generation of D2D data to be transmitted to at least one RX UE 2810 or 2830. Here, the TX UE 2820 may identify the destination ID for each RX UE 2810 or 2830. Alternatively, the TX UE may detect generation of D2D data at operation 2855 first, and receive access-related information from the eNB at operation 2853. This may also be applicable to the embodiments described below. In addition, at operation 2851, the TX UE 2820 and RX UEs 2810 and 2830 may receive a retransmission probability via SIB. This is described below.

At operation 2857, the TX UE 2820 transmits a scheduling request message to the eNB 2840. At operation 2859, the TX UE 2820 receives allocation of downlink resources from the eNB 2840. At operation 2861, the TX UE 2820 transmits a BSR message to the eNB 2840 to notify the amount of D2D data to be transmitted. At operation 2863, the TX UE 2820 receives allocation of resources from the eNB 2840.

Thereafter, at operation 2865 and operation 2867, the TX UE 2420 transmits an SA having information on the allocated resources to the RX UE 2810 and the RX UE 2830. Here, as described before, the SA contains a destination ID, enabling the RX UE to identify whether the SA addressed thereto. It is assumed that the RX UEs 2810 and 2830 have the same destination ID (or group ID). At operation 2869, the TX UE 2820 assigns a HARQ process for the RX UEs 2810 and 2830.

At operation 2871, each RX UE 2810 or 2830 assigns a HARQ process for the received SA.

Meanwhile, the TX UE 2820 may assign HARQ processes for the first RX UE 2810 and the second RX UE 2830 immediately after transmitting the SA at operations 2865 and 2867). Alternatively, the TX UE 2820 may assign HARQ processes for the first RX UE 2810 and the second RX UE 2830 immediately before transmitting data at operation 2873.

The RX UE 2810 and RX UE 2830 may assign HARQ processes for the TX UE 2820 immediately after receiving the SA at operations 2865 and 867. Alternatively, the RX UE 2810 and RX UE 2830 may assign HARQ processes for the TX UE 2820 when first data is received at operation 2873.

At operation 2873, the TX UE 2820 transmits data to the first RX UE 2810 and the second RX UE 2830. At operation 2875, the first RX UE 2810 successfully receives the data.

In such a case, at operation 2877, the first RX UE 2810 may transmit the next RV to the second RX UE 2830. At operation 2879, the TX UE 2820 may transmit data to the second RX UE 2830. At operation 2881, the second RX UE 2830 may combine data received from the first RX UE 2810 with data received from the TX UE 2820.

Referring to FIG. 29, a network 2940 may pre-store information regarding radio resources usable for SA transmission as system information (e.g., an RRC signaling or an SIB). For example, at operation 2951, the information on radio resources usable for SA transmission may be stored in the network (e.g., a D2D server) 2940 as system information, so that resource pool information and other necessary information may be shared between UEs 2910, 2920, and 2930.

At operation 2953, the first UE (TX UE) 2910 detects generation of data to be transmitted. At operation 2555 and operation 2957, the TX UE 2510 transmits an SA containing a destination ID to at least one RX UE 2920 or 2930 according to the shared information. It is assumed that the RX UEs 2920 and 2930 have the same destination ID (or group ID). At operation 2959, the TX UE 2910 assigns HARQ processes for the RX UEs 2920 and 2930.

Upon SA reception, at operation 2963, the RX UE 2920 assigns a HARQ process per SA having a destination ID equal to the ID thereof. At operation 2967, the RX UE 2930 assigns a HARQ process per SA having a destination ID equal to the ID thereof.

Meanwhile, the TX UE 2910 may assign HARQ processes for the RX UEs 2920 and 2930 immediately after transmitting the SA at operations 2955 and 2957. Alternatively, the TX UE 2910 may assign HARQ processes for the RX UEs 2920 and 2930 immediately before transmitting data at operations 2961 and 2965.

Each RX UE 2920 or 2930 may assign a HARQ process for the TX UE 2910 immediately after receiving the SA at operation 2955 or 2957. Alternatively, each RX UE 2920 or 2930 may assign a HARQ processes for the TX UE 2910 when first data is received at operation 2961 or 2965.

At operation 2961, the TX UE 2910 transmits data to the first RX UE 2920. At operation 2965, the TX UE 2910 transmits data to the second RX UE 2930. At operation 2969, the first RX UE 2920 successfully receives the data.

In such a case, at operation 2971, the first RX UE 2920 may transmit the next RV to the second RX UE 2930. At operation 2973 and operation 2975, the TX UE 2910 may continue to transmit data to the first RX UE 2920 and the second RX UE 2930. At operation 2977, the second RX UE 2930 may combine data received from the first RX UE 2920 with data received from the TX UE 2910.

Referring to FIG. 30, a HARQ entity 3010 and a HARQ process per SA including destination ID 3020 are illustrated and the RX UE may succeed in data reception after receiving the second RV (i.e., RV1) as indicated by indicia 3030. The RX UE may generate the remaining RVs (i.e., RV2 and RV3), store the same in the PHY TX buffer as indicated by indicia 3040, and transmit the RV stored in the PHY TX buffer to another RX UE not having succeeded in reception.

Referring to FIG. 31, when channel conditions are favorable and the TX UE transmits multiple RVs in UM mode, the RX UE may succeed in receiving data without an error before receiving all the RVs from the TX UE. In this case, the RX UE may perform decoding and error determination upon each RV reception, and discontinue RV reception if data reception is successful. The RX UE having succeeded in reception may transmit the received data to another RX UE.

C_T is a counter for D2D reception according to the T-RPT sequence in the data period. Based on the C_T value, the RX UE may identify the number of received RVs and determine when the soft buffer is to be used for HARQ combining or is to be purged. At operation 3110, C_T is set to 0.

At operation 3115, the RX UE monitors the SA pool to receive an SA. At operation 3120, the RX UE determines whether the received SA has a destination ID or group ID equal to the ID thereof. If the SA does not have a destination ID equal to the ID of the RX UE, the RX UE ends the procedure.

If the SA has a destination ID equal to the ID of the RX UE, the RX UE may assign a HARQ process for the SA. For example, at operation 3125, the RX UE starts the data period timer to indicate the data period. At operation 3130, the RX UE creates a HARQ process.

Thereafter, the RX UE may receive an RV, demodulate the RV, and perform combining, and decode the currently combined data to detect an error. This may be repeated for each RV reception. For example, the RX UE receives an RV at operation 3135, increments C_T by 1 at operation 3140, demodulates the received RV into channel bits at operation 3145, and stores the channel bits in the soft buffer with overriding or combining at operation 3150. At operation 3155, the RX UE determines the combined data to detect an error. If an error is detected, at operation 3185, the RX UE determines whether all RVs are received. If not all the RVs are received, the procedure returns to operation 3135 for continued RV reception. If all the RVs are received but an error persists, at operation 3190, the RX UE discards the combined data.

If no error is detected, at operation 3160, the combined data is forwarded to the higher layer. For example, decoded data may be forwarded to the MAC layer. Thereby, the RX UE may discontinue RV reception before receiving a preset number of RVs. After discontinuation of RV reception, at operation 3165, the RX UE determines whether reception has succeeded after all the RVs are received. For example, if reception has succeeded after reception of the last RV, the RX UE has to receive the next data (returns to operation 3185). If reception has succeeded before reception of the last RV, at operation 3170, the RX UE generates the remaining RVs, stores the generated RVs in the PHY TX buffer, and sets RVI to C_T%4+1. At operation 3175, the RV indicated by RVI (RV[RVI]) is forwarded to the physical channel, RVI is incremented by 1, and C_T is incremented by 1. At operation 3180, the RX UE determines whether all the generated RVs are transmitted. If all the generated RVs are transmitted, the procedure proceeds to operation 3190.

During the process, one HARQ process is executed for the reception resource designated by the SA. When the data period expires, the ongoing action is suspended and only an error-free portion of the data received up to that time may be forwarded to the higher layer. For example, at operation 3195, the RX UE determines whether the data period has expired. If the data period has not expired, the procedure returns to operation 3135 for continued data reception. If the data period has expired, at operation 3197, the RX UE deletes the HARQ process, and an error-free portion of the data received up to that time may be forwarded to the higher layer.

Meanwhile, in such adaptive retransmission, to perform transmission during reception, it may take time to transition from reception mode to transmission mode (RX→TX). For example, the T-RPT bitmap may be set to "11111111" to indicate use of eight consecutive uplink units. As this bitmap repeats during the data period, only D2D resources may be allocated for several hundred ms without use of WAN uplink. As such, the bitmap pattern "11111111" is rarely used although definable. Among the remaining bitmap patterns, one, two or four 1's may be present. If four consecutive 1's are present in the T-RPT bitmap (i.e., "11110000"), it may be difficult to take time to transition from reception mode to transmission mode (RX→TX). To this end, adaptive retransmission may be performed based on the T-RPT bitmap pattern.

For example, the RX UE may analyze the bit map in the SA and perform retransmission based on the time taken for RX→TX switching. For instance, if the time taken for RX→TX switching is 1 subframe, after succeeding in reception, the RX UE may skip 1 subframe on the bitmap and start to transmit the next RV.

Referring to FIG. 32, when channel conditions are favorable and the TX UE transmits multiple RVs in UM mode, the RX UE may succeed in receiving data without an error before receiving all the RVs from the TX UE. In this case, the RX UE may perform decoding and error determination upon each RV reception, and discontinue RV reception if data reception is successful. The RX UE having succeeded in reception may transmit the received data to another RX UE.

C_T is a counter for D2D reception according to the T-RPT sequence in the data period. Based on the C_T value, the RX UE may identify the number of received RVs and determine when the soft buffer is to be used for HARQ combining or is to be purged. At operation 3210, C_T is set to 0.

At operation 3215, the RX UE monitors the SA pool to receive an SA. At operation 3220, the RX UE determines whether the received SA has a destination ID or group ID equal to the ID thereof. If the SA does not have a destination ID equal to the ID of the RX UE, the RX UE may end the procedure.

If the SA has a destination ID equal to the ID of the RX UE, the RX UE may assign a HARQ process for the SA. For example, at operation 3225, the RX UE starts the data period timer to indicate the data period. At operation 3230, the RX UE creates a HARQ process.

Thereafter, the RX UE may receive an RV, demodulate the RV, and perform combining, and decode the currently combined data to detect an error. This may be repeated for each RV reception. For example, the RX UE receives an RV at operation 3235, increments C_T by 1 at operation 3240, demodulates the received RV into channel bits at operation 3245, and stores the channel bits in the soft buffer with overriding or combining at operation 3250. At operation 3255, the RX UE determines the combined data to detect an error. If an error is detected, at operation 3287, the RX UE determines whether all RVs are received. If not all the RVs are received, the procedure returns to operation 3235 for continued RV reception. If all the RVs are received but an error persists, at operation 3290, the RX UE may discard the combined data.

If no error is detected, at operation 3260, the combined data is forwarded to the higher layer. For example, decoded data may be forwarded to the MAC layer. Thereby, the RX UE may discontinue RV reception before receiving a preset number of RVs. After discontinuation of RV reception, at operation 3265, the RX UE determines whether reception has succeeded after all the RVs are received. For example, if reception has succeeded after reception of the last RV, the RX UE has to receive the next data (returns to operation 3287). If reception has succeeded before reception of the last RV, at operation 3270, the RX UE generates the remaining RVs, stores the generated RVs in the PHY TX buffer, and sets RVI to C_T%4+1. Thereafter, at operation 3275, the RX UE determines whether to perform transmission based on the RX→TX transition time. For example, when the transition time is 1 subframe, the RX UE may determine whether the transmission time is shorter than 1 subframe. If the transmission time is shorter than 1 subframe, at operation 3280, the RV indicated by RVI (RV[RVI]) is forwarded to the physical channel. At operation 3283, RVI is incremented by 1, and C_T is incremented by 1. If the transmission time is not shorter than 1 subframe, at operation 3283, RVI and C_T are incremented by 1, respectively, without RV transmission. At operation 3285, the RX UE determines whether all the generated RVs are transmitted. If all the generated RVs are transmitted, the procedure proceeds to operation 3290.

During the process, one HARQ process is executed for the reception resource designated by the SA. When the data period expires, the ongoing action is suspended and only an error-free portion of the data received up to that time may be forwarded to the higher layer. For example, at operation 3295, the RX UE determines whether the data period has expired. If the data period has not expired, the procedure returns to operation 3235 for continued data reception. If the data period has expired, at operation 3297, the RX UE deletes the HARQ process, and an error-free portion of the data received up to that time may be forwarded to the higher layer.

Referring to FIG. 33, it is possible to designate a node capable of relay operation during reception operation. To this end, a relay function may be activated by a separate message issued at the application layer in response to user selection. For more diverse reception options, as shown in FIG. 33, data reception may be performed by using one or more schemes selected from among a first reception scheme described in FIG. 22, a second reception scheme described in FIG. 22, and a third reception scheme described in FIG. 31 or 32.

When the reception option is selected by a specific user, there is no need for network signaling. On the contrary, it is possible to control the above operations based on a cell, group or UE according to network input.

Figure 34:
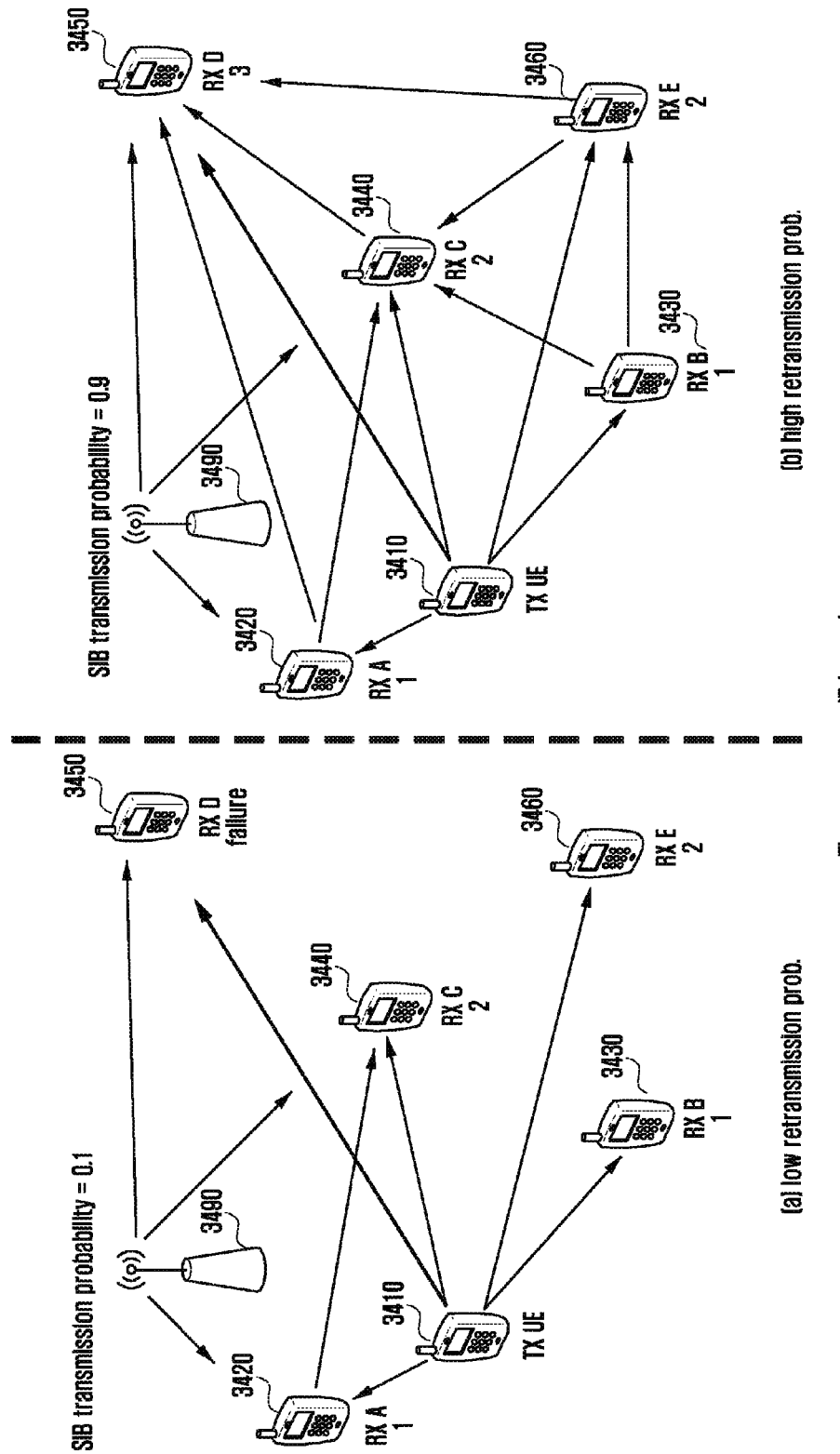
FIG. 34 depicts reuse of D2D resources based on probability values according to an embodiment of the present disclosure.

FIG. 34 depicts reuse of D2D resources based on probability values according to an embodiment of the present disclosure.

Figure 35:
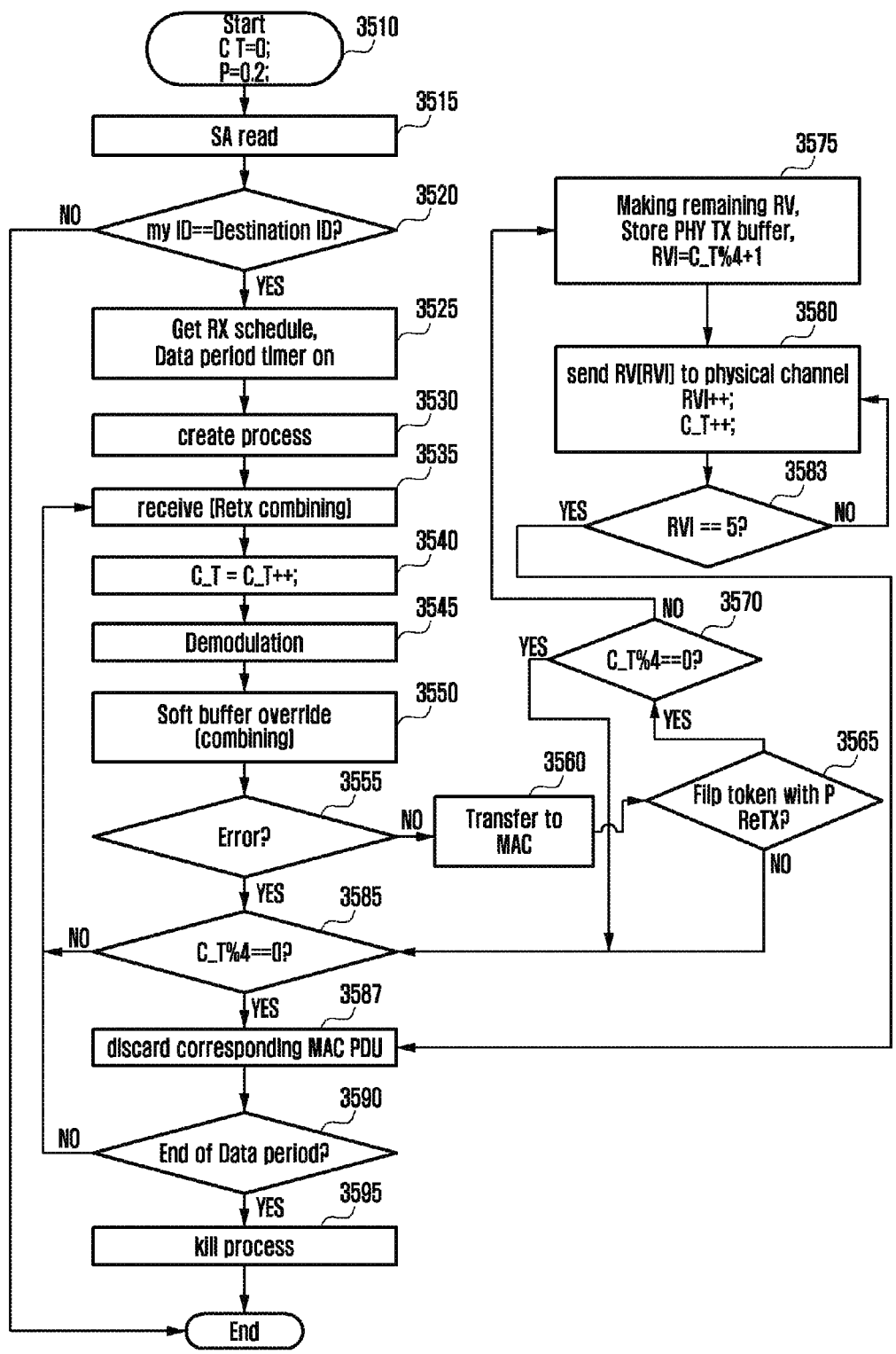
FIG. 35 is a flowchart depicting reuse of D2D resources based on probability values in a receiving UE according to an embodiment of the present disclosure.

FIG. 35 is a flowchart depicting reuse of D2D resources based on probability values in a receiving UE according to an embodiment of the present disclosure.

Another metric may be specified in advance. For example, each node may have a binary random variable so that retransmission can be performed after successful reception according to a given probability value. This probability value may be pre-specified as a portion of system information, such as an SIB, reducing unnecessary interference.

Referring to part (a) of FIG. 34, a low probability value may be used in a normal situation. For example, an eNB 3490 may provide UEs 3410, 3420, 3430, 3440, 3450, and 3460 with a low probability of 0.1 via SIB information. Each RX UE may perform retransmission after successful reception according to the low probability. On the other hand, a high probability value may be used in an emergency situation so as to increase retransmissions.

Referring to part (b) of FIG. 34, the eNB 3490 may provide UEs 3410, 3420, 3430, 3440, 3450, and 3460 with a high probability of 0.1 via SIB information. Each RX UE may perform retransmission after successful reception according to the high probability.

Referring to FIG. 35, the RX UE may determine whether to perform retransmission upon each successful reception based on coin flipping.

Specifically, when channel conditions are favorable and the TX UE transmits multiple RVs in UM mode, the RX UE may succeed in receiving data without an error before receiving all the RVs from the TX UE. In this case, the RX UE may perform decoding and error determination upon each RV reception, and discontinue RV reception if data reception is successful. The RX UE having succeeded in reception may transmit the received data to another RX UE.

C_T is a counter for D2D reception according to the T-RPT sequence in the data period. Based on the C_T value, the RX UE may identify the number of received RVs and determine when the soft buffer is to be used for HARQ combining or is to be purged. At operation 3210, C_T is set to 0 and a probability value (P) is initialized. As described before, the probability value may be signaled by the eNB via SIB. Here, P is assumed to be 0.2.

At operation 3515, the RX UE monitors the SA pool to receive an SA. At operation 3520, the RX UE determines whether the received SA has a destination ID or group ID equal to the ID thereof. If the SA does not have a destination ID equal to the ID of the RX UE, the RX UE may end the procedure.

If the SA has a destination ID equal to the ID of the RX UE, the RX UE may assign a HARQ process for the SA. For example, at operation 3525, the RX UE starts the data period timer to indicate the data period. At operation 3530, the RX UE creates a HARQ process.

Thereafter, the RX UE may receive an RV, demodulate the RV, and perform combining, and decode the currently combined data to detect an error. This may be repeated for each RV reception. For example, the RX UE receives an RV at operation 3535, increments C_T by 1 at operation 3540, demodulates the received RV into channel bits at operation 3545, and stores the channel bits in the soft buffer with overriding or combining at operation 3550. At operation 3555, the RX UE determines the combined data to detect an error. If an error is detected, at operation 3585, the RX UE determines whether all RVs are received. If not all the RVs are received, the procedure returns to operation 3535 for continued RV reception. If all the RVs are received but an error persists, at operation 3587, the RX UE may discard the combined data.

If no error is detected, at operation 3560, the combined data is forwarded to the higher layer. For example, decoded data may be forwarded to the MAC layer. Thereby, the RX UE may discontinue RV reception before receiving a preset number of RVs.

At operation 3565, the RX UE may determine whether to perform retransmission according to the probability value P set at operation 3510. For example, only when the flip token value is less than P, the RX UE may determine to perform retransmission. Upon determining not to perform retransmission, the RX UE may remain in an idle state without transmission.

Upon determining to perform retransmission, after discontinuation of RV reception, at operation 3570, the RX UE determines whether reception has succeeded after all the RVs are received. For example, if reception has succeeded after reception of the last RV, the RX UE has to receive the next data (returns to operation 3585). If reception has succeeded before reception of the last RV, at operation 3575, the RX UE generates the remaining RVs, stores the generated RVs in the PHY TX buffer, and sets RVI to C_T%4+1. At operation 3580, the RV indicated by RVI (RV[RVI]) is forwarded to the physical channel, RVI is incremented by 1, and C_T is incremented by 1. At operation 3583, the RX UE determines whether all the generated RVs are transmitted. If all the generated RVs are transmitted, the procedure proceeds to operation 3587.

During the process, one HARQ process is executed for the reception resource designated by the SA. When the data period expires, the ongoing action is suspended and only an error-free portion of the data received up to that time may be forwarded to the higher layer. For example, at operation 3590, the RX UE determines whether the data period has expired. If the data period has not expired, the procedure returns to operation 3535 for continued data reception. If the data period has expired, at operation 3595, the RX UE deletes the HARQ process, and an error-free portion of the data received up to that time may be forwarded to the higher layer.

Figure 36:
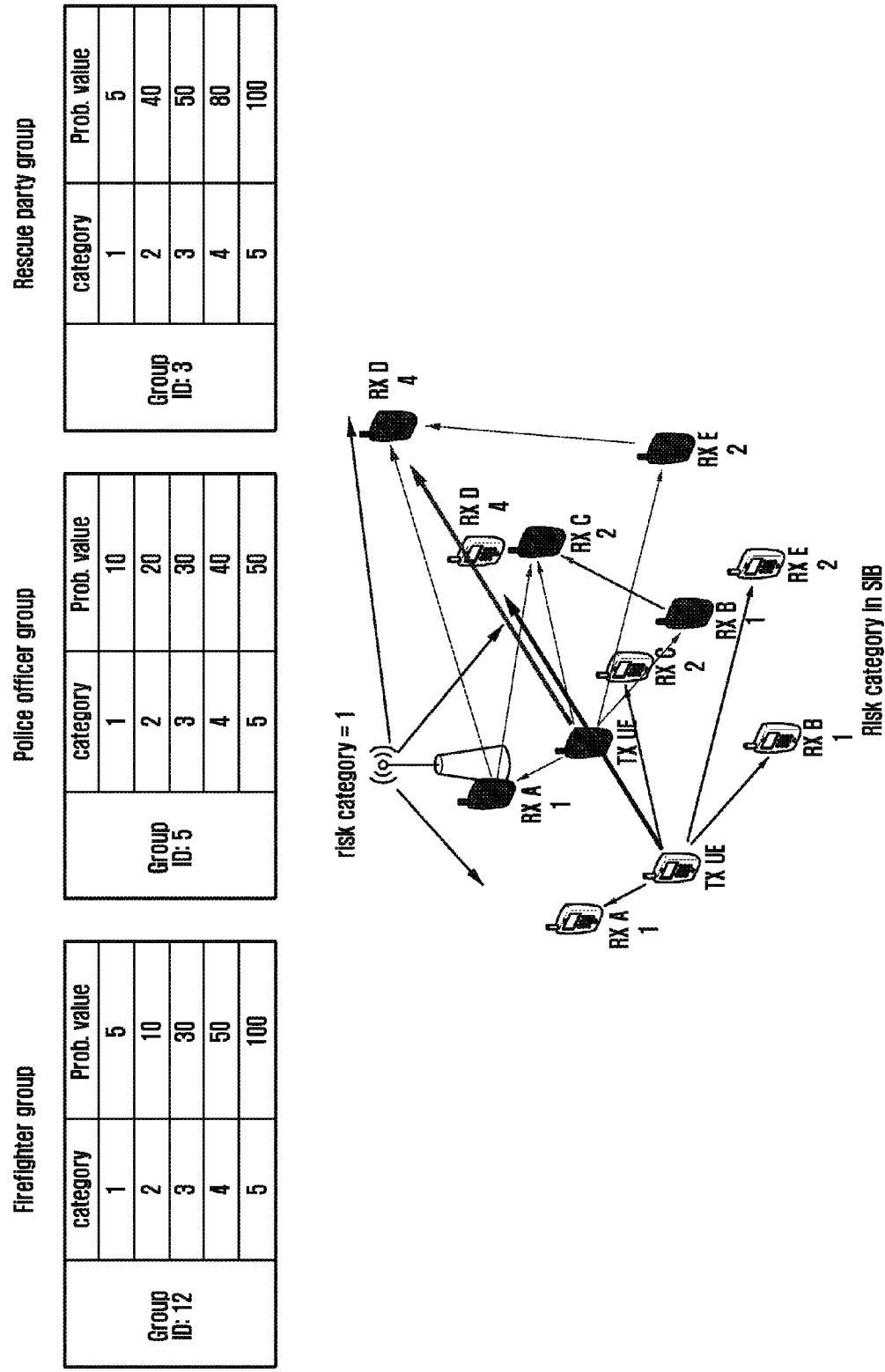
FIG. 36 illustrates system information block (SIB) utilization according to an embodiment of the present disclosure.

FIG. 36 illustrates SIB utilization according to an embodiment of the present disclosure.

Figure 37:
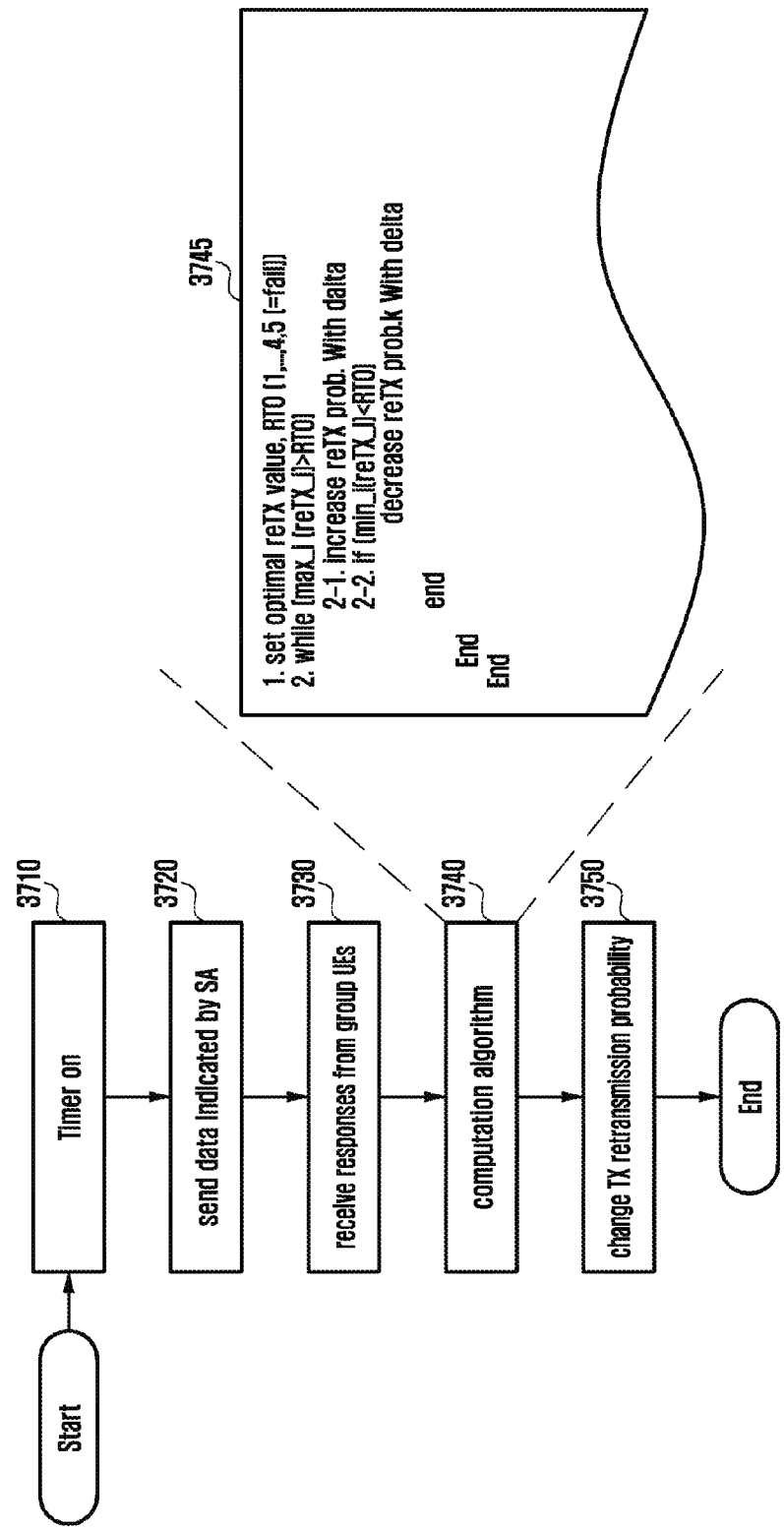
FIG. 37 is a flowchart of a procedure to change retransmission probability values according to an embodiment of the present disclosure.

FIG. 37 is a flowchart of a procedure to change retransmission probability values according to an embodiment of the present disclosure.

Figure 38:
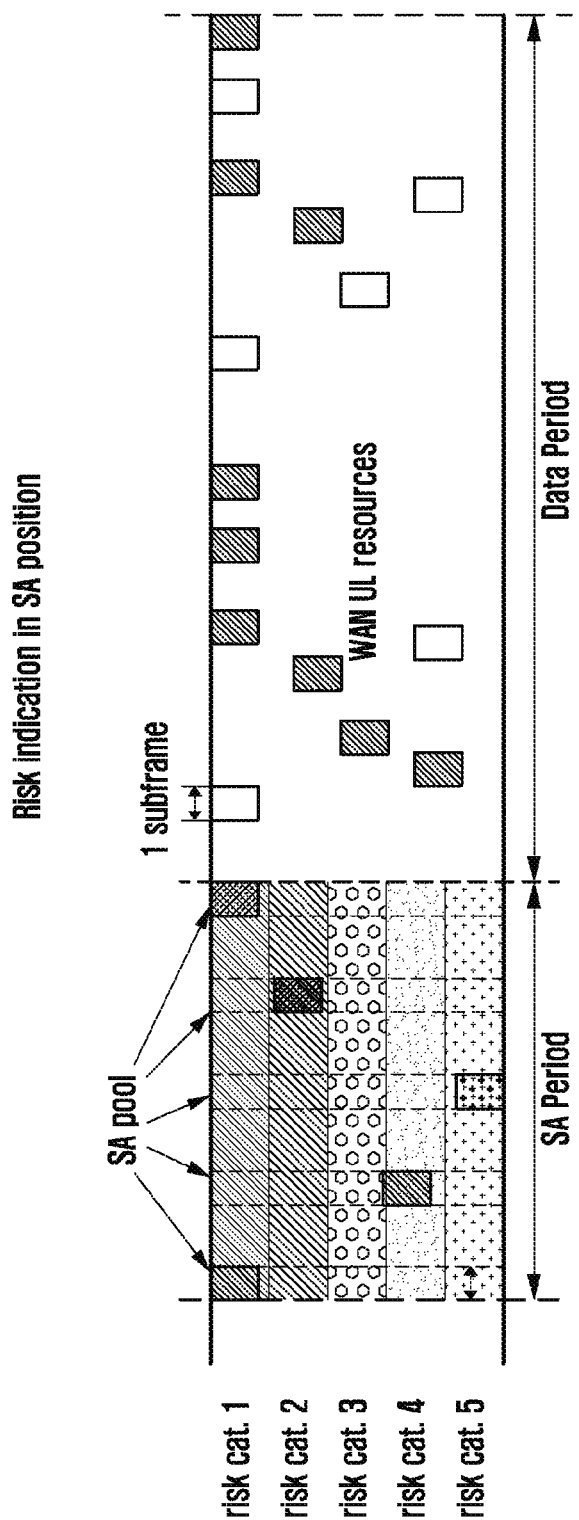
FIG. 38 illustrates risk positions in SA according to an embodiment of the present disclosure.

FIG. 38 illustrates risk positions in SA according to an embodiment of the present disclosure.

Figure 39:
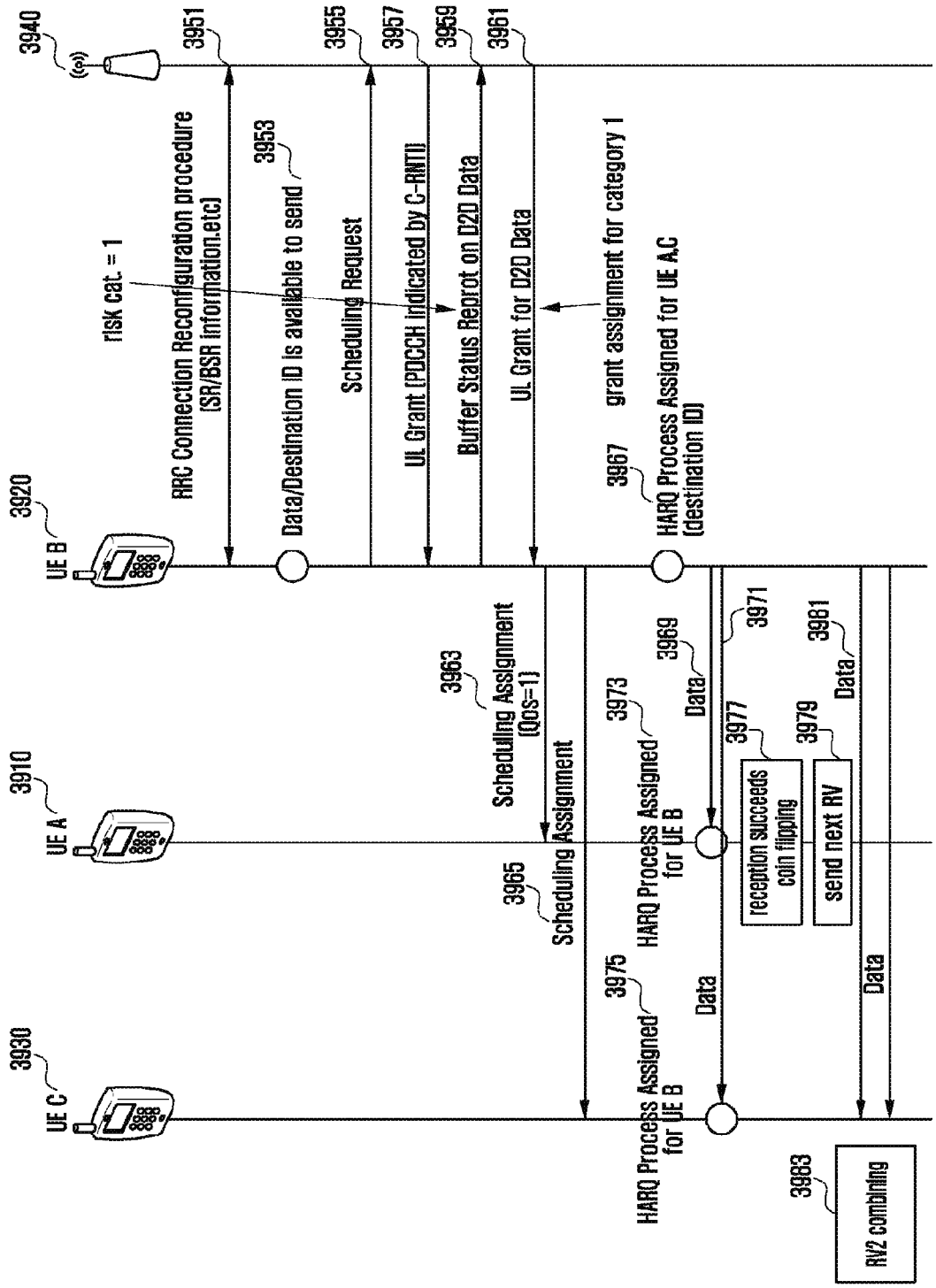
FIG. 39 is a sequence diagram depicting communication based on risk categories according to an embodiment of the present disclosure.

FIG. 39 is a sequence diagram depicting communication based on risk categories according to an embodiment of the present disclosure.

Referring to FIG. 36, it may be impossible to directly transmit the source ID as a relay indicator. For example, in the RX UE, as packet filtering is performed at the high end of the HARQ function, a received packet has to be moved up to the MAC layer so that the source ID can be identified. Hence, similarly to delivery of a retransmission probability via SIB, as shown in FIG. 36, a risk level indicator, instead of a probability value, may be included in SIB. Each D2D UE having received the risk level indicator may have different retransmission probabilities according to the group to which the D2D UE belongs. The network may configure a general risk level and transmit a corresponding indicator via SIB in a semi-static manner. Retransmission probabilities may be determined within a specific group according to the group characteristics.

Probability values for categories in a specific group may be fixed or dynamically changed. A UE may store information on the RV transmission count (the number of RVs received from a given source ID until reception succeeds) during a given time duration. When the RV transmission count is small, packet filtering at the MAC layer may be invoked to perform retransmission. As retransmission is performed to deliver data of a TX UE to the farthest RX UE from the TX UE, RX UEs belonging to a specific group may have to share information on the RV transmission counts.

The information on the RV transmission counts may be broadcast by the application layer to individual UEs within the group. Among the shared information, the largest RV transmission count may be used to adjust the retransmission probability. Specifically, when the largest RV transmission count indicates reception failure, the current retransmission probability may be increased. When the largest RV transmission count is 4, the current retransmission probability may be sustained. When the largest RV transmission count is 3, the current retransmission probability may be sustained or decreased.

For example, when the largest RV transmission count is 4 without reception failure, this indicates successful data transmission with minimized transmission energy. However, considering a margin of error due to mobility, when the largest RV transmission count is 3, the current retransmission probability may be sustained. In contrast, when the largest RV transmission count is 1, the current retransmission probability may be decreased so that the largest RV transmission count will become 3 or 4, reducing overall transmission energy.

Referring to FIG. 37, at operation 3710, the timer is started. At operation 3720, data indicated by the SA is transmitted. At operation 3730, responses are received from UEs in the group. At operation 3740, computation is performed using the responses. The computation algorithm is illustrated by indicia 3745, and a description thereof is given above. At operation 3750, the retransmission probability may be adjusted according to the computed value. Thereby, individual UEs belonging to the same group may adjust HARQ processing at the PHY end.

In the above scheme, an effort is made so that, among received retransmission counts, the maximum value is less than a suitable retransmission count and the minimum value is not too small. Instead of using a delta value as above, the retransmission count may be computed by addressing the corresponding optimization issue.

According to various embodiments of the present disclosure, information on the retransmission level may be directly included in the SA. In this case, a specific source ID may determine the desired retransmission level and notify the same to group members.

As illustrated below in Table 2, the information on the retransmission level may be given by a retransmission probability or a priority index. RX UEs having an ID equal to the destination ID (or group ID) may use the given value.

TABLE 2

| SA |
| --- |
| Freq. resource indication (3-15 bits) |
| Freq. hopping indication (1 bit) |
| MCS (5 bits) |
| T-RPT (7 bits) |
| TA (b bits) |
| ID (8 bits) |
| Priority bit or Probability value |

Instead of directly inserting a field into the SA, a portion of the SA pool may be used as shown in FIG. 38.

Referring to FIG. 38, when the SA pool is divided into regions with different risk levels, the UE wishing to transmit an SA may transmit the SA to the corresponding region. In the case of the embodiment shown in FIG. 6, the TX UE may transmit an SA to a desired region through a contention process. In the case of the embodiment shown in FIG. 5, as the eNB allocates necessary resources, the eNB has to be aware of the risk category or retransmission level of a TX UE and the TX UE has to notify the eNB of such information. The TX UE may use a ProSe-BSR to request the eNB to allocate necessary resources. Hence, the TX UE may transmit a ProSe-BSR containing risk information to the eNB.

Table 3 below illustrates a ProSe-BSR according to an embodiment of the present disclosure.

TABLE 3

ProSe-BSR

Group ID
Buffer status report
LCGID
Risk cat.

Referring to FIG. 39, radio resources useable for SA transmission may be determined by an eNB 3940. At operation 3951, a TX UE 3920 receives an RRC connection reconfiguration message from the eNB 3940 to obtain access-related information. At operation 3953, the TX UE 3920 detects generation of D2D data to be transmitted to at least one RX UE 3910 or 3930. Here, the TX UE 3920 may identify the destination ID for each RX UE 3910 or 3930. Alternatively, the TX UE may detect generation of D2D data at operation 3953 first, and receive access-related information from the eNB at operation 3951. This may also be applicable to the embodiments described below.

At operation 3955, the TX UE 3920 transmits a scheduling request message to the eNB 3940. At operation 3957, the TX UE 3920 receives allocation of downlink resources from the eNB 3940. At operation 3959, the TX UE 3920 transmits a BSR message to the eNB 3940 to notify the amount of D2D data to be transmitted. Here, the BSR message may contain risk information, such as category information (i.e., a category identifier). At operation 3961, the TX UE 3920 receives allocation of resources from the eNB 3940. Here, the eNB 3940 may allocate resources in accordance with the risk information (e.g., category information).

Thereafter, at operation 3963 and operation 3965, the TX UE 3920 transmits an SA having information on the allocated resources to the RX UE 3910 and the RX UE 3930. Here, as described before, the SA contains a destination ID, enabling the RX UE to identify whether the SA addressed thereto. It is assumed that the RX UEs 3910 and 3930 have the same destination ID (or group ID). At operation 3967, the TX UE 3920 assigns a HARQ process for the RX UEs 3910 and 3930.

At operation 3973, the RX UE 3910 assigns a HARQ process for the received SA. At operation 3975, the RX UE 3930 assigns a HARQ process for the received SA.

Meanwhile, the TX UE 3920 may assign HARQ processes for the first RX UE 3910 and the second RX UE 3930 immediately after transmitting the SA at operations 3963 and 3965). Alternatively, the TX UE 3920 may assign HARQ processes for the first RX UE 3910 and the second RX UE 3930 immediately before transmitting data at operations 3969 and 3971).

The RX UE 3910 and RX UE 3930 may assign HARQ processes for the TX UE 3920 immediately after receiving the SA at operations 3963 and 3965). Alternatively, the RX UE 3910 and RX UE 3930 may assign HARQ processes for the TX UE 3920 when first data is received at operations 3969 and 3971).

At operation 3969 and operation 3971, the TX UE 3920 transmits data to the first RX UE 3910 and the second RX UE 3930, respectively. At operation 3977, the first RX UE 3910 successfully receives the data.

In such as case, at operation 3979, the first RX UE 3910 may transmit the next RV to the second RX UE 3930. At operation 3981, the TX UE 3920 may transmit data to the second RX UE 3930. At operation 3983, the second RX UE 3930 may combine data received from the first RX UE 3910 with data received from the TX UE 3920.

Figure 40:
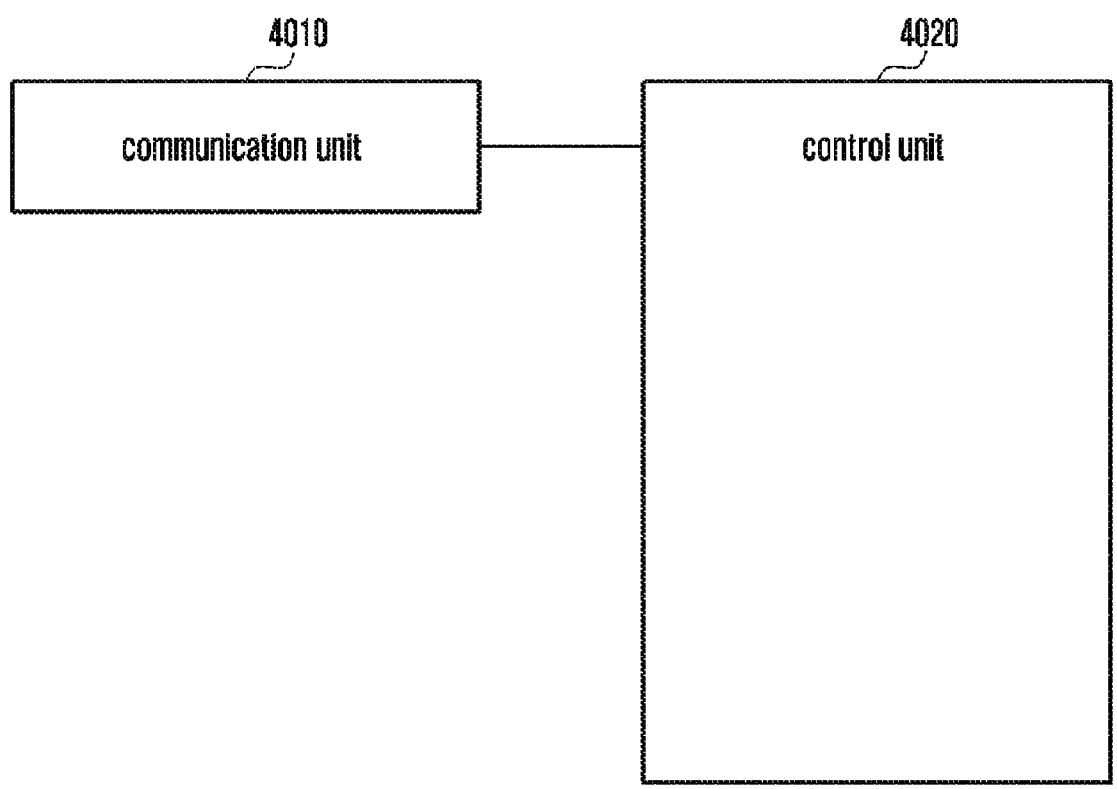
FIG. 40 is block diagram of a transmitting UE according to an embodiment of the present disclosure.

FIG. 40 is block diagram of a transmitting UE according to an embodiment of the present disclosure.

Referring to FIG. 40, the TX UE may include a communication unit 4010 and a control unit 4020 to control overall operation thereof.

The control unit 4020 may control the TX UE according to one of the embodiments described above. For example, the control unit 4020 may control a process of receiving, upon generation of data to be transmitted to an RX UE, allocation of resources to be used for D2D communication, transmitting an SA containing identification information of at least one RX UE to the at least one RX UE, assigning at least one HARQ process for the identification information of the at least one RX UE, and transmitting data to the at least one RX UE by use of the HARQ process.

The communication unit 4010 may transmit and receive signals according to one of the embodiments described above. For example, the communication unit 4010 may transmit an SA containing a destination ID to RX UEs.

Figure 41:
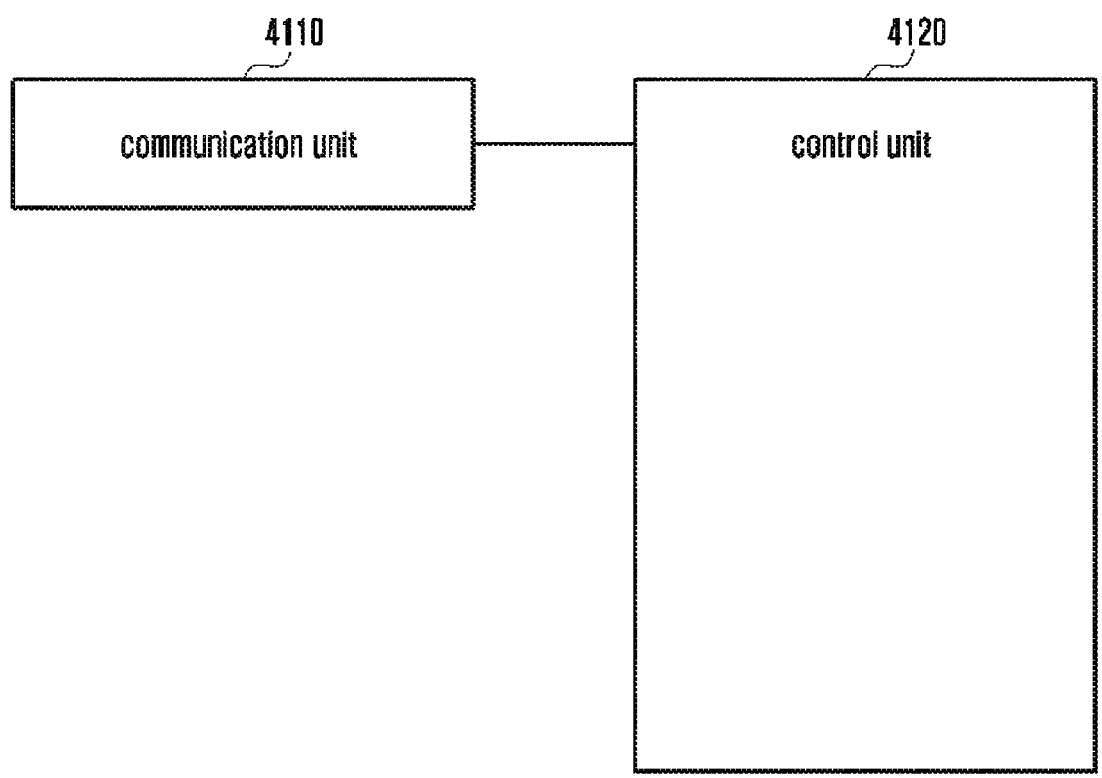
FIG. 41 is block diagram of a receiving UE according to an embodiment of the present disclosure.

FIG. 41 is block diagram of a receiving UE according to an embodiment of the present disclosure.

Referring to FIG. 41, the RX UE may include a communication unit 4110 and a control unit 4120 to control overall operation thereof.

The control unit 4120 may control the RX UE according to one of the embodiments described above. For example, the control unit 4120 may control a process of determining whether destination identification information contained in an SA received from at least one TX UE is equal to identification information of the RX UE, assigning a HARQ process for the SA when the destination identification information is equal to the identification information of the RX UE, and receiving data from the at least one TX UE by use of the HARQ process.

The communication unit 4110 may transmit and receive signals according to one of the embodiments described above. For example, the communication unit 4110 may receive an SA containing a destination ID from a TX UE.

Although not shown, the eNB of the present disclosure may include a communication unit and a control unit to control overall operation thereof.

In a feature of the present disclosure, it is possible to remove factors causing system performance degradation when retransmission operation for communication between UE and eNB is introduced to D2D communication.

It is also possible to produce optimum system performance by removing such performance degradation factors.

Performance of D2D broadcasting can be enhanced by using D2D retransmission operation. It is possible to alleviate underutilization of radio resources and system overhead due to process ID indication during retransmission operation by defining processes and entities suitable for handling units of data retransmission. Process allocation is performed based on a pair of D2D transmitter and receiver. Hence, it is possible to introduce multiple transmitter and receiver pairs to the existing source/destination relationship between a UE and eNB.

In addition, it is possible to reduce waste of reception resources during D2D communication based on simplified retransmission configurations by use of adaptive error determination. This feature may contribute to conservation of reception power through reduction of reception attempts and to acquisition of broadcast channel gain through adaptive RV retransmission.

Hereinabove, various embodiments of the present disclosure have been shown and described for the purpose of illustration without limiting the subject matter of the present disclosure. It should be understood by those skilled in the art that many variations and modifications of the method and an apparatus described herein will still fall within the spirit and scope of the present disclosure as defined in the appended claims and their equivalents.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A method by a transmitting user equipment (TX UE), the method comprising:
   receiving resource allocation information for device-to-device (D2D) communication from a base station;
   transmitting a group destination identification to a receiving UE (RX UE);
   configuring a hybrid automatic repeat request (HARQ) process based on the group destination identification; and
   transmitting data of a redundancy version (RV) to the RX UE based on the HARQ process,
   wherein if the data of the RV is successfully received at the RX UE, data of a next RV is transferred from the RX UE to another UE.

2. The method of claim 1, further comprising:
   transmitting, if data to be transmitted to the RX UE is present, a resource allocation request message to the base station.

3. The method of claim 1, wherein the receiving of the resource allocation information comprises receiving allocation of resources from a resource pool pre-configured in the network based on system information.

4. The method of claim 1, further comprising:
   generating 4 redundancy versions for the data;
   storing the 4 redundancy versions for the data; and
   transmitting each of the 4 redundancy versions for the data sequentially.

5. The method of claim 1, further comprising:
   receiving probability information associated with retransmission.

6. A method by a receiving user equipment (RX UE), the method comprising:
   identifying a group destination identification included in a message received from a transmitting UE (TX UE);
   configuring a hybrid automatic repeat request (HARQ) process based on the group destination identification;
   receiving data of a redundancy version (RV) from the TX UE based on the HARQ process;
   determining whether the data of the RV is successfully received from the TX UE;
   generating, if the data of the RV is successfully received, data of the next RV; and
   transmitting the data of the next RV to another RX UE.

7. The method of claim 6, further comprising:
   suspending, if the data of the RV is successfully received, reception of the data of the next RV until next data arrives.

8. The method of claim 6, further comprising:
   receiving probability information used by one RX UE having succeeded in reception to determine whether to perform retransmission to the other RX UE; and
   determining, if the data of the RV is successfully received, whether to generate the data of the next RV to be transmitted to the other RX UE based on the probability information.

9. The method of claim 6, further comprising: receiving probability information associated with retransmission.

10. A transmitting user equipment (TX UE) comprising:
    a transceiver configured to transmit and receive a signal; and
    a controller configured to:
      receive resource allocation information for device-to-device (D2D) communication from a base station,
      transmit group identification information to a receiving UE (RX UE),
      configure a hybrid automatic repeat request (HARQ) process based on the group identification information, and
      transmit data of a redundancy version (RV) to the RX UE based on the HARQ process,
      wherein if the data of the RV is successfully received at the RX UE, data of a next RV is transferred from the RX UE to another UE.

11. The TX UE of claim 10, wherein the controller is further configured to:
    transmit, if data to be transmitted to the RX UE is present, a resource allocation request message to the base station.

12. The TX UE of claim 10, wherein the controller is further configured to receive allocation of resources from a resource pool pre-configured in the network based on system information.

13. The TX UE of claim 10, wherein the controller is further configured to:
    generate 4 redundancy versions for the data,
    store the 4 redundancy versions for the data, and
    transmit each of the 4 redundancy versions for the data sequentially.

14. The TX UE of claim 10, wherein the controller is further configured to:
    receive probability information associated with retransmission.

15. A receiving user equipment (RX UE) comprising:
    a transceiver configured to transmit and receive a signal; and
    a controller configured to:
      identify a group destination identification included in a message received from a transmitting UE (TX UE),
      configure a hybrid automatic repeat request (HARQ) based on the group destination identification,
      receive data of a redundancy version (RV) from the TX UE based on the HARQ process,
      determine whether the data of the RV is successfully received from the TX UE,
      generate, if the data of the RV is successfully received, data of the next RV, and
      transmit the data of the next RV to another RX UE.

16. The RX UE of claim 15, wherein the controller is further configured to:

suspend, if the data of the RV is successfully received, reception of the data of the next RV until next data arrives.

17. The RX UE of claim 15, wherein the controller is further configured to:
receive probability information used by one RX UE having succeeded in reception to determine whether to perform retransmission to the other RX UE, and
determine, if the data of the RV is successfully received, whether to generate the data of the next RV to be transmitted to the other RX UE based on the probability information.

18. The RX UE of claim 15, wherein the controller is further configured to receive probability information associated with retransmission.

* * * * *